US012185677B2

United States Patent
Lim et al.

(10) Patent No.: US 12,185,677 B2
(45) Date of Patent: *Jan. 7, 2025

(54) APPARATUS FOR CULTIVATING PLANTS

(71) Applicant: LG Electronics Inc., Seoul (KR)

(72) Inventors: Kiyoung Lim, Seoul (KR); Yongki Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,048

(22) Filed: Aug. 7, 2023

(65) Prior Publication Data

US 2023/0380358 A1   Nov. 30, 2023

Related U.S. Application Data

(63) Continuation of application No. 17/355,509, filed on Jun. 23, 2021, now Pat. No. 11,758,858.

(30) Foreign Application Priority Data

Jul. 13, 2020   (KR) .......................... 10-2020-0086320

(51) Int. Cl.
*A01G 27/00*   (2006.01)
*A01G 7/04*   (2006.01)
(Continued)

(52) U.S. Cl.
CPC ........... *A01G 27/008* (2013.01); *A01G 7/045* (2013.01); *A01G 9/246* (2013.01); *A01G 9/247* (2013.01);
(Continued)

(58) Field of Classification Search
CPC ..... A01G 27/008; A01G 9/247; A01G 27/003
See application file for complete search history.

(56) References Cited

U.S. PATENT DOCUMENTS 3,943,658 A * 3/1976 Hai ........................ A01G 31/02
47/60
5,822,920 A   10/1998 Tsay
(Continued)

FOREIGN PATENT DOCUMENTS

EP   3649848   5/2020
JP   3176525   6/2012
(Continued)

OTHER PUBLICATIONS

Extended European Search Report in European Appln. No. 21183808.1, dated Dec. 6, 2021, 9 pages.
(Continued)

*Primary Examiner* — Monica L Perry
(74) *Attorney, Agent, or Firm* — Fish & Richardson P.C.

(57) ABSTRACT

An apparatus for cultivating plants includes a cabinet having a cultivation space, a temperature control device provided in the cabinet to adjust a temperature of the cultivation space, a door configured to open and close the cultivation space, a cultivation shelf provided in the cabinet and configured to seat a seed package, a lighting device provided in the cabinet to radiate light onto the cultivation shelf, and a water supply pipe provided in the cabinet to supply water to the cultivation shelf. The cultivation shelf includes a shelf tray that supports the seed package, a shelf base provided under the shelf tray to accommodate the water supplied from the water supply pipe, and a shutter provided to be openable on the seat. The water accommodated into the shelf base is introduced to the inside of the seat by passing through the shutter when the shutter is opened.

20 Claims, 31 Drawing Sheets

(51) Int. Cl.
  *A01G 9/24* (2006.01)
  *G05D 9/12* (2006.01)
  *G05D 23/19* (2006.01)

(52) U.S. Cl.
  CPC ............. *A01G 27/003* (2013.01); *G05D 9/12* (2013.01); *G05D 23/1917* (2013.01)

(56) References Cited

U.S. PATENT DOCUMENTS

| | | | |
|---|---|---|---|
| 5,946,853 | A | 9/1999 | Jacobs et al. |
| 5,983,562 | A | 11/1999 | Lai |
| 6,035,578 | A | 3/2000 | Lo et al. |
| 6,134,831 | A | 10/2000 | Lo et al. |
| 2018/0359970 | A1 | 12/2018 | Millar et al. |
| 2019/0183062 | A1* | 6/2019 | Pham ............... A01G 9/022 |
| 2019/0191643 | A1 | 6/2019 | Chan et al. |
| 2021/0144942 | A1* | 5/2021 | Ofir ............... A01G 7/045 |

FOREIGN PATENT DOCUMENTS

| | | |
|---|---|---|
| KR | 101240375 | 2/2013 |
| KR | 10-1379468 | 3/2014 |
| KR | 10-2016-0139893 | 12/2016 |
| KR | 101954251 | 2/2019 |
| KR | 10-2019-0132078 | 11/2019 |
| KR | 10-2020-0054682 | 5/2020 |
| KR | 10-2020-0058040 | 5/2020 |

OTHER PUBLICATIONS

Notice of Allowance in Korean Appln. No. 10-2020-0086320, mailed on Jul. 11, 2023, 4 pages (with English translation).
Office Action in Korean Appln. No. 10-2020-0086320, dated Dec. 30, 2022, 17 pages (with English translation).

* cited by examiner

APPARATUS FOR CULTIVATING PLANTS

CROSS-REFERENCE TO RELATED APPLICATIONS

The present application is a continuation of U.S. application Ser. No. 17/355,509, filed on Jun. 23, 2021, which claims priority under 35 U.S.C. 119 and 35 U.S.C. 365 to Korean Patent Application No. 10-2020-0086320, filed on Jul. 13, 2020, which are hereby incorporated by reference in their entirety.

BACKGROUND

The present disclosure relates to an apparatus for cultivating plants.

In general, an apparatus for cultivating plants, which provides a predetermined cultivation chamber having environments that are appropriate to grow the plants so that the plants are stored in the predetermined cultivation chamber. A configuration for supplying light energy required for the plant growth is provided in the apparatus for cultivating the plants, and the plats are grown by the supplied nutrients and light energy.

In recent years, an apparatus for cultivating plants, which is provided with a cultivation space capable of being controlled in light, temperature, and moisture and a door opening and closing the cultivation space so that the plants are capable of being grown in the home, is being developed.

A structure in which a multi-stage tray is disposed inside a cabinet, light is radiated from a light radiation portion to the tray, a nutrient solution is supplied to the tray through a nutrient solution collection box, and the inside of the cabinet is maintained to a set temperature by an air cooling device and an air circulation fan to cultivate the plants is disclosed in Korean Patent Registration No. 10-1240375.

However, according to the related art having the above-described structure, a structure in which the nutrient solution is supplied to the inside of the entire tray when the plants are cultivated may be provided, and also, the nutrient solution is also supplied to the entire tray even when the plants are partially cultivated in the tray. Thus, there is a limitation that mold or green algae are grown in an empty space.

In addition, there is a problem in that the nutrient solution supplied to the plants is exposed through the entire tray, and thus, when a lighting device operates, an environment under which generation of green algae or contaminants due to fur or mold is easy is provided to allow a user to feel discomfort.

A plant cultivator, in which a capsule containing seeds is seated in a case that defines a cultivation space opened and closed by a door, and light, moisture, and temperature are capable of being respectively controlled by a light source module, a culture solution module, and an air conditioning module, is disclosed in Korean Patent Registration No. 10-1954251.

However, according to the related art having the above-described structure, a structure in which the culture solution is supplied to the entire tray may be provided, and also, the culture solution may be injected to a portion, on which the capsule is not mounted, so that the culture solution is exposed to the outside and thus is contaminated.

Particularly, when a closed environment is provided in a temperature region in which the plants are grown, the culture solution may be very easily contaminated, and thus, there is a limitation that, when mold or green algae are generated due to the contamination of the culture solution, user's dissatisfaction is caused.

SUMMARY

Embodiments provide an apparatus for cultivating plants, in which the inside of a cultivation space shielded by a door is improved in sanitation.

Embodiments also provide an apparatus for cultivating plants, in which the outside of a cultivation shelf is prevented from being contaminated by water.

Embodiments also provide an apparatus for cultivating plants, in which water is selectively supplied to a portion of an entire cultivation shelf, at which the plants are cultivated.

Embodiments also provide an apparatus for cultivating plants, in which water is selectively supplied to an area on which a seed package is mounted without an electrical device is not disposed on a cultivation shelf.

In an apparatus for cultivating plants according to an embodiment, a cultivation shelf on which a seed package is seated is provided in a cultivation space which is opened and closed by a door and controlled in temperature by a temperature adjustment device, and a shutter that is opened to supply and drain water when the seed package is seated is provided in the cultivation shelf.

An apparatus for cultivating plants according to an embodiment includes a shelf tray on which a cultivation shelf is seated to be accessible to a cultivation space, a shelf base in which supplied water is stored, and a shutter configured to open and close a communication hole defined in the shelf tray according to whether a seed package is mounted, wherein the shutter is opened to supply the water of the shelf base to the seed package when the seed package is opened.

In an apparatus for cultivating plants according to an embodiment, a cultivation shelf is disposed to be accessible to a cultivation space, and a plurality of seats that are partitioned so that a seed package is selectively seated is disposed on the cultivation shelf, wherein a shutter opened when the seed package is seated is provided on each of the plurality of seats to supply water to only the seat of the seats, on which the seed package is seated.

In an apparatus for cultivating plants according to an embodiment, a cultivation shelf is disposed to be accessible to a cultivation space, and a seat on which a seed package is seated is disposed on the cultivation shelf, wherein a shutter opened by a weight of the seed package when the seed package is seated is provided on the bottom of the seat so that water is supplied to the seed package.

In one embodiment, an apparatus for cultivating plants includes: a cabinet having a cultivation space; a temperature control device provided in the cabinet to adjust a temperature of the cultivation space; a door configured to open and close the cultivation space; a cultivation shelf which is provided in the cabinet and on which a seed package containing plants to be cultivated is seated; a lighting device provided in the cabinet to radiate light onto the cultivation shelf; and a water supply pipe provided in the cabinet to supply water to the cultivation shelf, wherein the cultivation shelf includes: a shelf tray provided with a seat on which the seed package is seated; a shelf base provided under the shelf tray to accommodate the water supplied from the water supply pipe; and a shutter provided to be openable on the seat, wherein the water accommodated into the shelf base is introduced to the inside of the seat by passing through the shutter when the shutter is opened.

The shutter may include: a pressing member protruding to the inside of the seat, the pressing member moving downward by the seed package when the seed package is mounted; a communication member which is provided under the pressing member and in which a communication hole, through which the water moves between the shelf base and the seat, is defined; and a shutter member coupled to the pressing member to move vertically together with the pressing member, the shutter member being configured to open and close the communication hole.

The communication member may be mounted on a communication member mounting hole that passes through the shelf tray.

The pressing member may be supported by a spring, and in a state in which the seed package is not mounted, the communication hole may be maintained in a closed state through the shutter member by the spring.

The shutter member may be disposed under the communication member, and when the water is filled in the shelf base, the shutter member may move upward to maintain the closed state of the communication hole.

At least a portion of the shutter member may be made of a material that is floated on water.

In a state in which the water is not filled in the shelf base, each of the shutter member and the pressing member may move downward by its own weight to maintain an opened state of the communication hole.

A through-hole through which a boss portion configured to connect the pressing member to the shutter member passes may be defined in the communication member, and the communication hole may be arranged to be rotatable around the through-hole.

A sealing member that is in contact with the communication member at the outside rather than the communication hole may be provided on the shutter member, and the sealing member may be in close contact with the communication member when the shutter member moves upward to block the introduction of the water.

A central portion of the communication member may further protrude, and the communication hole may be opened along a circumferential portion of the communication member.

The pressing member may have a size greater than that of the communication member, and the communication hole may be opened to lateral and upper sides.

The seat may be provided in plurality, which are independently recessed from the shelf tray, a plurality of base seats recessed in a shape corresponding to each of the seats to accommodate the seats may be provided in the shelf base, and each of the base seats may be further recessed than a bottom surface of the seat to accommodate water to be supplied.

A shutter accommodation portion into which the supplied water is introduced and in which a downward movement space of the shutter when the shutter moves downward is defined may be recessed from the bottom surface of the base seat.

A water supply portion to which the water is supplied from the water supply pipe may be disposed at a rear end of the shelf base, and a base passage configured to connect the water supply portion to the plurality of base seats so that the water of the water supply portion may be supplied to the base seats is recessed from the shelf base.

A drain hole which is opened at a rear end of the shelf base connected to the base passage and through which the water in the shelf base is drained may be defined, and an opening/closing member configured to open and close the drain hole may be provided on the shelf base.

The opening/closing member may be coupled to the shelf base to open and close the drain hole through rotation thereof, and a driving device configured to press the opening/closing member so that the opening/closing member rotates may be provided above the cultivation shelf.

The apparatus may further include: a water tank provided in the cabinet to store water to be supplied to the seed package; a pump provided between the water supply pipe and the water tank to supply the water of the water tank to the cultivation shelf; and a drain pipe provided in the cabinet to guide the water drained from the cultivation shelf to the water tank, wherein the water of the water tank and the cultivation shelf may be circulated to be supplied.

The water tank may include: a tank body mounted to be accessible to the inside of the cabinet and configured to define a space in which water is accommodated; and a tank cover configured to open and close an opened top surface of the tank body to additionally supply water or nutrient.

The pump may be driven so that water is supplied up to a set water level higher than a bottom surface of the seat.

A floater moving vertically according to a water level may be provided on the shelf base, a water level detection device configured to detect a change in magnetic field due to a magnet within the floater may be provided at a lower side spaced apart from the cultivation shelf, and when it is determined that the water is supplied over a set water level by the water level detection device, the driving of the pump may be stopped.

A drain portion which is disposed at a height between a bottom surface of the seat and an upper end of the shelf base and is opened to a lower side of the shelf base to drain the water of the cultivation shelf may be provided in the shelf base.

The cultivation shelf may be provided in plurality, which are disposed to be vertically spaced apart from each other, and each of the pump and the water supply pipe may be provided in number corresponding to the number of cultivation shelves so that the water is independently supplied to each of the cultivation shelves.

The seed package may include: a container configured to communicate with the seat and define an accommodation space into which the water is introduced from the seat; a container cover configured to shield an opened top surface of the container; and a seed accommodation member provided in the accommodation space and made of an absorbent material to supply the water to a seed accommodated therein, wherein a water inflow portion recessed to accommodate the shutter may be provided in a bottom surface of the container, and a plurality of container openings through which the water is introduced into the container may be defined around the water inflow portion.

The shelf tray may be made of a stainless material.

The shelf base may be made of a plastic material.

The seat may be provided in plurality, which are independently recessed from the shelf tray, and one shutter may be provided for each of the plurality of seats, and the plurality of shutters may be disposed on the same extension line.

The shutter may be disposed at a center of the seat, and a region in which the plants are cultivated in the seed package may be symmetrically disposed with respect to the seat.

The details of one or more embodiments are set forth in the accompanying drawings and the description below.

Other features will be apparent from the description and drawings, and from the claims.

DETAILED DESCRIPTION OF THE EMBODIMENTS

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

A direction will be defined prior to the explanation. In an embodiment that will be described below, a direction facing a front surface of a door illustrated in FIG. 1 may be defined as a front direction unless the direction is separately defined, a direction facing the inside of a cabinet with respect to the front surface of the door will be defined as a rear direction, a direction facing a bottom surface on which an apparatus for cultivating plants is installed will be defined as a downward direction, and a direction that is away from the bottom surface will be defined as an upward direction.

Figure 1:
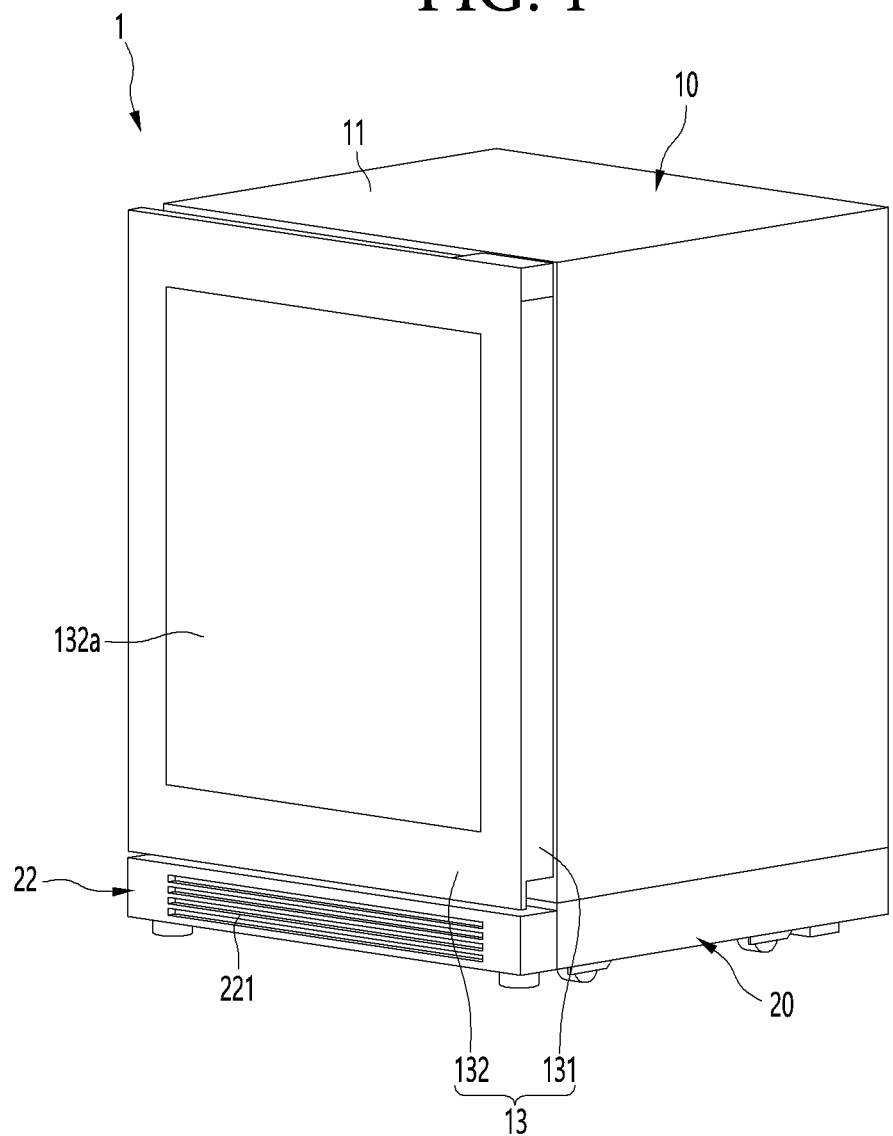
FIG. 1 is a perspective view of an apparatus for cultivating plants according to an embodiment.
Figure 2:
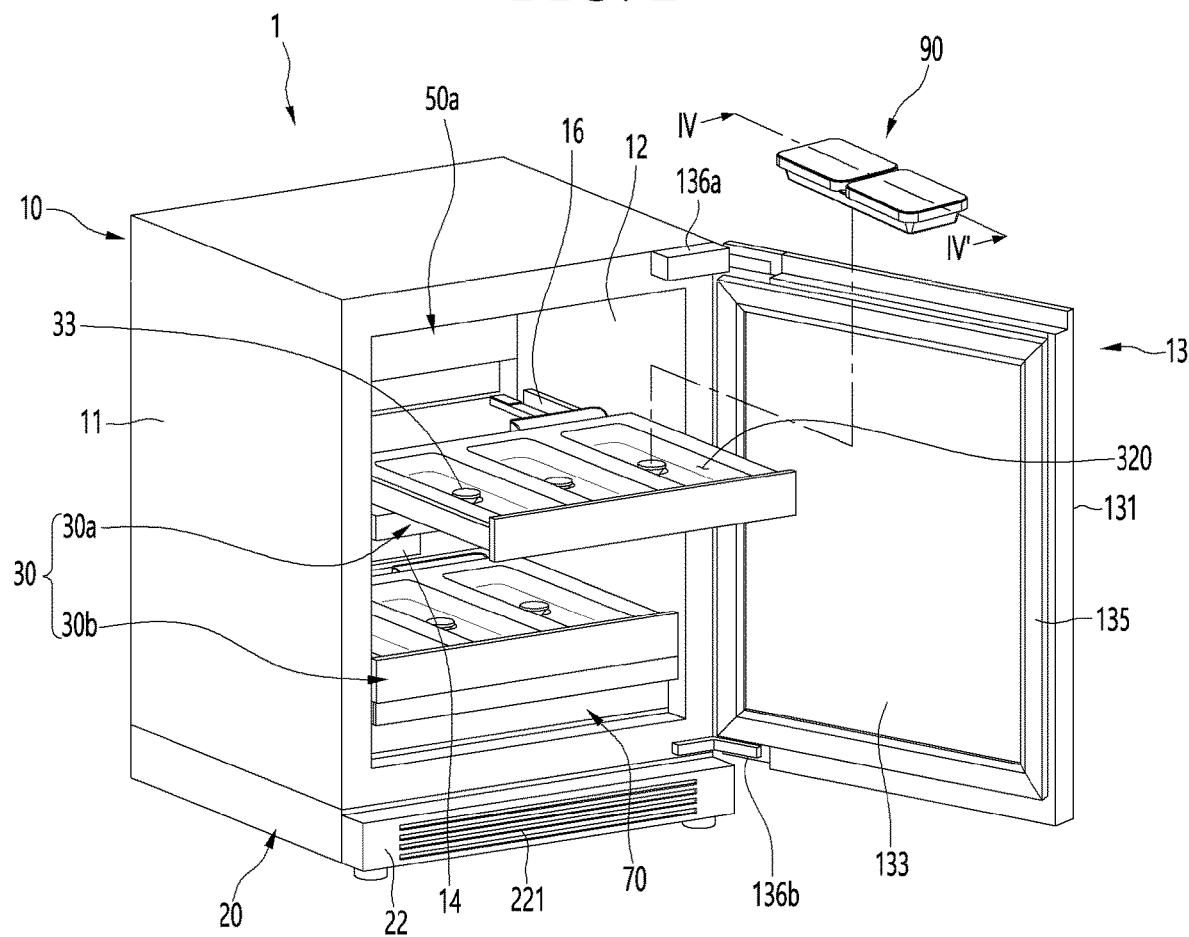
FIG. 2 is a perspective view illustrating a state in which a door of the apparatus for cultivating plants is opened.

FIG. 1 is a perspective view of an apparatus for cultivating plants according to an embodiment. Also, FIG. 2 is a perspective view illustrating a state in which a door of the apparatus for cultivating plants is opened.

Referring to the accompanying drawings, an apparatus 1 for cultivating plants according to an embodiment may be provided in a hexahedral shape. In addition, the apparatus 1 for cultivating plants may be installed alone in an indoor space or may have a size and structure that is capable of being mounted in a built-in manner in furniture together with other electronic products if necessary. For example, the apparatus 1 for cultivating plants may have a relatively low height and may be installed to define a portion of an island table or a storage cabinet installed on a wall. Of course, unlike this embodiment, the apparatus 1 for cultivating plants may have a higher height in a vertical direction, and three or more cultivation shelves 30 may be disposed vertically in the apparatus 1 for cultivating plants.

Also, the apparatus 1 for cultivating plants may be referred to as a plant cultivator or may be referred to as a plant cultivation refrigerator because a temperature inside the apparatus 1 for cultivating plants is controlled to a temperature less than room temperature as necessary.

The apparatus 1 for cultivating plants may have an outer appearance that is defined by a cabinet 10 defining a cultivation space, in which plants are cultivated, and a door 13 that opens and close the cabinet 10. Here, the plants to be cultivated, such as leaves, herbs, etc. that are capable of being used for wraps or salads, may be easily eat and cultivated by the user, and also, plants that occupy a large space may be cultivated.

The cabinet 10 may define a cultivation space 100 with an opened front surface, and the door 13 that opens and closes the cultivation space 100 may be provided in the front surface of the cabinet 10. The door 13 may upper and lower ends, which are respectively connected to the cabinet 10 by an upper hinge 136a and a lower hinge 136b, and the cultivation space 100 may be opened and closed by rotation of the door 13.

Also, the door 13 may define an outer appearance of a front surface of the apparatus 1 for cultivating plants when the front surface is closed. A see-through portion 132a through which the inside of the cultivation space 100 is visibly recognized may be provided in the front surface of the door 13.

Also, the door 13 may include a front panel 132 and a rear panel 133, which define front and rear surfaces of the door 13, and a door frame 131 defining a circumferential surface of the door 13.

Each of the front panel 132 and the rear panel 133 may be mad of a material capable of visibly recognizing the cultivation space 100. For example, each of the front panel 132 and the rear panel 133 may be made of a tempered glass or insulating glass material. Also, an insulating panel 134 (see FIG. 6) may be further provided between the front panel 132 and the rear panel 133, and a gas for thermal insulation may be injected between the front panel 132 and the rear panel 133 by the insulating panel 134, or a space between the front panel 132 and the rear panel 133 by the insulating panel 134 may be vacuumized to improve insulation performance of the door 13.

The door frame 131 may connect the front panel 132 to the rear panel 133 and may define the circumferential surface of the door 13. Also, the front surface of the door frame 131 may be completely covered by the front panel 132, and the entire outer appearance of the front surface of the door 13 may be defined by the front panel 132 when viewed from a front side. Also, the upper hinge 136a and the lower hinge 136b may be respectively coupled to the upper and lower ends of the door frame 131. In addition, a gasket 135 may be provided along a circumference of the rear surface of the door frame 131 so that the door 13 is in close contact with the front surface of the cabinet 10 in a closed state.

A machine room module 20 may be provided below the cabinet 10. Components for controlling a temperature inside the cultivation space 100 may be disposed in the machine room module 20, and the machine room module 20 may provide a space in which a plurality of electrical components including a compressor 241 and a condenser 242 constituting a refrigeration cycle are provided. The machine room module 20 may be coupled to a bottom surface of the cabinet 10 in an assembled state to define the integrated outer appearance of the cabinet 10 as a whole. Also, if necessary, the machine room module 20 may be disposed on an inner bottom surface of the cabinet 10.

Since the apparatus 1 for cultivating plants is installed in a built-in manner, the machine room module 20 may have a structure in which air for cooling and heat dissipation inside the machine room 200 is introduced and discharged forward.

That is, a front cover 22 may be disposed on the front surface of the machine room 200. The front cover 22 may be exposed forward below the door 13 to define the front surface of the machine room 200. The front cover 22 may have a shape of which a front surface protrudes and may have the same plane as the front surface of the door 13 when the door 13 is closed.

A grill portion 221 in which a plurality of openings is defined may be provided on the front cover 22. The grill portion 221 may be disposed over the entire front surface of the front cover 22. Also, air may be introduced into the machine room 200, and the air inside the machine room 200 may be discharged.

The cabinet 10 may be constituted by an outer case 11 defining an outer appearance thereof and an inner case 12 defining the cultivation space 100, and an insulator 101 may be disposed between the outer case 11 and the inner case 12 to thermally insulate the cultivation space 100. Thus, the cultivation space 100 may be maintained at a set temperature.

Each of the outer case 11 and the inner case 12 may be made of a metal material and may be provided by coupling a plurality of plate-shaped materials to each other. Particularly, the inner case 12 may have both side surfaces, a rear surface, and a top surface, each of which is provided in a metal plate shape, and may be coupled to each other to define the cultivation space 100.

A plurality of cultivation shelves 30 may be arranged vertically in the cabinet 10. In this embodiment, two upper and lower cultivation shelves 30 may be provided and may have the same structure. The cultivation shelves 30 may be respectively referred to as an upper cultivation shelf 30a and a lower cultivation shelf 30b for convenience of explanation and understanding. Alternatively, two or more cultivation shelves 30 may be further provided according to a size of the cabinet 10. Also, the cultivation shelf 30 may be configured to be inserted into and withdrawn from the inside of the cabinet 10 in a front and rear direction, and mounting of the seed package 90 including seeds of plants for cultivation and management and harvest of the plants may be easy.

The cultivation shelf 30 may have a structure in which a plurality of seed packages are mounted. Also, the cultivation shelf 30 may have a structure in which a plurality of the seed packages 90 are disposed in independent regions, respectively, so that the cultivation and harvest of the plants are possible.

For example, a plurality of seats 320 recessed in a shape corresponding to the seed package 90 may be disposed on the top surface of the cultivation shelf 30, and the seed package 90 desired by the user may be seated on the seat 320 to cultivate the plants.

Also, water may be supplied to the cultivation shelf 30 from the water tank 70, and the water supplied to the cultivation shelf 30 may be selectively supplied from the seat 320, on which the seed package 90 is disposed, of the plurality of seats 320 to the seed package 90.

Also, the water supplied to the cultivation shelf 30 may be completely drained after being sufficiently supplied to the seed package 90. Thus, the cultivation shelf 30 may be emptied for the rest of a time excluding a water supply time so as to be maintained in a clean state.

The water tank 70 may be disposed further below the cultivation shelf 30 and may be disposed at the lowermost side of the cultivation space 100. The water tank 70 may store water supplied to the cultivation shelf 30, and the water discharged from the cultivation shelf 30 may be collected. That is, a water supply module and a drain module may be provided between the water tank 70 and the cultivation shelf 30 so that water is circulated.

The water tank 70 may be exposed when the door 13 is opened so that a water level of the water tank 70 is checked from the outside. Also, the water tank 70 may be exposed to the front surface of the cultivation space 100 and be withdrawn out to supplement water. If necessary, nutrients required for growing plants may be put into the water tank 70. For example, the nutrients may be provided in a solidified form and thus may be gradually dissolved in water for a predetermined time and then supplied to the seed package 90 while maintaining an appropriate concentration of water in the water tank. Therefore, the water supplied from the water tank 70 may be a culture solution containing nutrients.

Also, a lighting device 40 for radiating light toward the top surface of the cultivation shelf 30 may be provided above the cultivation shelf 30. Also, a blower 50 for circulating internal air in the cultivation space 100 may be provided on the rear wall of the cultivation space 100.

A display 14 may be provided in the cultivation space 100. The display 14 may be configured to display an operating state of the apparatus 1 for cultivating plants and be provided at the front end of the lighting device 40, which is disposed at a lower side, of the plurality of lighting devices 40. Thus, the display 14 may be disposed at a position facing the rear surface of the door 13. Also, information output from the display 14 may be recognized through the door 13 and be identified at the outside even when the door 13 is closed.

The seed package 90 may be selected by a user, and the user may select and purchase a desired type of crop through aftermarkets. Also, the seed package 90 may be supplied in the form of delivery according to a user's order or may be supplied regularly by a manager. If necessary, the user may directly place and use seeds for cultivation in the seed package 90 provided.

The seed package 90 may be supplied not only in a shape accommodated in the seed, but also in a state in which the seed is germinated and sprouted, or a state in which a plant after a certain time elapses after the germination is disposed.

The user may cultivate the seed package 90, in which the desired crop is contained, by seating the seed package 90 on the cultivation shelf 30, and also may cultivate a different type of plant by placing different types of seed packages 90 on one cultivation shelf 30. Also, when the cultivation is completed or when replacement with another crop is desired, the seed package 90 may be removed or replaced from the seat 320.

Hereinafter, the structure of the seed package 90 will be described in more detail with reference to the drawings.

Figure 3:
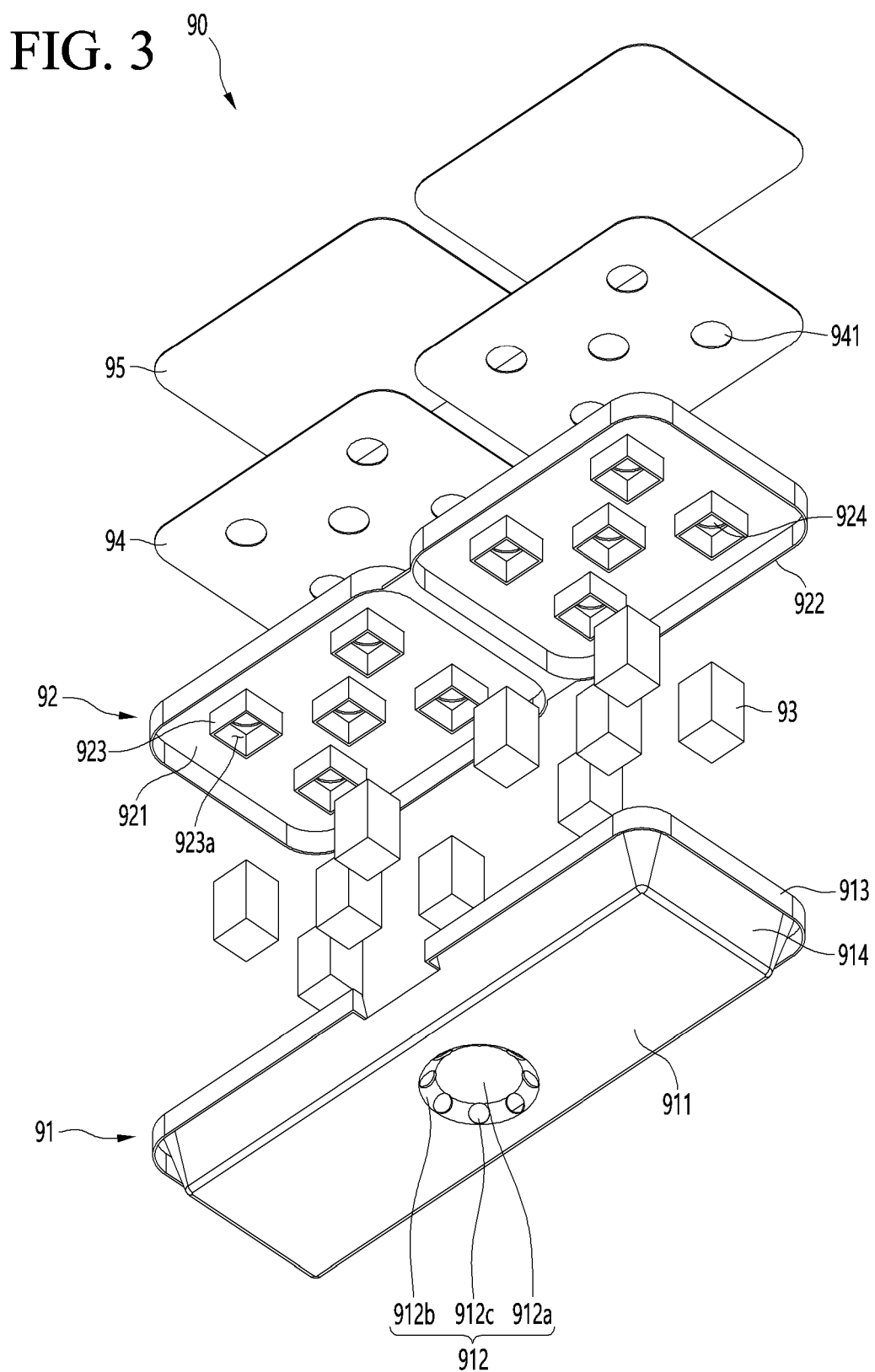
FIG. 3 is an exploded perspective view of a seed package that is put into the apparatus for cultivating plants.
Figure 4:
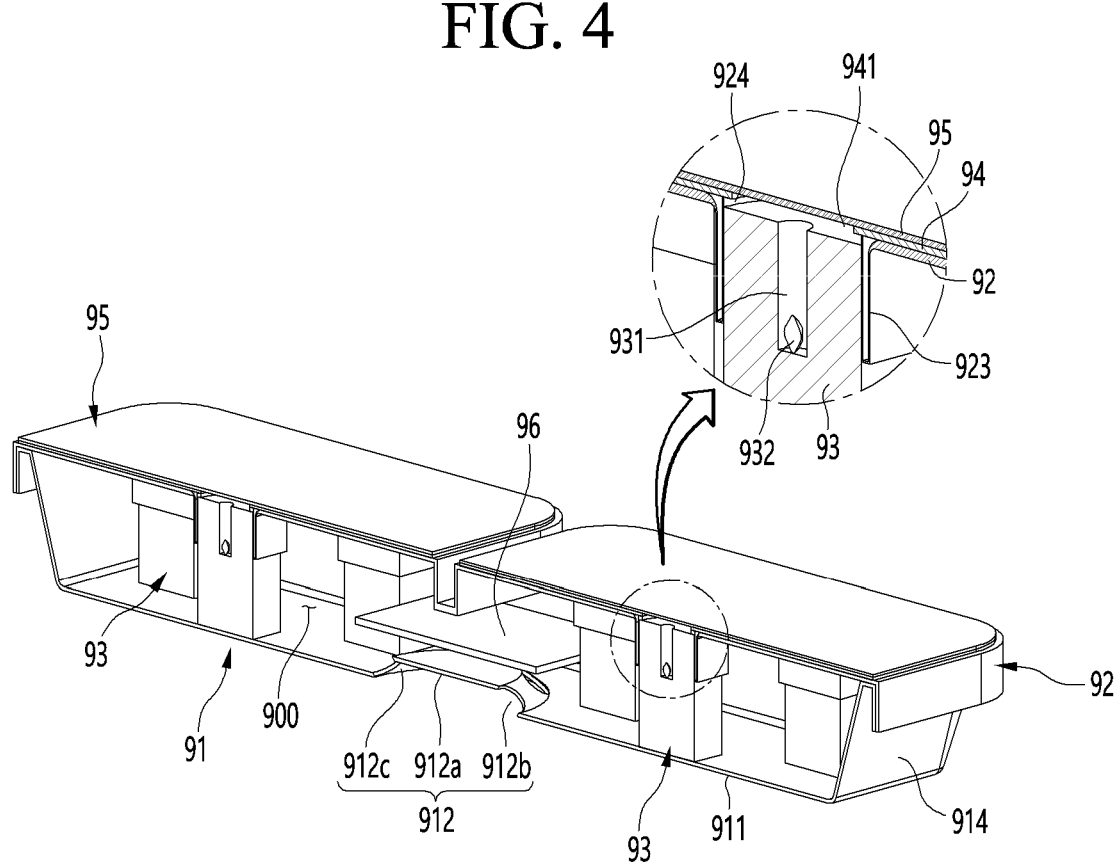
FIG. 4 is a cutaway perspective view taken along line IV-IV' of FIG. 2.

FIG. 3 is an exploded perspective view of the seed package that is put into the apparatus for cultivating plants. Also, FIG. 4 is a cutaway perspective view taken along line IV-IV' of FIG. 2.

As illustrated in the drawings, the seed package 90 may include a container 91 that defines a recessed accommodation space 900, a container cover 92 that shields an opened top surface of the container 91, and a plurality of seed accommodation members 93 provided in the accommodation space 900 to accommodate seeds.

In detail, the container 91 has a circumferential surface 914 extending upward along a circumference of a flat container bottom surface 911 and a container edge 913 bent outward from an upper end of the container circumferential surface 914.

The container bottom surface 911 may have a size corresponding to that of the seat 320, and thus, the container bottom surface 911 may be supported by a seat bottom surface 322. Also, the container circumferential surface 914 has a height greater than a depth of the seat 320 so that the container cover 92 shielding the container 91 is disposed above the top surface of the cultivation shelf 30.

A water inlet 912 may be provided on the bottom surface 911 of the container. The water inlet 912 may be recessed from the bottom surface of the container 91 to protrude from the container bottom surface 911 when viewed from the inner surface. The water inlet 912 may be provided at a center of the container 91 and be disposed at a position corresponding to the shutter 33. Therefore, when the seed package 90 is seated on the seat 320, the shutter 33 may be accommodated inside the seat 320, and water may be supplied into the seed package 90.

In detail, the water inlet 912 may include an inlet top surface 912a disposed above the container bottom surface 911 and an inlet circumferential surface 912b extending along a circumference of the inlet top surface 912a to extend up to the container bottom surface 911. A plurality of container openings 912c may be defined along the inlet circumferential surface 912b.

The inlet circumferential surface 912b may be inclined toward the outside as it extends downward. Also, the inlet circumferential surface 912b may have a height at which the inlet top surface 912a is capable of pressing the shutter 33 to open the shutter 33 when the seed package is seated on the seat 320.

The container cover 92 may include a plate-shaped cover plate 921 that shields the opened top surface of the container 91. Also, an accommodation member mounting portion 923 to which the seed accommodation member 93 is fixedly mounted may be disposed on a bottom surface of the cover plate 921. The accommodation member mounting portion 923 may protrude downward from the bottom surface of the container cover 92, and an opened insertion hole 923a may be defined in a lower end of the accommodation member mounting portion 923 so that an upper end of the seed accommodation member 93 is inserted. That is, the cross-sectional shape of the insertion hole 923a may correspond to a shape of a top surface of the seed accommodation member 93.

The seed accommodation member 93 may be provided in plurality, and the plurality of the seed accommodation members 93 may be disposed to be spaced apart from each other in the accommodation space 900 of the container 91. The seed accommodation member 93 may accommodate seeds 932 of plants to be cultivated and may absorb water supplied into the seed package 90 to supply the water to the seeds.

The seed accommodating member 93 may have a porous material or a network structure to facilitate the water absorption, and the water absorbed from the bottom by a capillary phenomenon may be transferred to the seeds. The seed accommodation member 93 may be made of various materials capable of absorbing moisture and maintaining a shape. For example, the seed accommodation member 93 may be made of a sponge material such as an oasis.

The cross-sectional shape of the seed accommodation member 93 may have a shape corresponding to the shape of the accommodation member mounting portion 923. The seed accommodation member 93 may be provided in a hexahedral shape and have an upper end inserted into the accommodation member mounting portion 923 and a lower end configured to be supported by the bottom surface 911 of the container.

Also, an accommodation groove 931 recessed downward may be defined in the top surface of the seed accommodation member 93. The seeds 932 may be accommodated inside the accommodation groove 931, and a recessed lower end of the accommodation groove may be defined at one side that is away from the container bottom surface 911. The accommodation groove 931 may be recessed downward, but may be defined higher than a maximum level of the water accommodated in the container 91. Thus, the seeds inside the accommodation groove 931 may be prevented from being immersed in water. Also, when the seeds 932 are germinated, the plants may be grown along the accommodation groove 931, and roots may be grown to pass through the seed accommodation member 93.

That is, soil or medium containing nutrients may not be accommodated in the container 91, and only water containing nutrients may be supplied into the seed package 90 after the seed package 90 is mounted on the cultivation shelf. Thus, the inside of the seed package 90 may be prevented from being contaminated by mold or green algae.

Also, the inside of the seed package 90 may be maintained in a state in which water does not exist in the seed package 90 by draining the water through the cultivation shelf 30. Thus, contamination does not occur in the seed package 90 and the cultivation shelf 30.

As described above, components such as medium or soil for supplying the nutrients may not be filled inside the seed package 90. Also, the seed accommodation members 93 may be spaced apart from each other in the container 91 so that a corresponding portion of the accommodation space 900 in the container 91 is empty. Thus, both a flow of water supplied into the inside of the container 91 and a flow of the water discharged from the inside of the container 91 may be smoothly performed.

Also, a shielding member 96 may be provided on the water inlet 912. The shielding member 96 may be made of a material such as fabric or paper or may be made of a net material such as mesh to allow the water to pass therethrough. The shielding member 96 may be provided to cover the water inlet 912, thereby preventing the root of the plant growing through the seed accommodation member 93 from blocking the water container opening 912*c*.

A cover hole 924 may be defined in the container cover 92 corresponding to the accommodation groove 931. The cover hole 924 may be disposed inside the accommodation member mounting portion 923, and the accommodation groove 931 and the cover hole 924 may communicate with each other. Thus, a stem germinated from the seed may pass through the cover hole 924 via the accommodation groove 931 and then be exposed to the outside of the container cover 92.

The container 91 may be divided into both sides based on the water inlet 912, and different crops may be cultivated at both sides. Both the sides of the water inlet 912 may have a symmetrical shape, and the seed accommodation member 93 may also have a symmetrical arrangement.

Also, the container cover 92 may be divided into both sides based on a center thereof and may have a shape in which both the sides are symmetrical with respect to the center of the container cover 92. Thus, when viewed from above, it is possible to confirm that the seed package 90 is divided into two areas.

A cover edge 922 may be disposed along a circumference of the cover plate 921 of the container cover 92, and the cover edge 922 may be in contact with the container edge 913 to couple the container cover 92 to the container 91. Also, the container cover 92 may also be divided into two areas based on the center, and the cover edge 922 may extend along the two areas divided by the container 91. Thus, the container cover 92 may define a space that is partitioned into both the sides by the cover edge 922.

A reflective sheet 94 may be attached to the top surface of the container cover 92. The reflective sheet 94 may be provided in the form of a sheet capable of reflecting light radiated from the lighting device 40, and the seed package 90 may be prevented from increasing in temperature through the reflection of the light. Also, a sheet hole 941 which is cut or penetrated at a position corresponding to the cover hole 924 may be defined in the reflective sheet 94. Thus, the stem from which the seed is germinated may be exposed to the outside through the container cover 92 and the sheet hole 941.

Also, the cover sheet 95 may be attached to the top surface of the container cover 92. The cover sheet 95 may be disposed above the reflective sheet 94 and be attached to the cover edge 922 or adhere to the reflective sheet 94.

The cover sheet 95 may seal the top surface of the container cover 92 when packaging and transporting the container 91 to prevent the seed package 90 from being damaged, prevent the seeds accommodated in the seed package 90 from being discharged to the outside, prevent the inside of the seed package 90 from being contaminated due to the introduction of the external contaminants.

Also, the type of crops to be cultivated and related cultivation information may be printed on the cover sheet 95. Thus, the user may acquire information necessary for cultivation of the plant by using the information displayed on the cover sheet 95. For example, the information may be displayed in a manner such as a barcode or QR-code, and the information may be obtained through a mobile phone or a reader of the apparatus 1 for cultivating plants itself.

To cultivate the plants using the apparatus 1 for cultivating plants, the cover sheet 95 of the seed package 90 may be removed, and the seed package 90 may be seated on the seat 320 of the cultivation shelf 30. Also, an operation of the apparatus 1 for cultivating plants may be set using the information on the cover sheet 95, and the operation of the apparatus 1 for cultivating plants may be controlled according to the setting.

The seed package 90 may be disposed so that both sides thereof are symmetrical with respect to the center thereof. Thus, it is possible to cultivate different types of crops at both the sides of the seed package 90 based on the water inlet 912. That is, it is possible to cultivate different types of crops within one seed package 90.

Also, in the state in which the seed package 90 is seated on the cultivation shelf 30, the shutter 33 may be disposed at the center of the seed package 90. That is, the accommodation space 900 may be disposed on both the sides of the seed package 90 with respect to the shutter 33. Thus, areas on which plants are grown on the seed package 90 may be disposed on both sides of the shutter 33. Due to this structure, water may be uniformly supplied to both the sides of the seed package 90 through one shutter 33.

Also, since the shutter 33 is disposed at a position corresponding to the center of the seed package 90, the seed package 90 may be mounted in a desired direction regardless of the mounted direction of the seed package 90, and when seated, water may be uniformly supplied to cultivation areas at both the sides thereof.

Also, the container cover 92 may also be divided into both sides based on the center and be provided in a symmetrical shape. Also, the cover sheet 95 may be provided in two and be attached to both the sides of the container cover 92, respectively. Therefore, the user may check the crops grown by using the cover sheet 95.

Hereinafter, the internal structure of the apparatus 1 for cultivating plants will be described in more detail with reference to the drawings.

Figure 5:
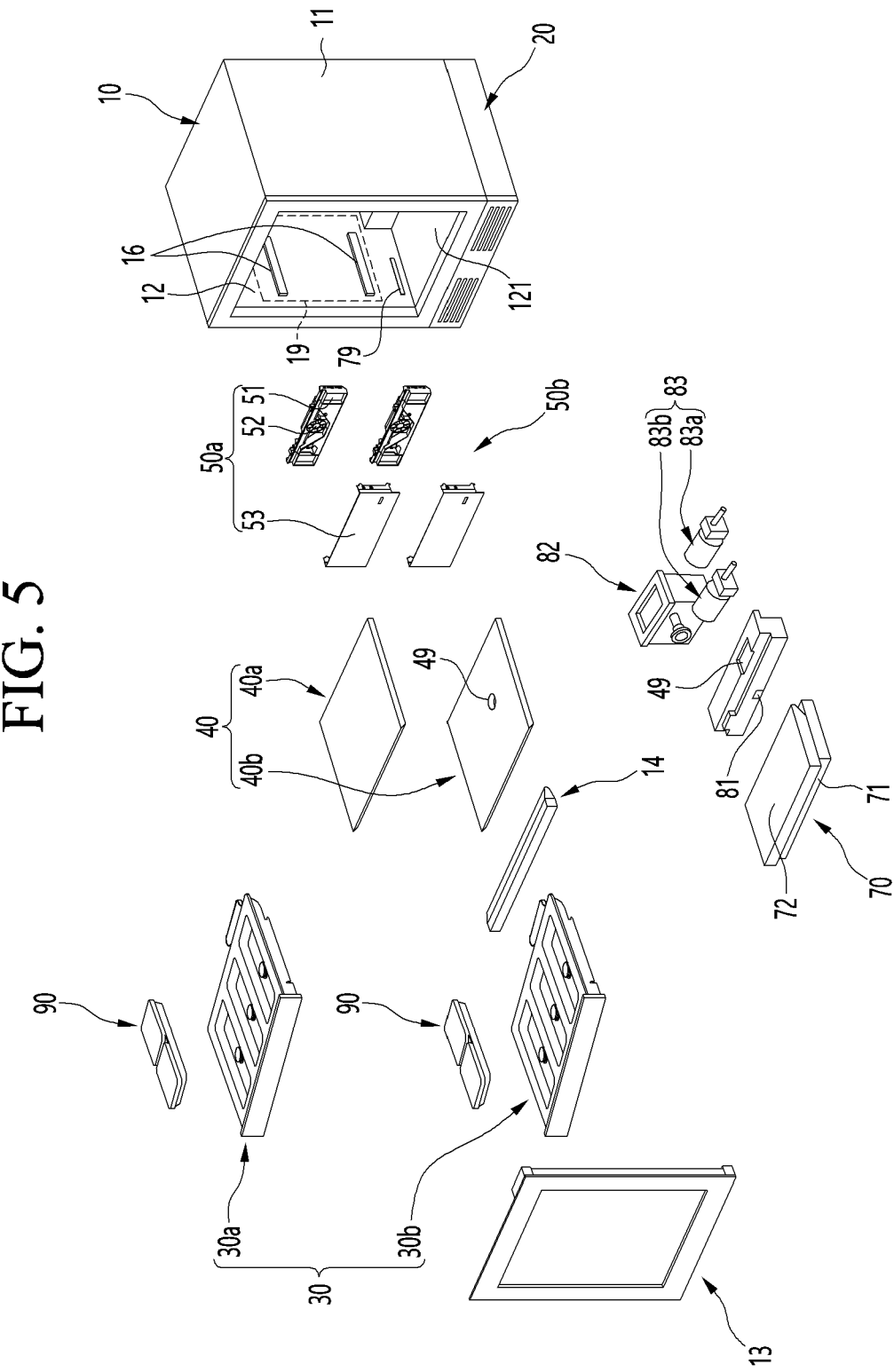
FIG. 5 is an exploded perspective view of the apparatus for cultivating plants.
Figure 6:
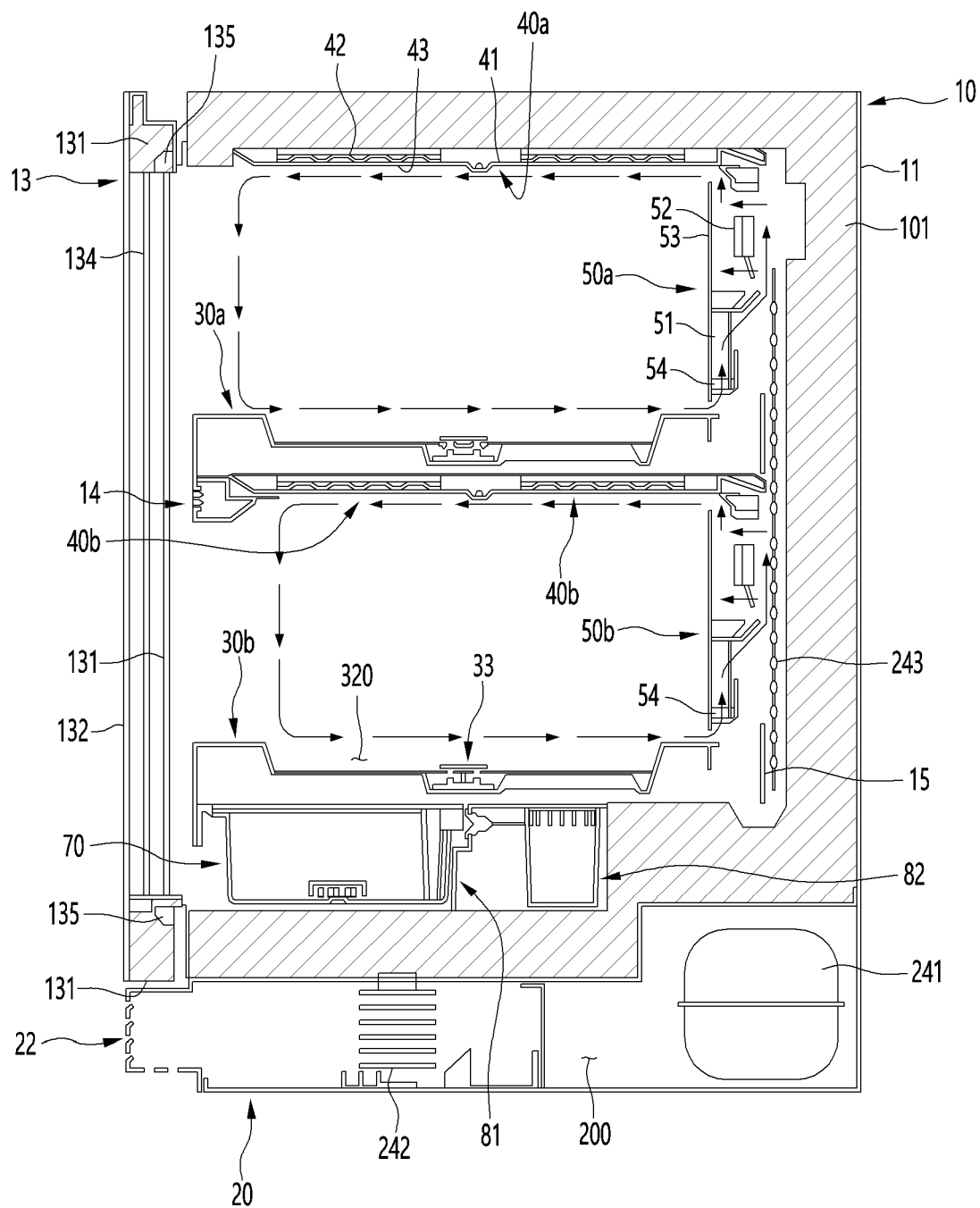
FIG. 6 is a cross-sectional view illustrating an internal structure of the apparatus for cultivating plants.

FIG. 5 is an exploded perspective view of the apparatus for cultivating plants. Also, FIG. 6 is a cross-sectional view illustrating an internal structure of the apparatus for cultivating plants.

As illustrated in the drawings, an evaporator 243 that generates cool air may be provided on a rear wall of the cultivation space 100, and a blower 50 may be provided in front of the evaporator 243. Thus, air within the cultivation space 100 may be circulated by an operation of the blower 50, and thus, the inside of the cultivation space 100 may be maintained to a set temperature.

In detail, the internal temperature of the cultivation space 100 may be controlled by a refrigeration cycle. Here, the evaporator 243 may be disposed on an inner rear wall of the cultivation space 100. The evaporator 243 may be provided with a roll bond-type heat exchanger and may be referred to as a heat exchanger. The evaporator 243 may have a plate-shaped structure that is easily attached to the rear wall of the cultivation space 100. Also, the evaporator 243 may minimize a loss of the cultivation space 100 due to the plate-like structure and also may be close to the cultivation space 100 to effectively control a temperature of the cultivation space 100.

A heater 19 may be provided on one wall surface of the cultivation space 100. Thus, heating and cooling of the cultivation space 100 may be performed. The inside of the cultivation space 100 may be maintained to a temperature that is suitable for the growth of plants (e.g., about 18° C. to about −28° C.) by the evaporator 243 and the heater 19. If necessary, a configuration for heating other than the heater 19 may be provided, and various heating methods such as the heating structure using a hot gas through a direction change of the refrigeration cycle may be performed. The temperature inside the cultivation space 100 may be sensed by an internal temperature sensor and may be maintained to a temperature that is suitable for crops to be cultivated.

As described above, components including the evaporator 243, the compressor 241, and the condenser 242, which are configured to control the temperature of the cultivation space 100, may be referred to as a temperature control device. The temperature control device may further include the heater 19.

The inside of the cultivation space may be divided into an upper space, in which an upper blower 50a is disposed, and a lower space, in which a lower blower 50b is disposed. Here, the inside of the cultivation space may be dived by the cultivation shelf 30. The blowers 50 that are vertically disposed have the same structure and shape, but only different from each other in their mounted positions. That is, the blower 50 may be provided as many as the number corresponding to the number of the cultivation shelves 30 and may blow air forward from a rear side of the cultivation shelf 30. Thus, the air may be independently circulated in the spaces inside the cultivation space 100 by being partitioned by the cultivation shelf 30.

As illustrated in FIG. 6, the air inside the cultivation space 100 may be circulated by the blower 50, and in particular, the circulated air may pass through the rear wall surface of the evaporator 243, and thus, the entire inside of the cultivation space 100 may have a uniform temperature and be quickly controlled in temperature. Also, the air circulated by the blower 50 may flow while passing through the top surface of the cultivation shelf 30 and the bottom surface of the lighting device 40.

The air flowing by the blower 50 may pass through the top surface of the cultivation shelf 30 to allow respiration of the plants grown on the cultivation shelf 30 to be smoother and also allows the plants to be properly shaken, thereby controlling stress so that an optimum airflow required for growth is provided. Also, the air flowing by the blower 50 may pass through the bottom surface of the lighting device 40 to prevent the lighting device 40 from being overheated.

The blower 50 as a whole may include a blowing guide 51 mounted in front of the evaporator 243, a blowing fan 52 mounted on the blowing guide 51, and a cover plate 53 covering the blowing guide 51.

The blowing fan 52 may be mounted at a center of the blowing guide 51, and when the blowing fan 52 is driven, air may flow smoothly from the bottom to the top. Also, a lower end of the blowing guide 51 may be spaced apart from the top surface of the cultivation shelf 30, and an upper end of the blowing guide 51 may be spaced apart from a bottom surface of the lighting device 40. Thus, when the blower fan 52 is driven, the blowing guide 51 may guide air so that the air is suctioned along the top surface of the cultivation shelf 30 and discharged along the bottom surface of the lighting device 40.

Also, a deodorizing member 54 may be provided on a lower end of the blowing guide 51. The deodorizing member 54 may be provided as a filter made of a deodorant material or may be made of a porous material through which air passes. In addition, the deodorizing member 54 may be provided on a path through which air is suctioned to remove and collect odor generating factors in the air of the cultivation space 100. An odor may not be generated in the cultivation space 100 by the deodorizing member 54, and a continuous deodorizing action may be achieved when the blower 50 is driven.

The blowing fan 52 may be provided in a box fan shape and may be configured to blow the cooled or heated rear air forward through the evaporator 243.

Also, the cover plate 53 may be disposed in front of the blowing guide 51 to shield the blowing guide 51, thereby preventing the blowing guide 51 from being exposed to the outside. The cover plate 53 may be coupled to the blowing guide 51, and the upper and lower ends of the cover plate 53 may be spaced apart from the lighting device 40 and the cultivation shelf 30, respectively, to provide an air inlet and an air outlet.

The cover plate 53 may define an inner surface of the cultivation space 100 exposed when the door 13 is opened. Also, an additional sub-plate 15 may be further provided at the rear side of the cultivation shelf 30 to prevent the evaporator 243 from being exposed when the cultivation shelf 30 is withdrawn.

The lighting device 40 may be provided above the cultivation shelf 30. The lighting device 40 may radiate light toward the cultivation shelf 30 to provide light that is necessary for plants. Here, an amount of light radiated by the lighting device 40 may be set similar to sunlight, and an amount of light and a radiation time optimized for the plant to be grown may be set.

The lighting device 40 may be provided in number corresponding to the number of cultivation shelves 30 and may be provided above each cultivation shelf 30. For example, the lighting device 40 may include an upper lighting device 40a provided in an upper space partitioned by the cultivation shelf 30 and a lower lighting device 40b provided in a lower space partitioned by the cultivation shelf 30. The upper lighting device 40a may be mounted on the top surface of the cultivation space 100, and the lower lighting device 40b may be mounted on the bottom surface of the upper cultivation shelf 30a.

That is, the upper lighting device 40a and the lower lighting device 40b may be disposed vertically above the cultivation shelf 30, which are disposed therebelow, to radiate light toward the cultivation shelf 30, thereby controlling the growth of the cultivated plants.

The lighting device 40 may include an LED module 42 including a plurality of LEDs 421 (see FIG. 17), a light case 41 on which the LED module 42 is mounted, and a light cover 43 which shields the LED module 42 and through which light is transmitted. The plurality of LEDs 421 may be provided so as to provide a sufficient amount of light to the cultivation shelf 30 and may be widely distributed above the cultivation shelf 30. The LED module 42 may be configured in a state in which the plurality of LEDs 421 are mounted on a substrate, and the plurality of LED modules 42 including the plurality of LEDs 421 may be disposed.

Also, the plurality of LEDs 421 may be disposed to provide a uniform amount of light to the entire top surface of the cultivation space 100 in consideration of the reflection from the inside of the cultivation space 100. Therefore, intervals between the LEDs 421 may not be all the same.

Also, the plurality of LEDs 421 may be shielded by the light cover 43, and the light radiated from the LEDs 421 may be diffused in a process of passing through the light cover 43. As a result, the lighting device 40 may emit light in the form of surface plate, and bright spots such as light condensation at a portion corresponding to the LEDs 21 may be prevented from occurring.

The water tank 70 may be provided on a bottom surface inside the cabinet 10. The water tank 70 may store water supplied to the cultivation shelf 30 and water collected from the cultivation shelf 30. The water tank 70 may be disposed below the cultivation shelf 30, which is disposed at the lowermost side, among the plurality of the cultivation shelves 30 and may be disposed in front of a position corresponding to the front end of the cultivation shelf 30.

A length of the water tank 70 in a horizontal direction may correspond to a width of the inner space of the cabinet 10. Also, a length of the water tank 70 in a vertical direction may correspond to a distance between the cultivation shelf 30, which is disposed at the lowermost side, and the bottom surface of the cultivation space 100. That is, the water tank 70 may be provided to fill an entire space below the lower cultivation shelf 40b disposed at the lowermost side, and a space behind the water tank 70 may be covered by the water tank 70.

A pump cover 81 may be provided in the rear space covered by the water tank 70. A pump 83 supplying water of the water tank 70 to the cultivation shelf and a sub tank provided between the water tank 70 and the pump 83 may be further provided in the pump cover 81.

The pump 83 may be configured to supply water to the cultivation shelf 30 and be connected to an outlet of the sub tank 82. Also, the pump 83 may be provided as many as the number corresponding to the cultivation shelf 30. That is, the pump 83 may include an upper pump 83a supplying water to the upper cultivation shelf 30a and a lower pump 83b supplying water to the lower cultivation shelf 30b. Also, the upper pump 83a and the lower pump 83b may be connected to water supply pipes 84 that are directed to the upper cultivation shelf 30a and the lower cultivation shelf 30b to independently supply water to the upper cultivation shelf 30a and the lower cultivation shelf 30b, respectively.

Alternatively, only one pump 83 may be provided. In this case, the pump 83 may be connected to a switching valve so that the water discharged from the pump 83 is selectively supplied to the upper cultivation shelf 30a and the lower cultivation shelf 30b.

The sub tank 82 may be disposed at a side of the pump 83 to connect the water tank to the pump 83. The sub tank 82 may be disposed on a path through which water of the water tank 70 is supplied to the pump 83 and may be always maintained at a constant water level. Thus, an accurate operation of the pump 83 may be ensured, and a quantity of water may be supplied to the cultivation shelf 30.

The water tank 70 may be disposed to be able to be withdrawn and inserted, and thus, the water tank 70 and the sub tank 82 may be separated from each other when the water tank is withdrawn. In a state in which the water tank 70 is completely mounted, the water tank 70 and the sub tank 82 may be connected to each other to supply water.

Also, although not shown, a water supply module supplying water to the cultivation shelf 30 and a drain module draining the water of the cultivation shelf 30 to the water tank 70 may be disposed at both left and right surfaces of the cabinet 10. The water circulation between the water tank 70 and the cultivation shelf 30 may be possible by the water supply module and the drain module.

The water tank 70 may be provided inside the cultivation space 100 so as to be accessible in the front and rear directions. Also, the water tank 70 may include a tank body 71 defining a space in which water is stored and a tank cover 72 that opens and closes a top surface of the tank body 71. Thus, the water tank 70 may have a structure in which the water tank 70 is opened in the withdrawn state to allow additional water supply.

Also, nutrients required for the plant cultivation may be supplied to the water tank by opening the tank cover 72, and thus, the nutrients together with water may be supplied to the cultivation shelf 30. Therefore, even if the seed package 90 itself does not contain the nutrients, the nutrients may be effectively supplied to the seeds. Thus, the water circulated between the water tank 70 and the cultivation shelf 30 may be water that is in a state containing the nutrients and thus may be referred to as a nutrient solution or a culture solution.

The display 14 may be provided on the front surface of the cultivation space 100. The display 14 may be provided with a manipulation portion through which a user's manipulation is input to set or input an overall operation of the apparatus 1 for cultivating plants.

A machine room module 20 may be provided below the cabinet 10. The machine room module 20 may be coupled to the bottom surface of the cabinet 10, and components including the compressor 241 and the condenser 242 constituting the refrigeration cycle may be disposed therein.

The machine room module 20 may be coupled to the cabinet 10 in a state in which the compressor 241 and the condenser 242 are installed therein. Also, in a state in which the machine room module 20 and the cabinet 10 are coupled to each other, a pipe connecting the evaporator 243 to the compressor 241, which are provided inside the cabinet 10, may be connected to each other to allow the refrigeration cycle to operate.

Hereinafter, the structure of the machine room 200 will be described in more detail with reference to the drawings.

Figure 7:
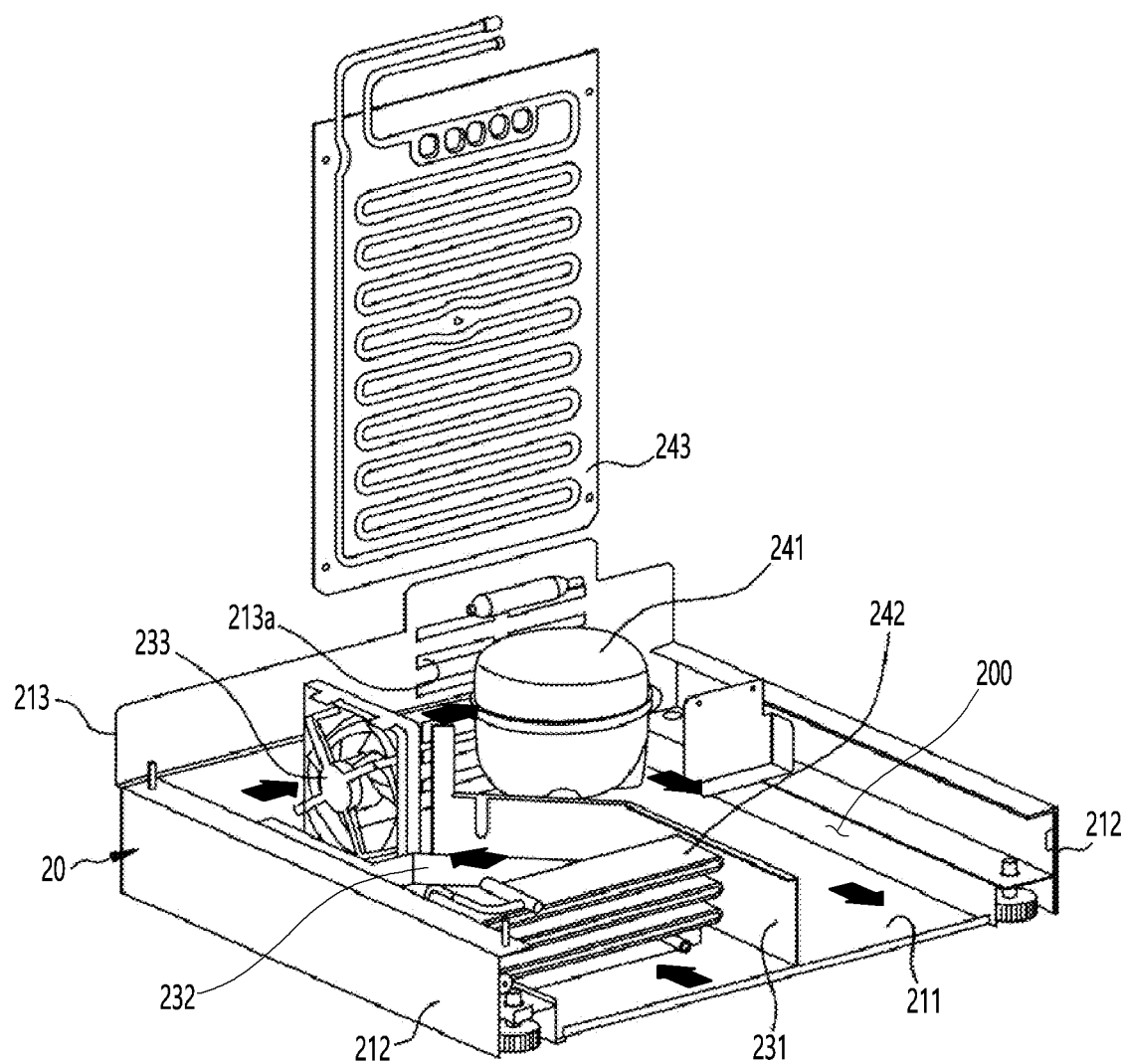
FIG. 7 is a perspective view of a seed package that is put into the apparatus for cultivating plants.

FIG. 7 is a perspective view of the seed package that is put into the apparatus for cultivating plants.

As illustrated in the drawings, the machine room module 20 may be mounted on the bottom surface of the cabinet 10 to define a space of the machine room 200, which is independent from the cultivation space 100 under the cabinet 10. The machine room module 20 may be constituted by a machine room lower plate 211 defining a bottom surface, a pair of machine room side plates 212 defining both side surfaces, and a machine room rear plate 213 defining a rear surface.

The machine room lower plate 211, the machine room side plate 212, and the machine room rear plate 213 may be coupled to each other to constitute a single module, which may be referred to as a machine room frame. A space defined by the machine room frame may be defined so that a top surface and a front surface thereof are opened. Thus, the machine room frame may be coupled to the bottom surface of the cabinet 10 to define the machine room 200 under the cabinet 10. That is, the bottom surface of the cabinet 10 and the top surface of the machine room 200 may be shared.

The inside of the machine room module 20 may be partitioned by a barrier 231. The barrier 231 may extend backward from the opened front end of the machine room module 20. The condenser 242 may be provided in a left space partitioned by the barrier 231, and a compressor 241 may be provided in a right space partitioned by the barrier 231. Also, a heat dissipation fan 233 for forcibly flowing air from the left side to the right side may be provided on a rear end of the barrier 231.

A front cover 22 may be provided on the opened front surface of the machine room module 20. The front cover 22 may shield the opened front surface of the machine room module 20, and a grill portion 221 may be disposed on the front surface of the front cover 22. The grill portion 221 may define an opening, through which air is injected and discharged, such as a grill.

Thus, when the heat dissipation fan 233 is driven, external air may be suctioned to flow to the left space of the machine room module 20 through a left side of the grill portion 221, and the suctioned air may pass through the condenser 242 and then be heat-exchanged with a refrigerant in the condenser 242 to dissipate heat of the condenser 242. Also, the air passing through the heat dissipation fan 233 may cool the compressor 241 while passing through the compressor 241. Also, the air passing through the compressor 241 may be discharged forward through the right side of the grill portion 221.

That is, while the apparatus 1 for cultivating plants is installed, external air may be suctioned, and the air inside the machine room module 20 may be discharged at the front side while passing through the front cover 22. Thus, the apparatus 1 for cultivating plants may be installed in a space in which both the left and right sides and the rear surface are blocked. Particularly, even if the apparatus 1 for cultivating plants is installed in a furniture such as a sink, the cooling and heat exchange of the compressor 241 and the condenser 242 in the machine room module 20 may be effectively performed.

The evaporator 243 constituting the refrigeration cycle may be provided inside the cabinet 10 and also be disposed vertically on the rear surface of the cultivation space 100 so as to be easily connected to the components inside the machine room module 20 by a refrigerant pipe.

A condensed water receiver 232 from which condensed water generated in the evaporator 243 or defrosting water generated during defrosting is discharged may be provided in the machine room module 20. Also, at least a portion of the condenser may be disposed inside the condensed water receiver 232, or the refrigerant pipe connected to the condenser 242 may be disposed inside the condensed water receiver 232 to evaporate water inside the condensed water receiver 232.

Hereinafter, the internal structure of the cabinet 10 will be described in more detail with reference to the drawings.

Figure 8:
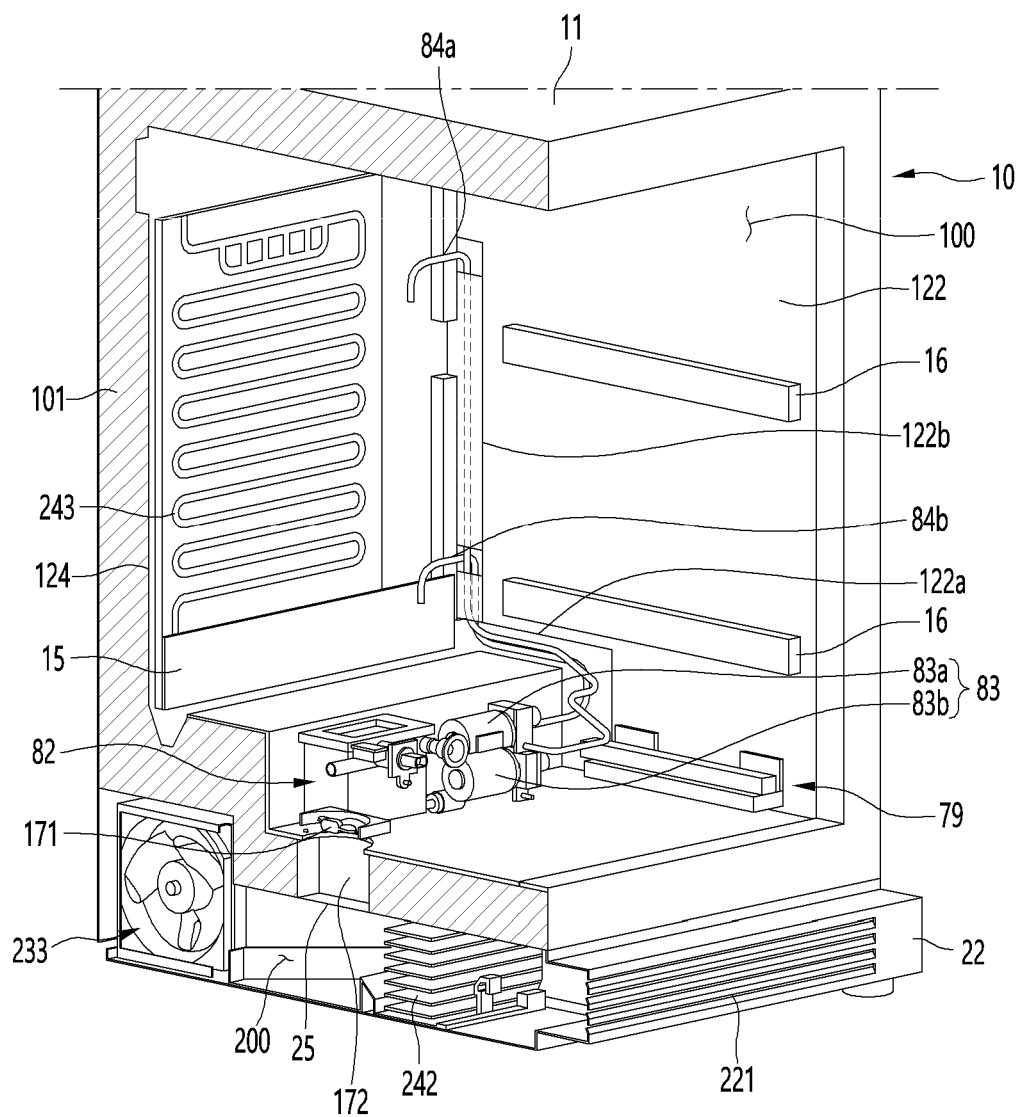
FIG. 8 is a cutaway perspective view illustrating an internal structure of the apparatus for cultivating plants.

Also, FIG. 8 is a cutaway perspective view illustrating the internal structure of the apparatus for cultivating plants.

As illustrated in the drawing, the cabinet 10 may define the cultivation space 100 by an inner case 12.

The inner case 12 may include a bottom plate 121 defining a bottom surface of the cultivation space 100, a pair of side plates 122 defining left and right surfaces of the cultivation space 100, a top plate 123 defining a top surface of the cultivation space 100, and a back plate 124 defining a rear surface of the cultivation space 100.

The inner case 12 may be provided by at least one or more metal plates, for example, the inner case 12 may be made of an aluminum material. The inner case 12 may be provided by coupling the bottom plate 121, the side plate 122, the top plate 123, and the back plate 124 to each other.

The bottom plate 121 may define the bottom surface of the cultivation space 100 and have a shape of which a rear portion is stepped with a higher height. The rear portion of the bottom plate 121, which has a relatively high height, may be a portion corresponding to an arrangement position of the compressor 241 to secure an installation space of the compressor 241 inside the machine room 200.

Also, the sub tank 82 and the pump 83 may be disposed in the first half of the bottom plate 121 having the relatively low height and may be shielded by the pump cover 81. A ventilation fan 171 may be provided in a space inside the pump cover 81, and an exhaust duct 172 through which a bottom surface of the cultivation space 100 and the machine room 200 communicate with each other may be provided under the ventilation fan 171. Thus, air inside the cultivation space 100 may be exhausted to the machine room 200, and external air may be introduced into an inlet provided in the other wall of the cabinet 10 to supply carbon dioxide required for the plant growth.

The water tank 70 may be disposed in front of the pump cover 81. The water tank may be disposed to be accessible inside the cultivation space 100. For this, a tank rail 79 for the accessible water tank 70 may be provided on each of both sides of the side plate 122. The tank rail 79 may have a structure extending in multiple stages, and when the water tank 70 is completely withdrawn, the tank cover 72 may be withdrawn by a distance at which the tank cover 72 is capable of being opened and closed. Also, when the water tank 70 is completely inserted, the water tank 70 may be connected to the sub tank 82 and the drain module.

A water supply pipe guide portion 122a may be disposed on the side plate 122 at the right side of the side plate 122. The water supply pipe guide portion 122a may be configured to guide the water supply pipe 84 that is directed to the cultivation shelf 30 and may be provided to be recessed so that the water supply pipe 84 is accommodated.

The water supply pipe guide portion 122a may extend backward along a lower end of the side plate 122 and may extend upward from a rear end of the side plate 122. Also, a guide portion cover 122b may be disposed on the water supply pipe guide portion 122a to shield a portion of an opened front surface of the water supply pipe guide portion 122a. The guide portion cover 122b may be configured to shield the water supply pipe guide portion 122a extending in the vertical direction along the rear end of the side plate 122, and the water supply pipe 84 accommodated therein may not be exposed to the outside.

Also, a water supply pipe fixing portion may be further disposed on the guide portion cover 122b. The water supply pipe fixing portion may fix an end of the water supply pipe 84 through which water is discharged so as to be disposed on the water supply portion 316 of each of the upper and lower cultivation shelves 30a and 30b. Thus, the position of the outlet of the water supply pipe 84 may be fixed, and water may be supplied to the cultivation shelf 30 at an accurate position.

The water supply pipe 84 may have a metal tubular shape and include an upper water supply pipe 84a, which is connected to the upper pump 83a to supply water to the upper cultivation shelf 30a, and a lower water supply pipe 84b, which is the lower pump 83b to supply water to the lower cultivation shelf 30b.

The sub tank 82, the pump 83, and the water supply pipe 84, which are disposed to supply water to the cultivation shelf 30, may be referred to as a water supply module, and the water supply module may be provided in the inner space and the sidewall of the cultivation space 100 so as not to be exposed to the outside in a normally used state.

Particularly, the water supply pipe 84 may be in a state of being accommodated in the water supply pipe guide portion 122a disposed on the side surface of the cultivation space 100 and may not be exposed to the outside by the guide portion cover 122b. Also, an end of the water supply pipe 84 adjacent to the cultivation shelf 30 may be covered by the cover plate 53 of the blower 50.

Also, a drain module may be disposed at the other side facing one side of the cultivation space 100 in which the water supply module is disposed. That is, the water supply module and the drain module may be disposed on both left and right sides based on the cultivation shelf 30, respectively.

The evaporator 243 may be mounted on the back plate 124. The evaporator 243 may be provided in a plate shape and may be disposed to occupy most of the rear wall surface of the cultivation space 100. Also, the blower 50 may be provided in front of the evaporator 243.

Also, the lighting device 40 may be provided on the bottom surface of the top plate 123. The upper lighting device 40a disposed at the uppermost side of the lighting device 40 may be fixedly mounted on the bottom surface of the top plate 123. Also, the lower lighting device 40b may be disposed below the upper cultivation shelf 30a.

The cultivation shelf 30 may be disposed so as to be accessible to the side plates 122 disposed at both sides thereof. The side plate 122 may be provided with a shelf rail 16 extending in multiple stages, and each of both side surfaces of the cultivation shelf 30 may be coupled to the shelf rail 16. Thus, the cultivation shelf 30 may be accessible in the front and rear direction, and thus, it is easy to harvest and manage the plants grown on the cultivation shelf 30, and it is easy to install and remove the seed package 90.

Hereinafter, the arrangement of the cultivation shelf 30 and the water supply module and the drain module will be described in more detail with reference to the drawings.

Figure 9:
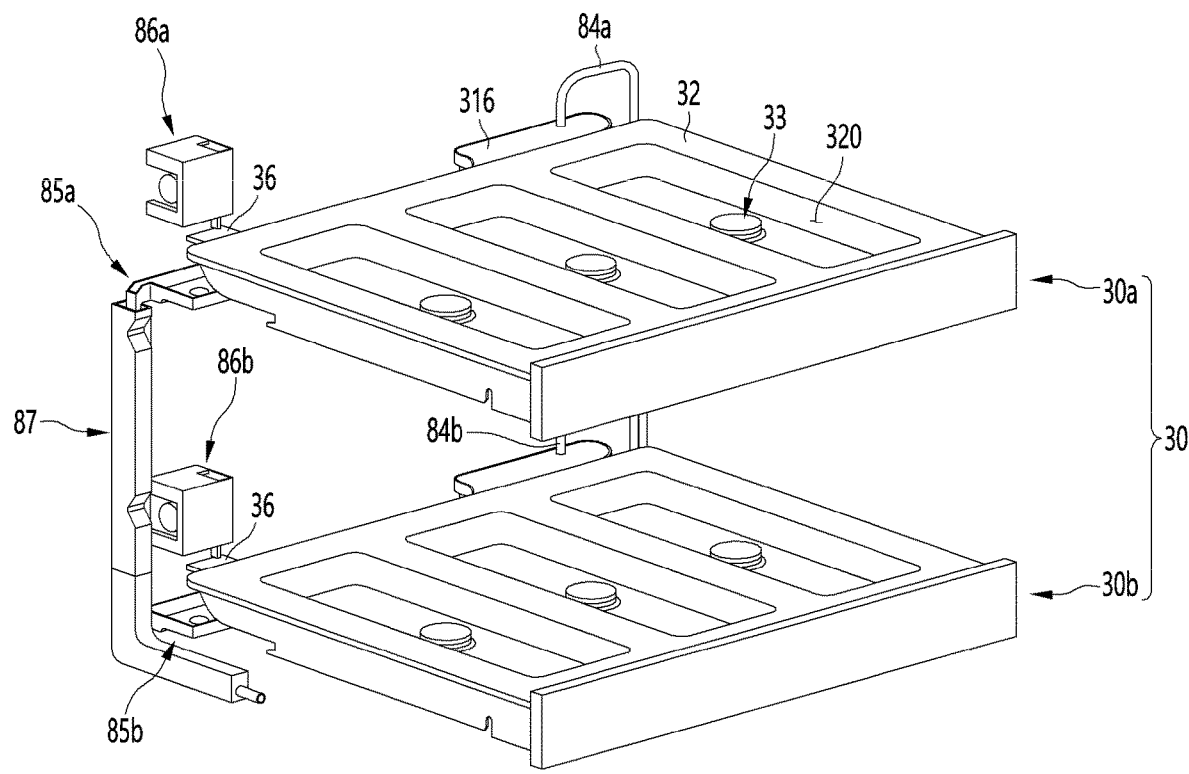
FIG. 9 is a perspective view illustrating a cultivation shelf and water supply and drain modules, each of which is one component of the apparatus for cultivating plants.
Figure 10:
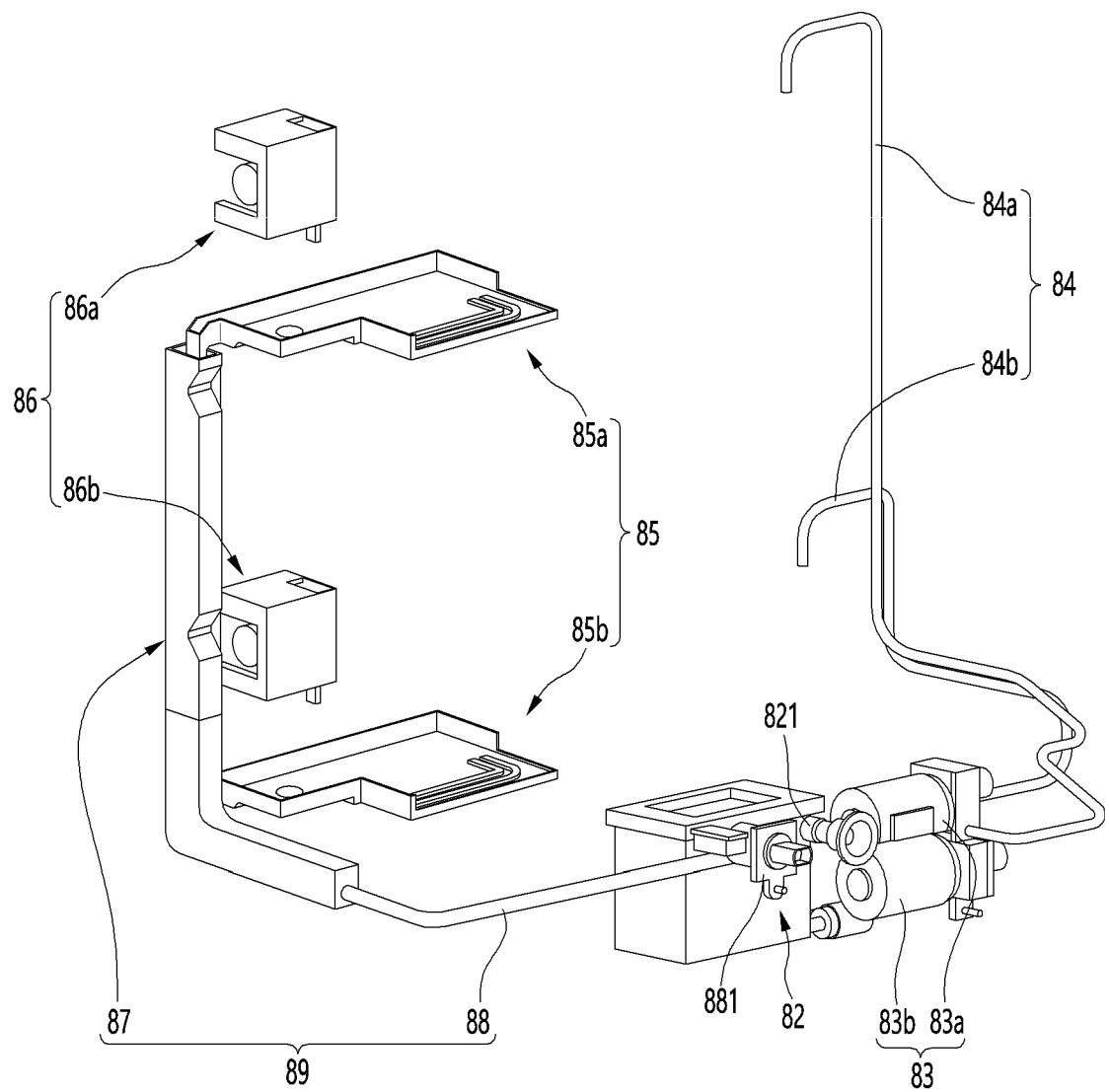
FIG. 10 is a perspective view of the water supply module and the drain module.
Figure 11:
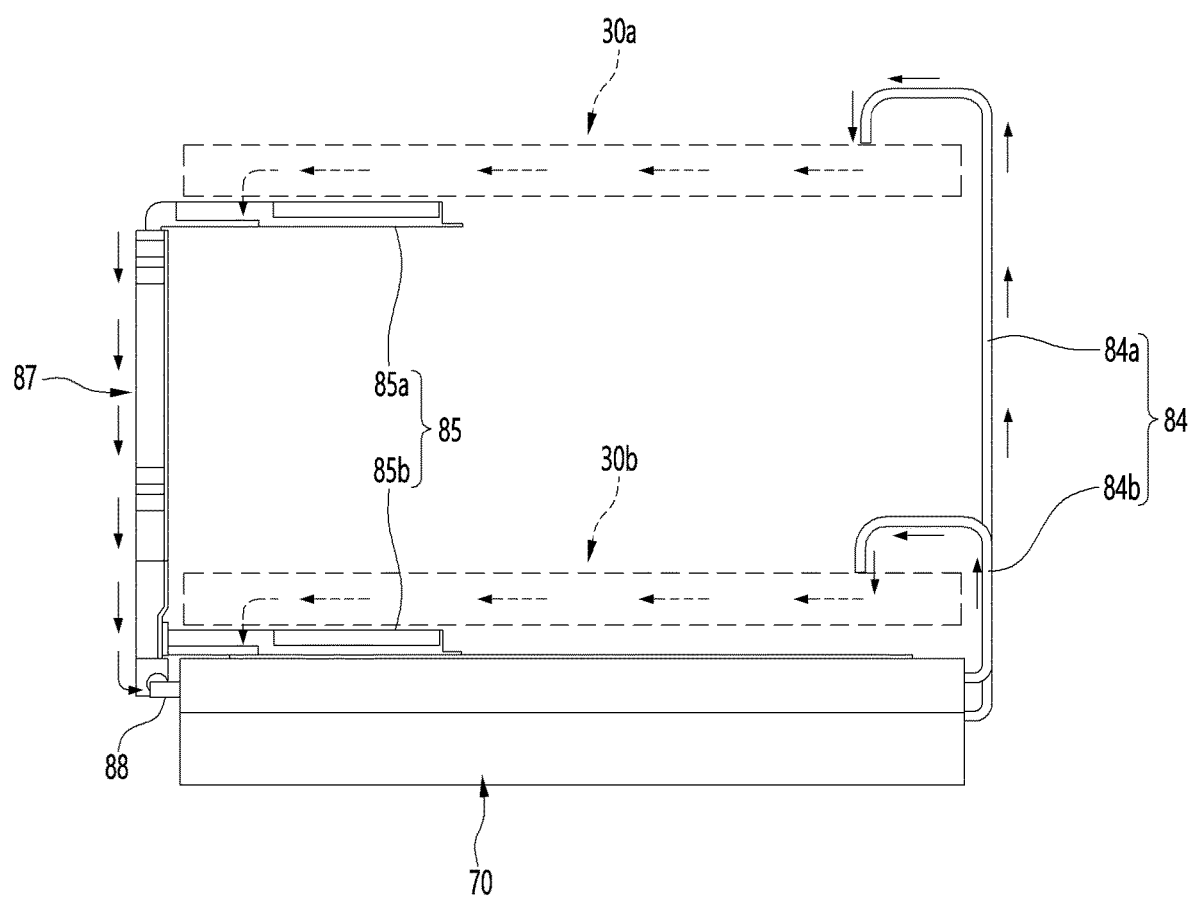
FIG. 11 is a view illustrating a flow state of water between the cultivation shelf and a water tank.

FIG. 9 is a perspective view illustrating the cultivation shelf and the water supply and drain modules, each of which is one component of the apparatus for cultivating plants. Also, FIG. 10 is a perspective view of the water supply module and the drain module. Also, FIG. 11 is a view illustrating a flow state of water between the cultivation shelf and the water tank.

As illustrated in the drawings, the plurality of cultivation shelves 30 may be arranged vertically. For example, the cultivation shelf 30 may include an upper cultivation shelf disposed at an upper side and a lower cultivation shelf 30b disposed at a lower side. The upper cultivation shelf 30a may be referred to as a first cultivation shelf, and the lower cultivation shelf may be referred to as a second cultivation shelf.

The upper cultivation shelf 30a and the lower cultivation shelf 30b may be spaced a set interval from each other, and a space above the upper cultivation shelf 30a and a space above the lower cultivation shelf 30b may be spaced apart from each other to secure a sufficient height at which so that plants are capable of being grown.

Also, the water supply module and the drain module, which are respectively disposed on both left and right sides of the cultivation shelf 30, may be connected to the water tank 70. Thus, as water is circulated between the water tank 70 and the cultivation shelf 30, the seed package 90 may be supplied with an appropriate amount of water and nutrients in time.

The water supply module may be disposed at the right side of the cultivation shelf on which the water supply portion 316 is disposed. Also, the water supply module may include the pump 83 and the water supply pipe 84. The pump 83 and the water supply pipe 84 may be configured to provide independent water supply to the upper cultivation shelf 30a and the lower cultivation shelf 30b. For example, the pump 83 may include an upper pump 83a and a lower pump 83b, and the water supply pipe 84 may include an upper water supply pipe 84a and a lower water supply pipe 84b.

The pump 83 may adjust an amount of water supplied to the cultivation shelf 30 through control, and thus, a quantity of water may be supplied. For example, the pump 83 may operate 8 times per day, that is, at a time period of about 3 hours. Thus, when water is supplied once, about 1 liter of water may be supplied. Here, an amount of water supplied may be controlled through a driving time of the pump 83. If necessary, the water supply module may include a flow sensor, and as a flow rate is sensed through the flow sensor, the pump 83 may be driven to be controlled to provide a quantitative water supply.

At least a portion of the water supply pipe 84 may be provided as a metal pipe. Particularly, an end of the outlet-side water supply pipe 84 adjacent to the cultivation space 100 may be bent to be maintained in its position and shape. Thus, when water is supplied to the cultivation shelf 30, an accurate water supply position may be maintained to prevent the water from leaking or splashing outside the cultivation shelf 30.

An end of the water supply pipe 84 may extend toward the water supply portion 316 disposed at the rear end of the cultivation shelf 30. The water supply portion 316 may protrude backward from the rear end of the cultivation shelf 30 and have an opened top surface. Also, the end of the water supply pipe 84 may be disposed above the opened top surface of the water supply portion 316 and be bent to face the opened top surface of the water supply portion 316.

The water supply module may include the sub tank 82. The sub tank 82 may be disposed at a side of the pump 83 and be disposed behind the water tank 70. The sub tank 82 may be connected to the water tank 70 and the pump 83 so that the water in the water tank 70 is supplied to the pump 83.

Also, the sub tank 82 may be configured to be always maintained at a set water level. Thus, when the pump 83 is stopped and restarted, air may be prevented from being introduced, and water may be always filled in the inlet side of the pump 83. Thus, the pump 83 may ensure that an accurate amount of water is supplied through the time control. Also, even if the small pump 83 is used repeatedly for a long time, a reliable operation may be secured.

The drain module may be disposed at the left side of the cultivation shelf 30 on which the opening/closing member 36 is provided. The drain module may include a drain tray 85 and a drain pipe 89. The drain tray 85 may be disposed below the opening/closing member 36 that opens and closes a drain hole 319 of the cultivation shelf 30 to receive water from the cultivation shelf 30, which is drained from the drain hole 319.

The opening/closing member 36 may be configured to open and close the drain hole 319 by rotation thereof and may operate by a driving device 86 provided above the opening/closing member 36. The driving device 86 may include an upper driving device 86a for opening the opening/closing member 36 of the upper cultivation shelf 30a and a lower driving device 86b for opening the opening/closing member 36 of the lower cultivation shelf 30b.

For example, the driving device 86 may have a structure in which a rod moves vertically by driving a motor, and when moving downward, the drain hole 319 may be opened by pressing the opening/closing member 36 to rotate. Also, when the rod moves upward, the opening/closing member 36 may be returned to its original position to close the drain hole 319 again.

That is, water of the cultivation shelf 30 may be drained by the operation of the driving device 86. The driving device 86 may operate after a set time elapses after water is supplied to the cultivation shelf 30. The set time may be set to a time at which water supplied to the cultivation shelf 30 and supplied to the seed package 90 is sufficiently supplied as the seeds. The seeds or plants inside the seed package 90 may absorb a sufficient amount of water within the set time after water is supplied into the seed package 90.

For example, the set time may be set to about 1 hour to about 1 hour 30 minutes. Therefore, the cultivation shelf 30 may be maintained in water supply state for at least the set time, and after the set time elapses, all the water inside the cultivation shelf 30 may be drained by driving the driving device 86. Thus, the inside of the cultivation shelf 30 and the seed package 90 may be maintained in empty state of water until resupplying of water starts, and mold or green algae may be prevented from occurring in the cultivation space 100.

Particularly, the blower 50 may be driven inside the cultivation space 100, and the water inside the cultivation shelf 30 may be more effectively removed due to the air circulation by the blower 50. Thus, the contaminated environment of the cultivation space 100 may be eliminated during a time period until the resupplying of water starts after the drain is completed.

The set time may be adjusted according to the type of crops. When the amount of water suitable for cultivated plants is large, the set time may be adjusted so that the water supply time increases, or water is more frequently supplied.

When a water level inside the cultivation shelf 30 exceeds an appropriate water level, the driving device 86 may be driven to forcibly drain the water from the cultivation shelf 30 regardless of the set time to prevent the water within the cultivation shelf 30 from overflowing.

The drain tray 85 may be connected to the drain pipe 89. The drain tray 85 may serve as a buffer for primarily accommodating water discharged from the cultivation shelf 30. Also, the drain tray 85 may have a predetermined area to prevent the falling water from being splashing or overflowing while the water is drained. Also, the water discharged from the cultivation shelf 30 may be guided toward the drain pipe 89 without overflowing.

The drain tray 85 may include an upper drain tray 85a provided below the upper cultivation shelf 30a and a lower drain tray 85b provided below the lower cultivation shelf 30b. Also, the upper drain tray 85a and the lower drain tray 85b may be connected to the drain pipe 89.

The drain pipe 89 may be configured to guide water from the drain tray 85 to the water tank 70 and may include a connection pipe 87 connected to the drain tray 85 and a drain tube 88 connecting the connection pipe 87 to the water tank 70.

The connection pipe 87 may be connected to both the upper drain tray 85a and the lower drain tray 85b and may extend in the vertical direction. The connection pipe 87 may have a sufficient inner space so as not to overflow or backflow even when a large amount of water is supplied from the drain tray 85 and may have a cross-sectional area greater than that of the drain tube 88.

An upper end of the connection pipe 87 may be connected to the upper drain tray and may extend further downward than the lower drain tray 85b. Also, a lower end of the connection pipe 87 may be bent forward and may extend forward.

The connection pipe 87 may be disposed inside the side surface of the cultivation space 100. That is, the connection pipe 87 may be accommodated in a portion recessed in the side plate 122 so that the connection pipe 87 protrudes to the inside of the cultivation space 100 or is not exposed when viewed from the front side.

The drain tube 88 may be connected to a lower end of the connection pipe 87. The drain tube 88 may be provided in a tube shape having a diameter less than the cross-sectional area of the connection pipe 87 and may be made of a flexible material. Thus, the drain tube 88 may extend from an end of the connection pipe 87 to the water tank 70 and may be disposed inside the pump cover 81.

A drain valve 881 may be provided at the extending end of the drain tube 88. The drain valve 881 may be exposed to the outside of the pump cover 81 and be connected to the water tank 70 when the water tank 70 is mounted.

In detail, the drain valve 881 has the same structure as a check valve and may be opened while being connected to the water tank 70 when the water tank 70 is mounted. Due to the opening of the drain valve 881, the drain pipe 89 and the water tank 70 may communicate with each other, and water drained from the cultivation shelf 30 may be introduced into the water tank 70.

Also, when the water tank 70 is withdrawn, the drain valve 881 may be closed by releasing contact with the water tank 70 to prevent the water in the drain pipe 89 from being drained. Thus, the inside of the cultivation space 100 may be prevented from being contaminated by the drained water while the water tank 70 is withdrawn.

As described above, the water tank 70 may be connected to the water supply module and the drain module. Thus, the water of the water tank 70 may be supplied to the upper cultivation shelf 30a and the lower cultivation shelf 30b by the water supply module, and the water from the upper cultivation shelf 30a and the lower cultivation shelf 30b may be collected to the water tank 70 by the drain module. That is, as illustrated in FIG. 11, water may be circulated between the water tank 70 and the cultivation shelf 30.

Hereinafter, the structure of the cultivation shelf 30 will be described in more detail with reference to the drawings. Since the cultivation shelf 30 has the same structure regardless of the vertical position, only one cultivation shelf 30 will be described below, and the upper cultivation shelf 30a and the lower cultivation shelf 30b may have exactly the same structure.

Figure 12:
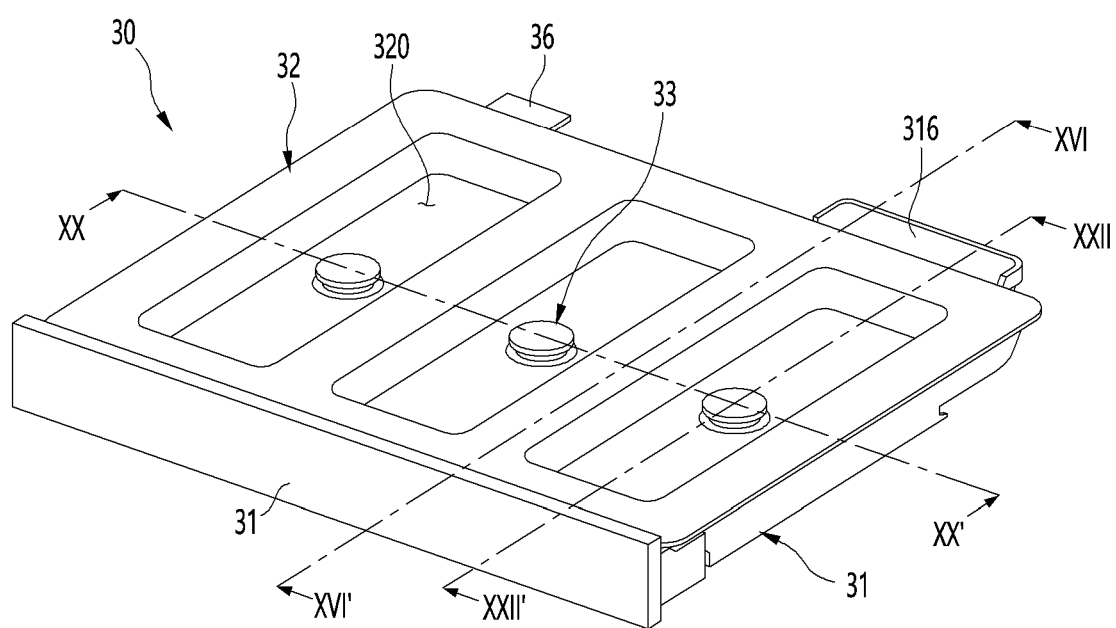
FIG. 12 is a perspective view of the cultivation shelf.
Figure 13:
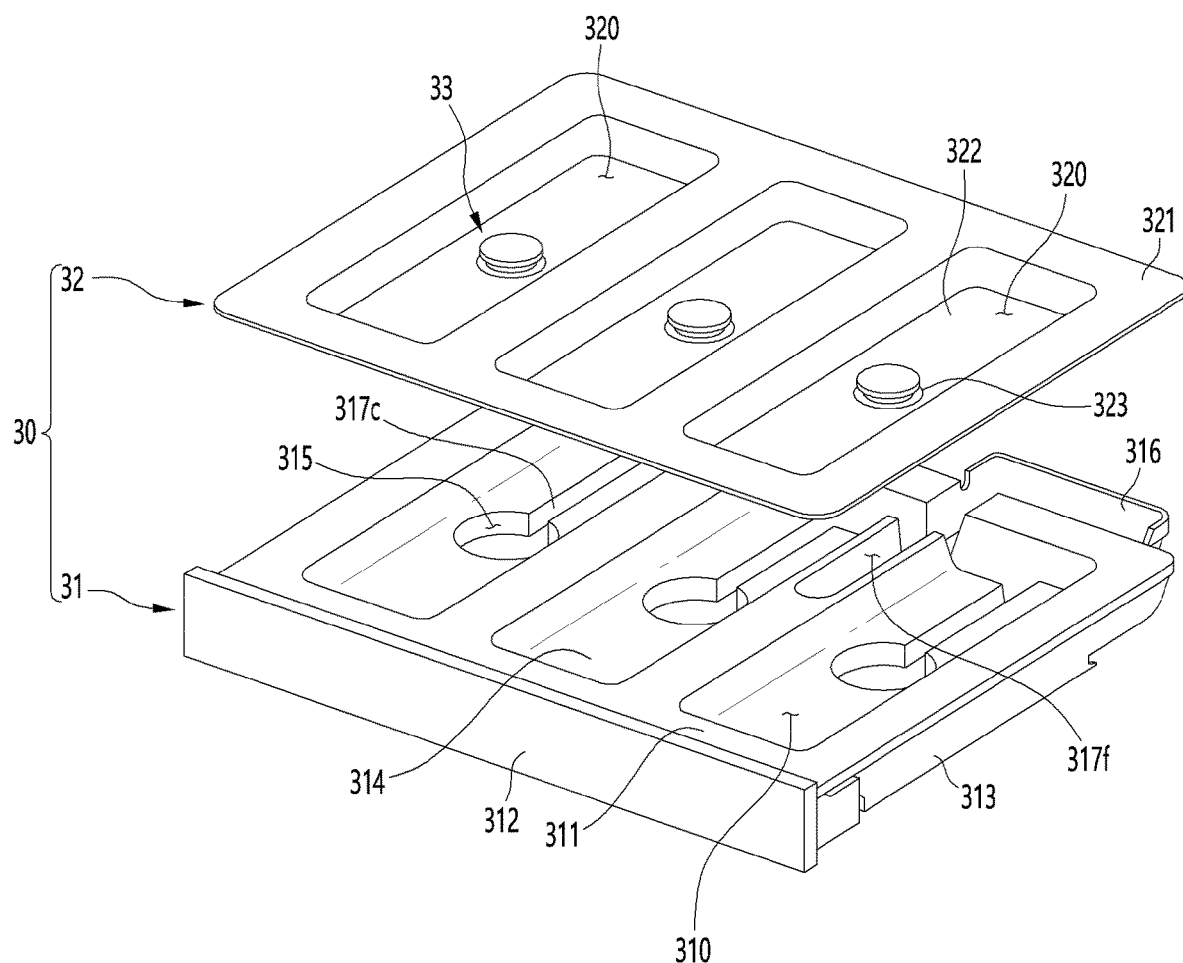
FIG. 13 is an exploded perspective view of the cultivation shelf.

FIG. 12 is a perspective view of the cultivation shelf. Also, FIG. 13 is an exploded perspective view of the cultivation shelf.

As illustrated in the drawings, the cultivation shelf 30 may be configured so that the plurality of the seed packages 90 are seated, and the water supplied from the water tank 70 may be supplied to the seed packages 90.

In detail, the cultivation shelf 30 may include a shelf tray 32 on which the seed package 90 is mounted, and a shelf base 31 accommodating water supplied to the seed package 90. Also, the shelf tray 32 may be seated on the shelf base 31 to define an outer appearance of the top surface of the cultivation shelf 30.

The shelf tray 32 may be made of a metal material to have an excellent and clean outer appearance. For example, the shelf tray 32 may be made of a stainless material to be resistant to contamination and to facilitate cleaning and management.

The shelf tray 32 may be mounted in a state of overlapping a top surface of the shelf base 31 and may be provided in a shape corresponding to the top surface shape of the shelf base 31. Also, when the shelf tray 32 is mounted, a front surface and left and right surfaces of the shelf base 31 may be exposed, and the water supply portion 316 and the opening/closing member 36, which are disposed on a rear surface of the shelf base 31, may also protrude to a rear side of the shelf tray 32.

The shelf tray 32 may be provided in a rectangular shape when viewed from above. Also, the shelf tray 32 may include a tray top surface 321 that defines an outer appearance of the top surface as a whole and a seat 320 recessed from the tray top surface 321. The seat 320 may be referred to as a tray seat to be distinguished from a base seat 310 of the shelf base 31.

The top surface of the tray 321 may define an outer appearance of the top surface of the shelf base 31 except for the seat 320 and may be provided in a planar shape. Also, a tray edge 321a bent or curved in a round shape may be disposed around the top surface of the tray 321.

The seat 320 may be recessed in a shape corresponding to the seed package 90 so that the seed package 90 is seated. A plurality of seats 320 may be provided so that the plurality of the seed packages 90 are seated in separate spaces, respectively. For example, three seats 320 may be arranged side by side in the left and right direction.

The seat 320 may accommodate the entire bottom surface of the seed package 90 and may be recessed to accommodate at least a portion of upper and lower heights. Here, the seat bottom surface 321 may have a size and shape corresponding to those of the container bottom surface 911 of the seed package 90. Thus, when the seed package 90 is seated on the seat 320, the container bottom surface 911 may be in surface contact with the seat bottom surface 321. In this state, even if water is supplied by opening the shutter 33, the water may not be permeated between the bottom surface 911 of the container and the bottom surface 322 of the seat.

Also, the shutter 33 may be provided at a center of the bottom surface 322 of the seat. One shutter 33 may be provided for each of the plurality of seats 320. Also, the shutter 33 may be mounted on a communication member mounting hole 323 passing through the bottom surface 322 of the seat. The shutter 33 may move vertically to allow the water accommodated in the shelf base 31 to be selectively introduced. The shutter 33 may be referred to as a water supply member because of enabling the selective water supply to the seat 320.

The shutter 33 may be disposed at the center of each of the plurality of seats 320, and the plurality of shutters 33 may all be disposed in the same extension line. For example, the shutters 33 may be disposed in the same extension line in the horizontal direction (left and right direction in FIG. 12). Therefore, when water is supplied, the water may be supplied at the same position in each of the seats 320, and also, the water may be accurately supplied regardless of the mounted positions of the seed package 90 on the plurality of seats 320.

The shutter 33 may operate according to the mounting of the seed package 90. That is, the shutter 33 may be maintained in closed state inside the seat 320, on which the seed package 90 is not mounted, among the plurality of seats 320 and may be maintained in opened state at the seat 320, on which the seed package 90 is mounted, so that the water is introduced to be supplied to the seed package 90.

That is, the shutter 33 may be configured to selectively supply the water to the seat 320, on which the seed package 90 is mounted, among the plurality of seats 320 according to whether the seed package 90 is mounted.

The shutter 33 may be disposed at a position facing the water inlet 912 of the seed package 90, and when the seed package 90 is seated on the seat 320, a portion of the shutter 33 may be accommodated inside the water inlet 912, and a bottom surface of the water inlet 912 may press a top surface of the shutter 33 so that the shutter 33 operates. The structure of the shutter 33 and the interaction between the shutter 33 and the water inlet 912 will be described in more detail below.

The shelf base 31 may be provided below the shelf tray 32. The shelf base 31 may be configured to allow water supplied from the water tank 70 to flow and be stored and may have a top surface shape corresponding to a bottom surface shape of the shelf tray 32 so that the shelf tray 32 is seated.

The shelf base 31 may be made of a plastic material and may be provided in a square shape corresponding to the shelf tray 32 when viewed from above. Also, the shelf base 31 may include a base top surface 311 on which the shelf tray 32 is mounted and a base seat 310. Also, a handle 312 for the withdrawal of the cultivation shelf 30 may be provided on a front surface of the shelf base 31, and a base side surface coupled to the shelf rail for the withdrawal of the cultivation shelf 30 may be provided at each of both left and right sides of the shelf base 31.

Also, a shutter accommodation portion 315 in which the shutter 33 is accommodated and a base passage 317 connecting the shutter accommodation portion 315 to the water supply portion 316 and the drain hole 319 may be provided inside the shelf base 31. Also, the shelf base 31 may be provided with an opening/closing member 36 that opens and closes the drain hole 319 and the floater 34 sensing a water level of the shelf base 31.

Hereinafter, the structure of the shelf base 31 will be described in more detail with reference to the drawings.

Figure 14:
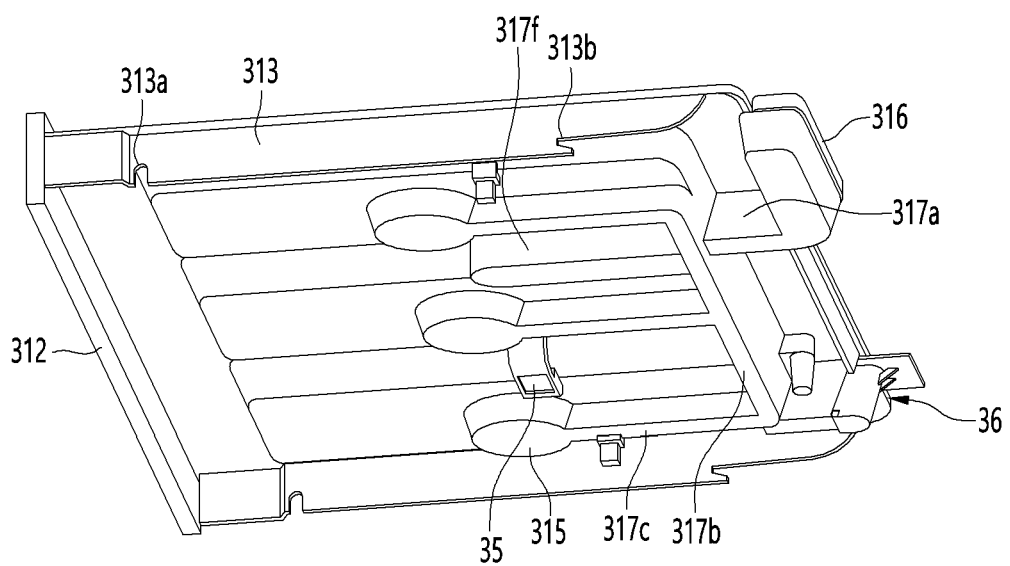
FIG. 14 is a lower perspective view of a shelf base that is one component of the cultivation shelf.
Figure 15:
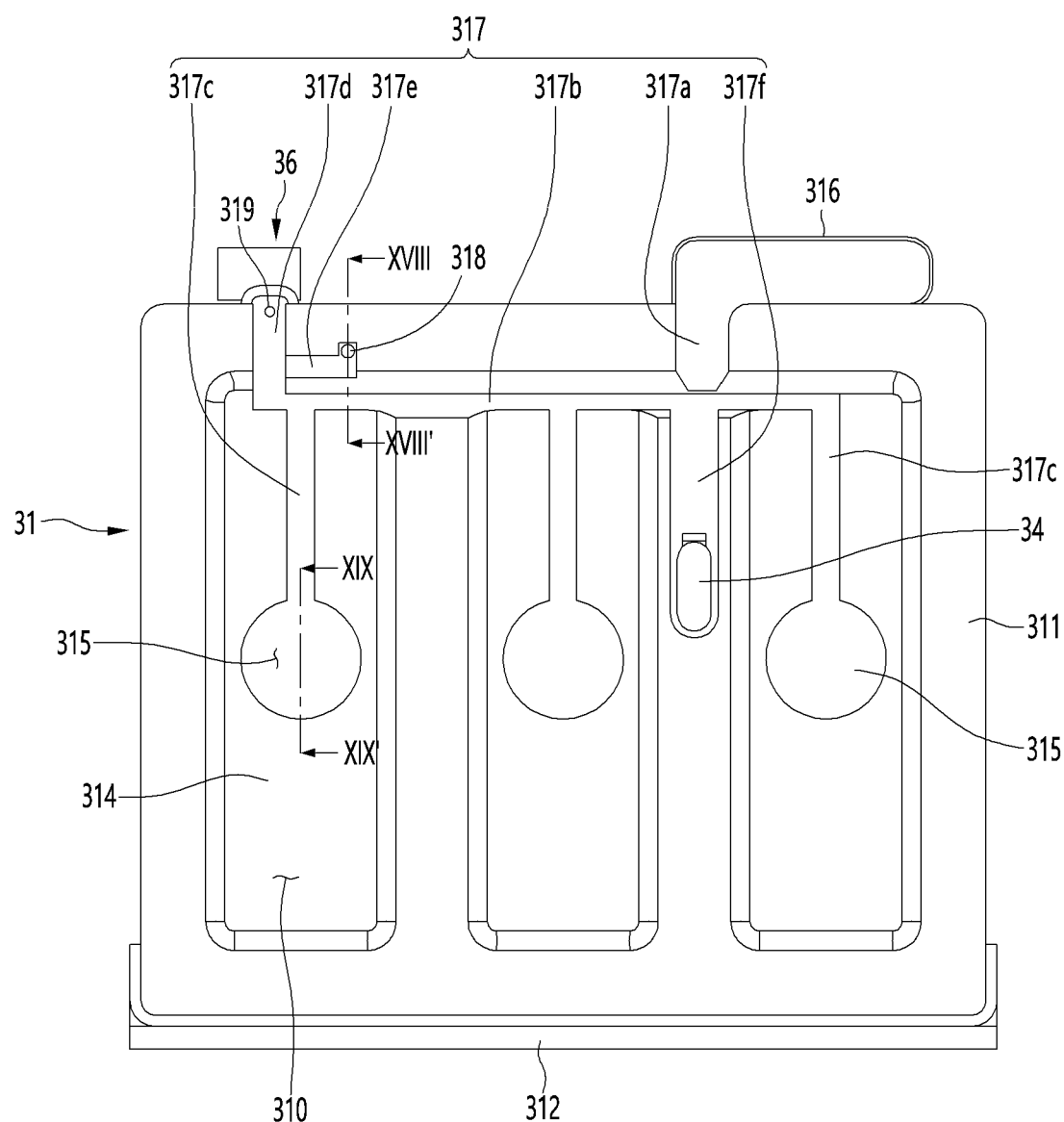
FIG. 15 is a plan view of the shelf base.

FIG. 14 is a lower perspective view of the shelf base that is one component of the cultivation shelf. FIG. 15 is a plan view of the shelf base.

As illustrated in the drawings, the shelf base 31 may have an outer appearance of a top surface appearance, which is defined by the base top surface 311. Also, the base top surface 311 may support the tray top surface 321 of the shelf tray 32.

Also, the handle 312 may be disposed on a front surface of the shelf base 31. The handle 312 may define the front surface of the shelf base 31 and may extend from a left front end to a right end of the shelf base 31 and also may extend downward from the base top surface 311.

The handle 312 may protrude downward so that the user pulls the handle by putting his or her hand into a lower front of the shelf base 31. The user may hold the handle 312 to manipulate the withdrawal of the cultivation shelf 30.

Also, the base side surfaces 313 may be defined on both left and right sides of the shelf base 31, respectively. The base side surface 313 may extend downward from each of both left and right ends of the top surface 311 of the base 311.

A front coupling portion 313a and a rear coupling portion 313b coupled to the shelf rail 16 may be disposed on the base side surfaces 313. The front coupling portion 313a may be provided in the first half of the base side surface 313 and may be provided in a groove shape with a lower end recessed. Also, the rear coupling portion 313b may be provided at a rear end of the base side surface 313 and may be provided in a groove shape that is recessed forward.

Thus, to mount the cultivation shelf 30, that is, the shelf base 31 on the shelf rail 16, the shelf base 31 may first move backward to restrict the rear end of the shelf base 31 so that one side of the shelf rail 16 is inserted into the rear coupling portion 313b. Then, a front end of the shelf base 31 may move downward so that the other side of the shelf base 31 is inserted into the front coupling portion 313a to restrict the front end of the cultivation shelf 30 to the shelf rail 16, thereby coupling the shelf base 31 to the shelf rail 16.

A shelf detection member 35 may be provided at one side of the bottom surface of the shelf base 31. The shelf detection member 35 may be configured to detect that the cultivation shelf 30 is completely inserted and may be provided at a position corresponding to the shelf detection device 49 disposed below the cultivation shelf 30. For example, the shelf detection member 35 may be made of a magnetic material and may be exposed downward from the cultivation shelf 30.

In this embodiment, the lower lighting device 40b may be provided below the upper cultivation shelf 30a, and the shelf detection device 49 may be disposed on the lower lighting device 40b. Also, the water tank 70 and the pump cover 81 may be provided below the lower cultivation shelf 30b, and the shelf detection member 35 may be disposed on a top surface of the pump cover 81, which is a position corresponding to the shelf detection member 35. That is, the shelf detection device 49 may be disposed at a position corresponding to the position of the shelf detection member 35 among the constituents disposed below the cultivation shelf 30.

The shelf detection device 49 may be configured as a hall sensor that detects a magnet and be configured to detect the shelf detection member 35 when the cultivation shelf 30 is completely inserted. The cultivation shelf 30 has to be disposed in a state of being inserted to an accurate position. Due to the characteristics of the cultivation shelf 30 having the structure in which the cultivation shelf 30 is inserted and withdrawn, if the cultivation shelf 30 is not disposed at the correct position, the water supply pipe 84 and the water supply portion 316 may not be aligned with each other, and thus, water may leak or overflow during the water supply process. Also, during the draining process, water may leak out of the drain tray 85.

Thus, in this embodiment, the shelf detection device 49 may detect whether the cultivation shelf 30 has reached the correct position, and when the cultivation shelf 30 is not disposed at the correct position, the information, in which the cultivation is not disposed at the correct position, may be informed to the outside so that the user manipulates the cultivation shelf 30 to be disposed at the correct position.

The base seat 310 may be disposed inside the base top surface 311. The base seat 310 may have a shape corresponding to that of the seat 320, and a bottom surface of the base seat 310, that is, the base bottom surface 314 may be in surface contact with the seat bottom surface 322. Thus, the base seat 310 and the seat 320 may be in a state in which the bottom surfaces are in close contact with each other to be maintained in stably mounted state, and thus, the water may be effectively supplied to the seed package 90.

Also, a shutter accommodation portion 315 may be provided at an inner center of the base seat 310. The shutter accommodation portion 315 may be disposed at a position corresponding to the shutter 33 in a state of being mounted on the shelf tray 32, and the shutter accommodation portion 315 may be provided for each of the plurality of base seats 310.

Also, the shutter accommodation portion 315 may have a size capable of accommodating the shutter 33 therein. The shutter accommodation portion 315 may be provided in a circular shape to accommodate a lower portion of the shutter 33. Also, the shutter accommodation portion 315 may define a recessed space having a set height H1 so as to ensure vertical movement of the shutter 33 without interfering with the shutter 33 when the shutter 33 moves vertically. The shutter accommodation portion 315 may be recessed to a height at which the shutter accommodation portion is in contact with the lower end of the shutter 33 when the shutter 33 moves to the lowermost position. For example, the set height H1 may be approximately 14 mm.

The water supply portion 316 may be disposed at one side (right side in FIG. 15) of the left and right sides of the rear end of the shelf base 31. The water supply portion 316 may protrude backward and be recessed to receive water supplied through the water supply pipe 84.

Also, the drain hole 319 and the opening/closing member 36 that opens and closes the drain hole 319 may be provided on the other side (left side in FIG. 15) of the left and right sides of the rear end of the shelf base 31. The opening/closing member 36 may have a shape capable of surrounding and shielding the drain hole 319 and an area adjacent to the drain hole 319 and may protrude backward to rotate according to the operation of the driving device 86, thereby opening and closing the drain hole 319. For example, the opening/closing member 36 may include a cover, a plate, or the like.

The shelf base 31 may be provided with a base passage 317, through which water flows, on the shelf base 31. The base passage 317 may be provided to connect all of the water supply portion 316, the shutter accommodation portion 315, the water level detection portion 317f, the drain hole 319, and the drain portion 318 to each other. In addition, the base passage 317 may guide the water supplied to the shelf base 31 so as to be effectively supplied to the seed package 90 and drained after the water supply is completed.

The base passage 317 may include a water supply guide portion 317a, a branch portion 317b, a connection portion 317c, and a drain guide portion 317d.

In detail, the water supply guide portion 317a may be configured to connect the water supply portion 316 to the branch portion 317b and may extend from one end of the water supply portion 316 to the branch portion 317b. Here, each of the water supply portion 316 and the water supply guide portion 317a may be disposed at a position higher than the branch portion 317b. Also, a bottom surface of the water supply guide portion 317a may have an inclination that gradually decreases toward the branch portion 317b. Thus, the water supplied to the water supply portion 316 may flow toward the branch portion 317b.

In addition, the branch portion 317b may be disposed along the rear ends of the seats 320 disposed on the shelf base 31. The branch portion 317b may pass through all of the plurality of seats 320 disposed on the shelf base 31, and one end of the branch portion 317*b* may be connected to the drain guide portion 317*b* connected to the drain hole 319.

Also, the drain guide portion 317*d* may be connected from one end of the branch portion 317*b* to the drain hole 319. The drain hole 319 may be defined in an end of the drain guide portion 317*d*, and the drain hole 319 may be defined at the lowest position of the bottom surface of the drain guide portion 317*d*. Thus, water passing through the branch portion 317*b* may be naturally discharged to the drain hole 319 through the drain guide portion 317*d*.

A plurality of connection portions 317*c* may be disposed on the branch portion 317*b*. The plurality of connection portions 317*c* may be provided for each of the base seats 310 and may be connected to the shutter accommodation portion 315 of the base seat 310. Thus, the water supplied to the water supply portion 316 may flow in order to the water supply guide portion 317*a* and the branch portion 317*b* and then may be supplied into all the shutter accommodation portions 315 on the shelf base 31 through the plurality of connection parts 317*c* connected to the branch portion 317*b*.

While water is supplied to the water supply portion 316 and until the set time elapses before the start of the drainage, the opening/closing member 36 may be closed, and the drain hole 319 may be maintained in the closed state. Thus, a state in which the base passage 317 including the shutter accommodation portion 315 is filled with water may be maintained.

The base passage 317 may further include a water level detection portion 317*f*. The water level detection portion 317*f* may be configured to prevent water supply above a full water level H2 into the shelf base from occurring and may be configured so that the floater 34 is disposed in the water level detection portion 317*f*.

Hereinafter, the water level detection device 48 will be described in more detail with reference to the drawings.

Figure 16:
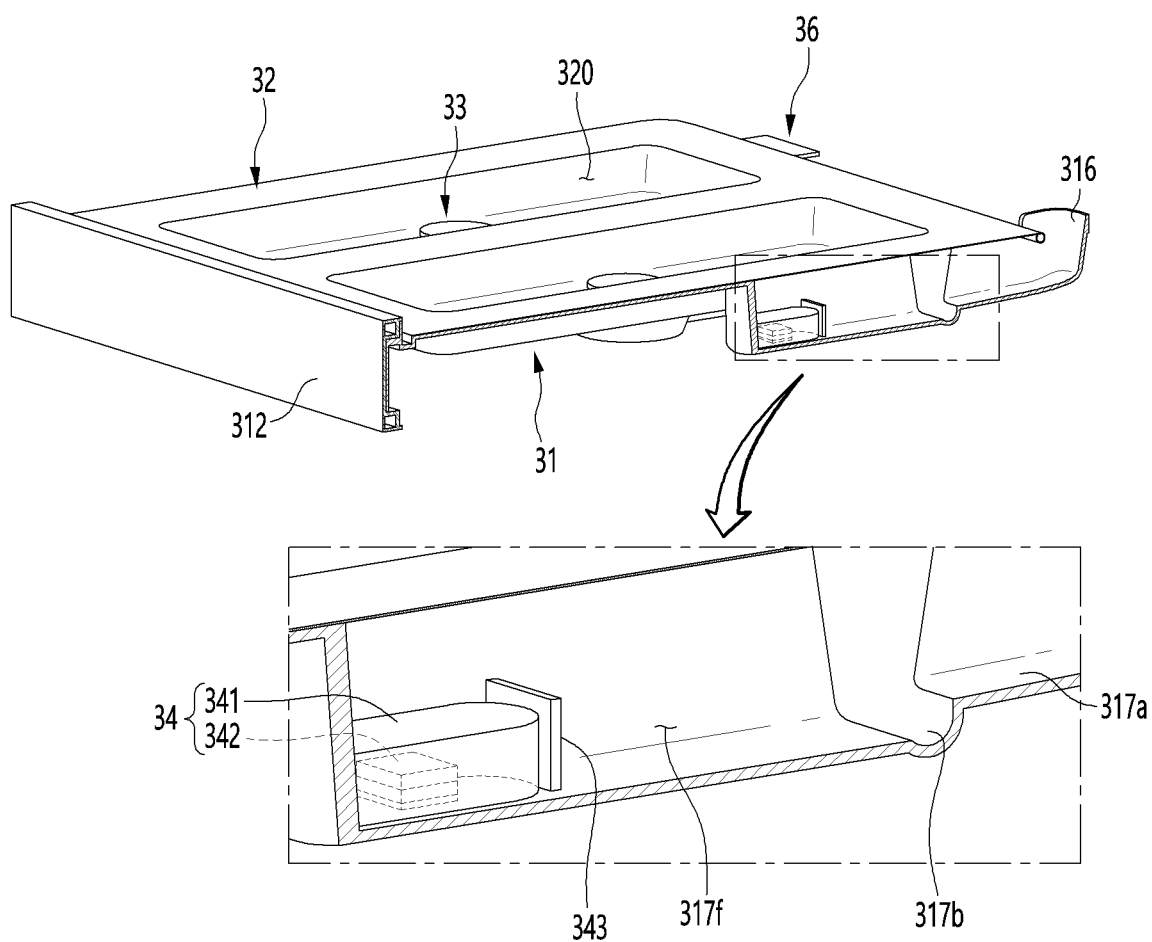
FIG. 16 is a cutaway perspective view taken along line XVI-XVI' of FIG. 12.
Figure 17:
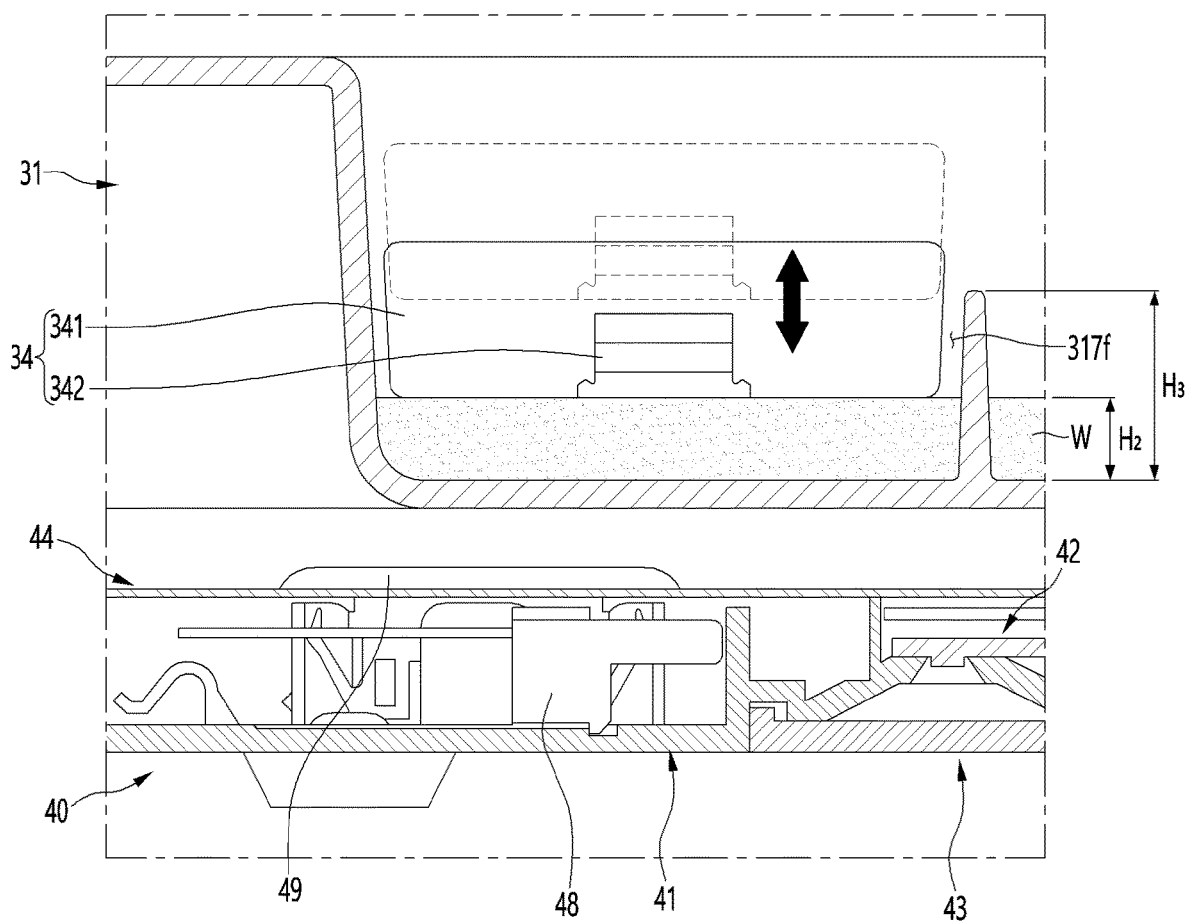
FIG. 17 is a view illustrating a state in which a water level in the shelf is detected by a floater of the cultivation shelf.

FIG. 16 is a cutaway perspective view taken along line XVI-XVI' of FIG. 12. Also, FIG. 17 is a view illustrating a state in which a water level in the shelf is detected by the floater of the cultivation shelf.

As illustrated in the drawings, the water level detection portion 317*f* may extend from one side of the branch portion 317*b*. Also, the branch portion 317*b* may be disposed at a position facing the extending end of the water supply guide portion 317*a*.

Thus, when water is first supplied from the water supply portion 316, the water supplied to the branch portion 317*b* may be directed to the water level detection portion 317*f* at the same time. Thus, when an excessive amount of water is supplied to increase in water level of the cultivation shelf 30, the excessive water supply may be detected first.

In detail, when the shelf tray 32 is mounted, the water level detection portion 317*f* may be disposed at a position that does not interfere with the seat 320. Therefore, the water level detection portion 317*f* has to be disposed at one side of the top surface 311 of the base and also has to be close to the water supply portion 316 to immediately detect that water is supplied above the full water level. Thus, the water level detection portion 317*f* may be disposed at a position that is close to the water supply portion 316 in a space between the base mounting portions 310.

If the water level detection portion 317*f* is disposed at the leftmost base seat 310, when the water level detection portion 317*f* detects a water level above the full water level, the rightmost base seat 310 may be already reached the full water level, and thus, the water may overflow to the outside of the cultivation shelf 30 as it goes over. Thus, the water level detection portion 317*f* may be disposed at a position facing the water supply guide portion 317*a* to enable more accurate detection of the water level, thereby preventing water from overflowing from the cultivation shelf 30.

Also, the water level detection portion 317*f* may extend forward and also may extend to a position at which the water level detection device 48 disposed on the lighting device under the cultivation shelf 30 is disposed. Thus, when the floater 34 is disposed at an end of the water level detection portion 317*f*, the floater 34 may be disposed at a position facing the water level detection device 48 to accurately determine the water level of the cultivation shelf 30.

In addition, a floater guide 343 that guides the position of the floater 34 may protrude from the water level detection portion 317*f*. The floater guide 343 may be disposed at a position spaced apart from an end of the water level detection portion by a length of the floater 34 and may extend upward from a bottom surface of the water level detection portion 317*f*. Also, both sides of the floater guide 343 may be spaced apart from an inner wall surface of the water level detection portion 317*f*, and thus, water may be introduced up to the end of the water level detection portion 317*f* at which the floater 34 is disposed.

The floater 34 may include a floater case 341 and a magnet 342. The floater case 341 may define an outer shape of the floater 34 and may be made of a material having buoyancy capable of floating in water. That is, the floater 34 may be made of a sponge or foam material to be floated in water, and a magnet 342 may be accommodated therein. Also, the magnet 342 may be disposed on an inner bottom surface of the floater case 341. Thus, when the water level detection portion 317*f* is filled with water, the floater 34 may rise as the water level increases due to the buoyancy.

A water level detection device 48 may be disposed below the cultivation shelf 30. In this embodiment, the lower lighting device 40*b* may be provided below the upper cultivation shelf 30*a*, and the water level detection device 48 may be disposed on the lower lighting device 40*b*. Also, the water tank 70 and the pump cover 81 may be provided below the lower cultivation shelf 30*b*, and the water level detection device 48 may be disposed on a top surface of the pump cover 81, which is a position corresponding to the floater 34. That is, the water level detection device 48 may be disposed at a position corresponding to the position of the floater 34 among the constituents disposed below the cultivation shelf 30.

In FIG. 17, a state in which the water level detection device is disposed in the lighting device is illustrated. As illustrated in the drawing, when the cultivation shelf 30 is completely inserted, the water level detection device 18 may be disposed below the floater 34.

The lighting device 40 may include the light case 41 on which the LED module 42 is mounted, and the light cover 43 that shields the LED module 42 and transmits light radiated from the LED. Also, the lighting device 40 may include a cover plate 53 that is coupled to the light case 41 to define a top surface of the lighting device 40. The cover plate 53 may be disposed to face the bottom surface of the cultivation shelf 30 and may be disposed adjacent to the bottom surface of the cultivation shelf 30.

The water level detection device 48 may be provided at one side of the light case 41. The water level detection device 48 may be disposed vertically below the floater 34 in a state in which the cultivation shelf 30 is inserted. Also, the water level detection device 48 may be disposed as close to the cover plate 53 as possible and may be configured to effectively detect the floater 34.

The water level detection device 48 may be configured to detect a change in magnetic field and may be configured to determine a vertical height of the floater 34. That is, the water level detection device 48 may detect a change in magnetic field by the magnet of the floater 34 to detect a distance to the floater 34, thereby determining a water level of the cultivation shelf.

For example, when water is not supplied to the cultivation shelf 30, the floater 34 may be disposed on a bottom surface of the water level detection portion 317*f*. Here, the position of the floater 34 may be disposed at the closest position to the water level detection device 48, and in the water level detection device 48, the water level of the water level detection portion 317*f* may be determined to be lowest through strength of the strongest magnetic field. In this state, when the set time condition is satisfied, water may be supplied to the cultivation shelf 30.

Also, when water is supplied to the cultivation shelf 30, the floater 34 may move upward according to the water level of the cultivation shelf 30 and then gradually move away from the bottom surface of the water level detection portion 317*f*. Also, the water level detection device 48 may detect that the strength of the magnetic field gradually decreases as the floater 34 moves away.

Here, when an amount of water exceeding the full water level H2 is supplied to the cultivation shelf 30, the water level detection device 48 may detect the excessive water supply. The amount of water supplied to the cultivation shelf 30 may be controlled by the driving time of the pump 83, but the water level of the cultivation shelf 30 may be above the full water level due to other factors such as abnormality of the pump 83 or poor drainage.

When the water level detection device 48 detects that the water level of the cultivation shelf 30 is above the abnormal water level H3 that is equal to or higher than the full water level H2, the water to the cultivation shelf 30 may be stopped. That is, when the water level of the cultivation shelf 30 rises more than necessary, since the water overflows to the outside of the cultivation shelf 30, or the drainage and water supply are not smoothly performed, the driving of the pump 83 may be stopped, or the driving device 86 may be driven to forcibly drain the water of the cultivation shelf 30.

The abnormal water level H3 detected by the water level detection device 48 may be set somewhat higher than the full water level H2. The set abnormal water level H2 may be set to a specific height between the full water level H2 and a limit water level H4 in consideration of residual water remaining on the cultivation shelf 30 or an error in amount of water, which occurs during the water supply process. For example, the abnormal water level H3 may be set between about 20 mm and about 28 mm.

Also, the base passage 317 may further include a drain guide portion 317*e*. The drain guide portion 317*e* may be disposed at one side of the shelf base 31 and be configured to prevent the water level of the shelf base 31 from exceeding the limit water level H4.

Hereinafter, the drain guide portion 317*e* will be described in more detail with reference to the drawings.

Figure 18:
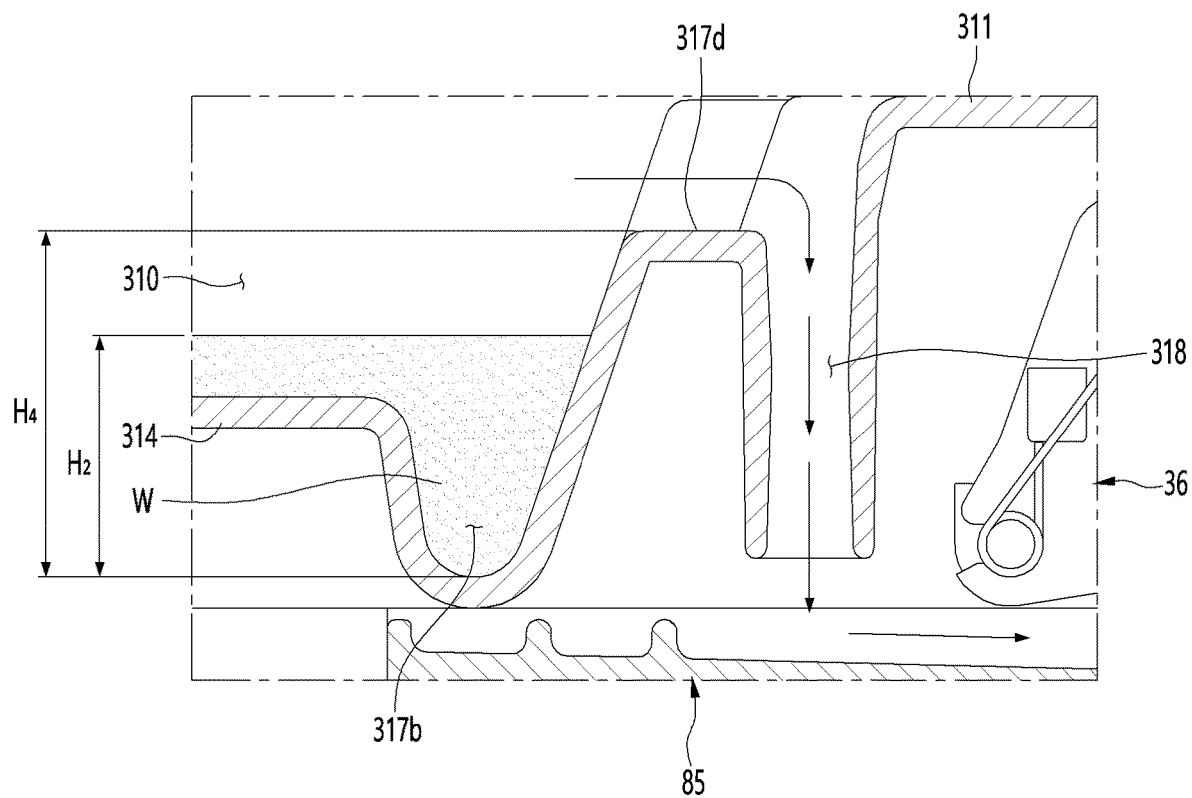
FIG. 18 is a view illustrating a state in which water overflows in a cross-section taken along line XVIII-XVIII' of FIG. 15.
Figure 19:
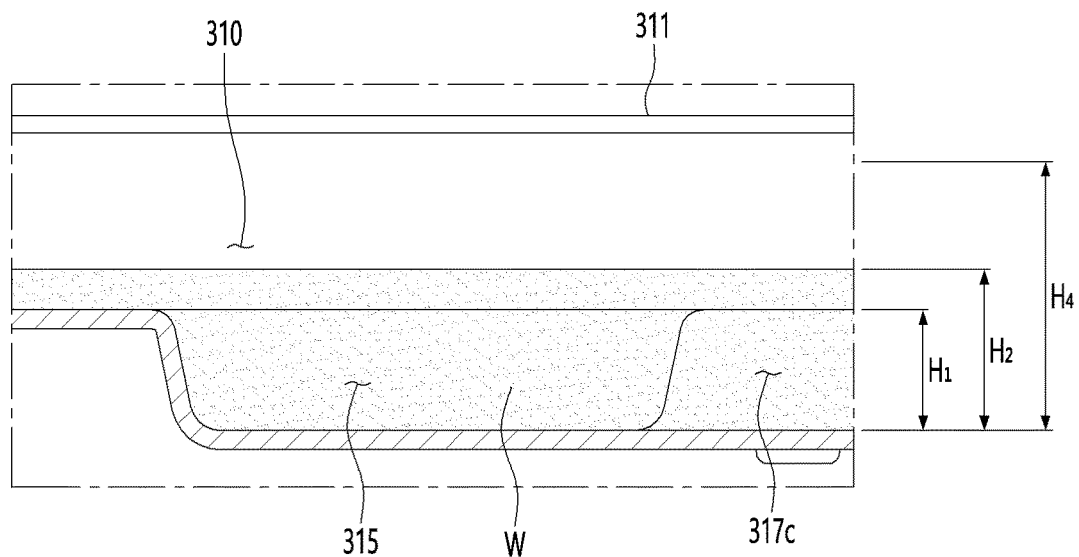
FIG. 19 is a view illustrating a state of a water level in a cross-section taken along line XIX-XIX' of FIG. 15.

FIG. 18 is a view illustrating a state in which water overflows in a cross-section taken along line XVIII-XVIII' of FIG. 15. Also, FIG. 19 is a view illustrating a state of a water level in a cross-section taken along line XIX-XIX' of FIG. 15.

As illustrated in the drawings, the base passage 317 may include the drain guide portion 317*e*. The drain guide portion 317*e* may connect the branch portion 317*b* to the drain portion 318.

The drain guide portion 317*e* may be provided at the same height as the limit water level H4. The limit water level H4 may be higher than the abnormal water level H3 detected by the floater 34 and lower than the height of the top surface 311 of the base of the shelf base 31. For example, the limit water level H4 may be set to about 38 mm.

The drain guide portion 317*e* may be disposed at a position above the bottom surface of the branch portion 317*b* by the limit water level H4. Also, the drain guide portion 317*e* may extend backward, and the drain portion 318 may be disposed on a rear end of the drain guide portion 317*e*.

The drain portion 318 may extend downward from the rear end of the drain guide portion 317*e* and may be provided in a tubular shape with opened top and bottom surfaces. The drain portion 318 may extend downward and may extend toward the drain tray 85. Here, the lower end of the drain portion 318 may be disposed higher than the bottom surface of the shelf base 31 so that when the cultivation shelf 30 is withdrawn, the lower end of the drain portion 318 does not interfere with the drain tray 85.

Thus, even if the water level detection device 48 fails to detect the abnormal water level H3 due to a failure or the like, the pump 83 may abnormally operate, or water of the inside of the cultivation shelf 30 may not be smoothly drained, and thus, the resupply of water may be performed. Here, when the water level inside the shelf base 31 reaches the limit water level H4, the water may be discharged through the drain portion 318 naturally.

The water level of the cultivation shelf 30 may not rise above the limit water level H4 in any case, and the phenomenon in which the water supplied to the cultivation shelf 30 overflows to flow down or contaminates the cultivation space 100 may be prevented fundamentally.

As described above, even if an abnormal water supply situation occurs in the cultivation shelf 30, but a normal water supply state, an occurrence of the water overflow situation in the cultivation shelf 30 may be prevented from occurring by the water level detection device 48 and the drain portion 318.

As illustrated in FIG. 19, in the normal water supply situation, when the pump 83 is driven for a set time or longer, the water supplied to the cultivation shelf 30 may be fully filled into the shutter accommodation portion 315 having the set height H1 and also be supplied until the full water level H2 is reached. Here, the water supplied to the cultivation shelf 30 may be approximately 1 L.

When water is supplied to the full water level H2, the water level may be higher than the bottom surface 322 of the seat, and when the seed package 90 is mounted in this state, the shutter 33 of the seat 320 may be opened so that water is supplied into the seed package 90. Also, among the plurality of seats 320, the seat 320 to which the seed package 90 is not mounted may be blocked by the shutter 33 so that water is not supplied to the seat 320.

Also, even if an excessive water supply situation occurs due to an abnormal operation of the pump 83 or erroneous detection of the water level detection device 48 during the water supply process, the water may be forcibly drained through the drain portion 318 to prevent the water level of the cultivation shelf 30 from exceeding the limit water level H4.

Hereinafter, the shutter 33 will be described in more detail with reference to the drawings.

Figure 20:
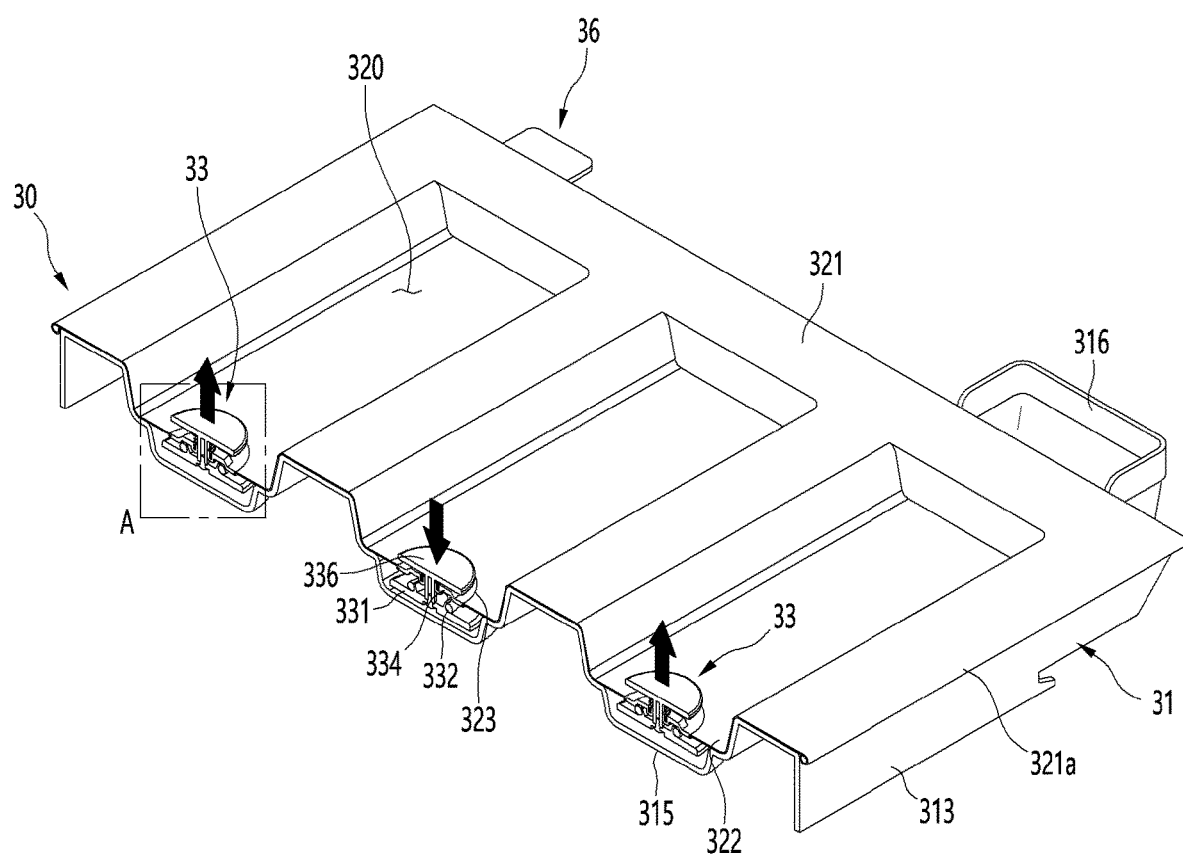
FIG. 20 is a cutaway perspective view taken along line XX-XX' of FIG. 12.
Figure 21:
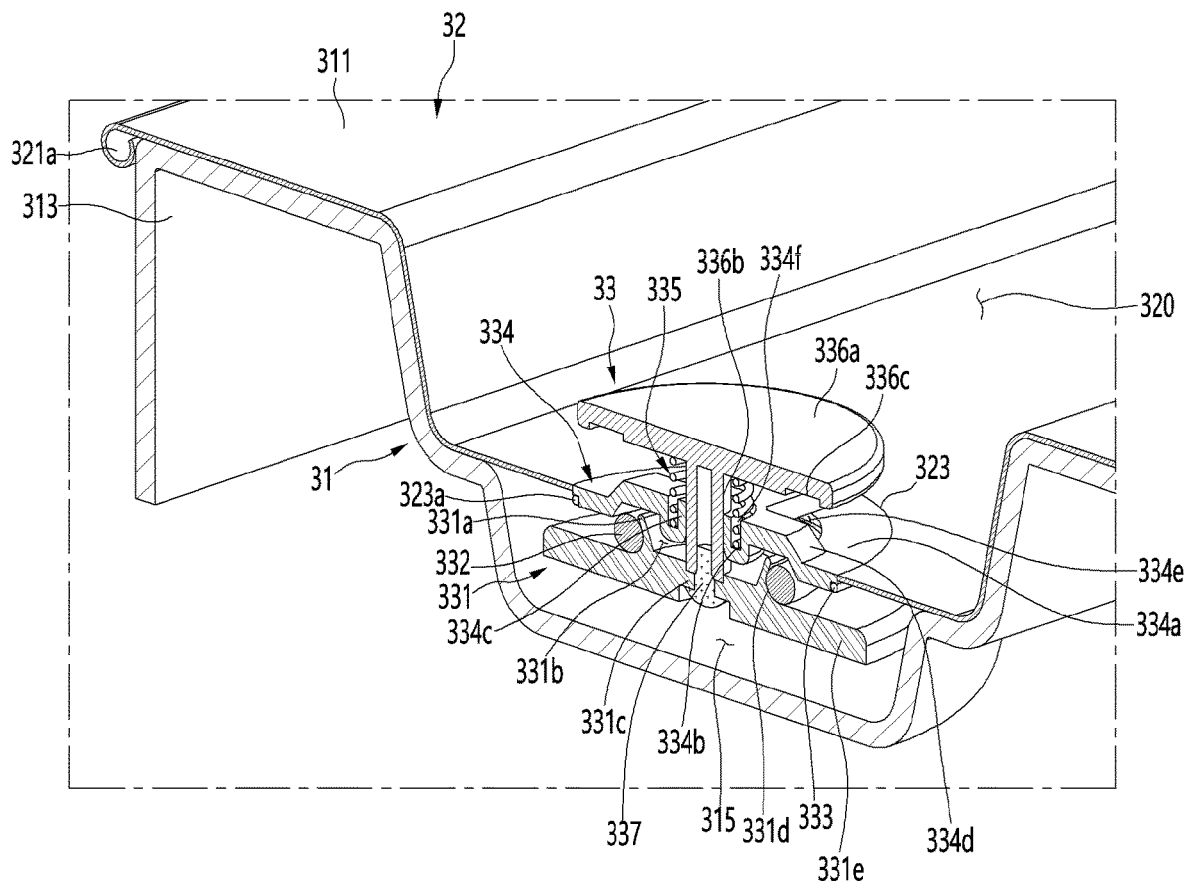
FIG. 21 is an enlarged view illustrating a portion A of FIG. 20.
Figure 22:
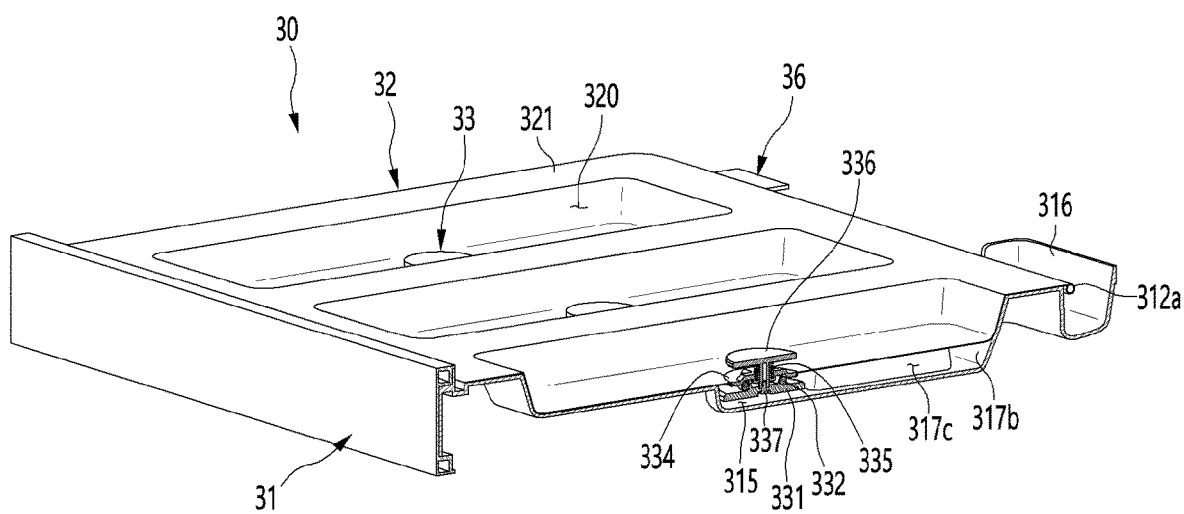
FIG. 22 is a cutaway perspective view taken along line XXII-XXII' of FIG. 12.
Figure 23:
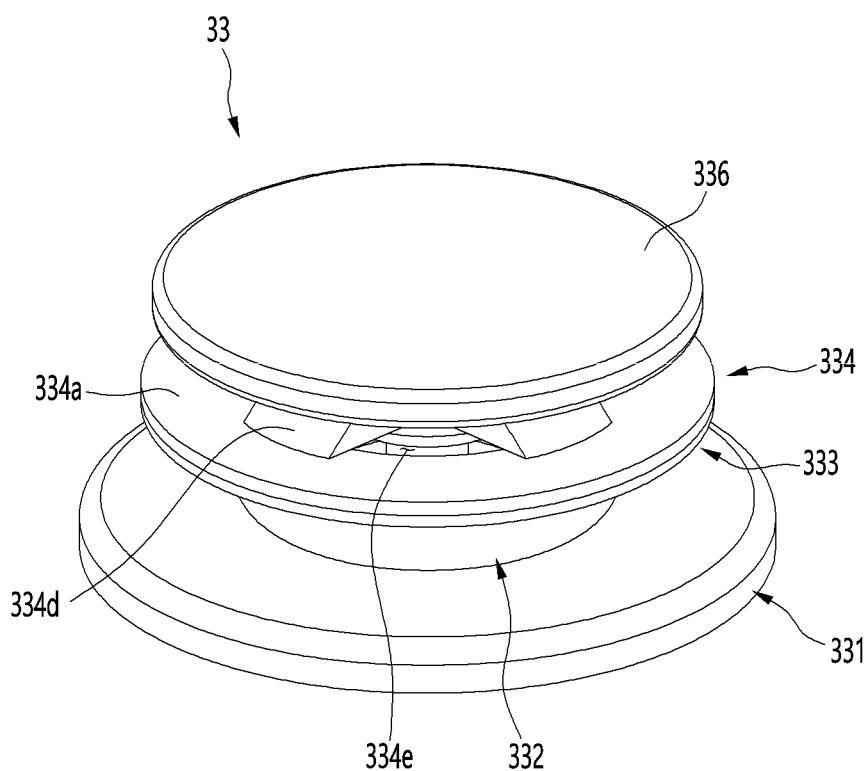
FIG. 23 is a perspective view of a shutter that is one component of the cultivation shelf.
Figure 24:
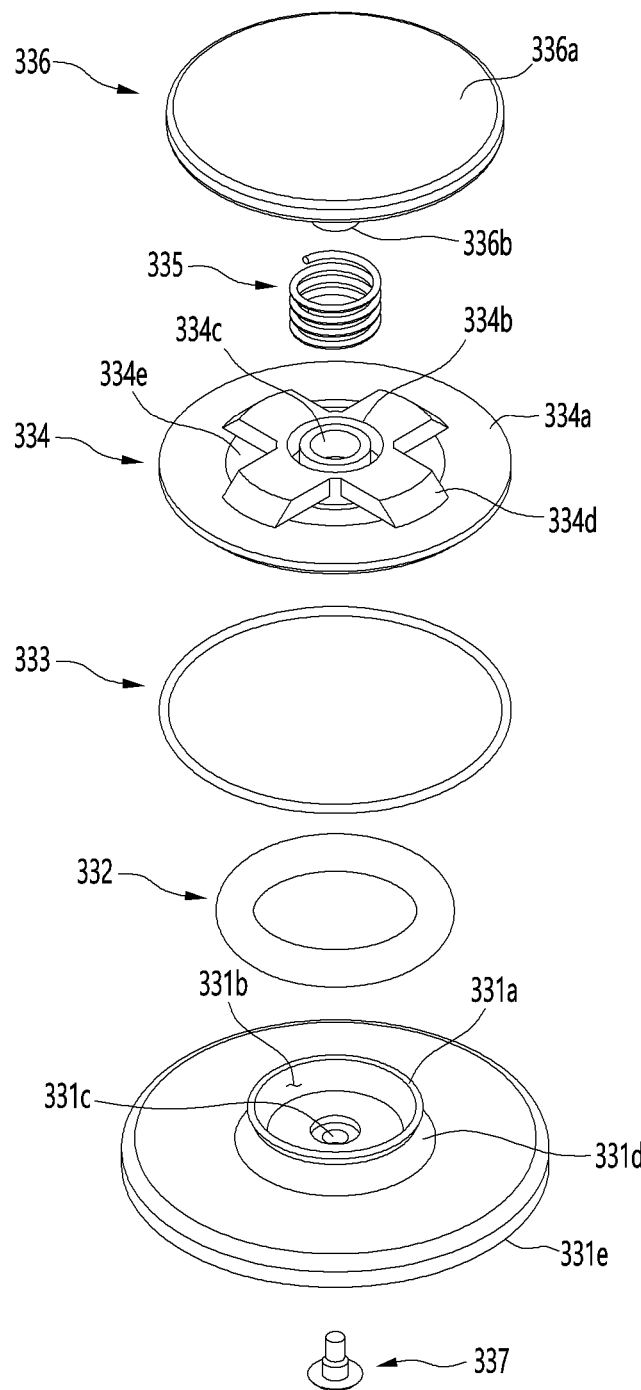
FIG. 24 is an exploded perspective view illustrating a state in which the shutter is disassembled when viewed from an upper side.
Figure 25:
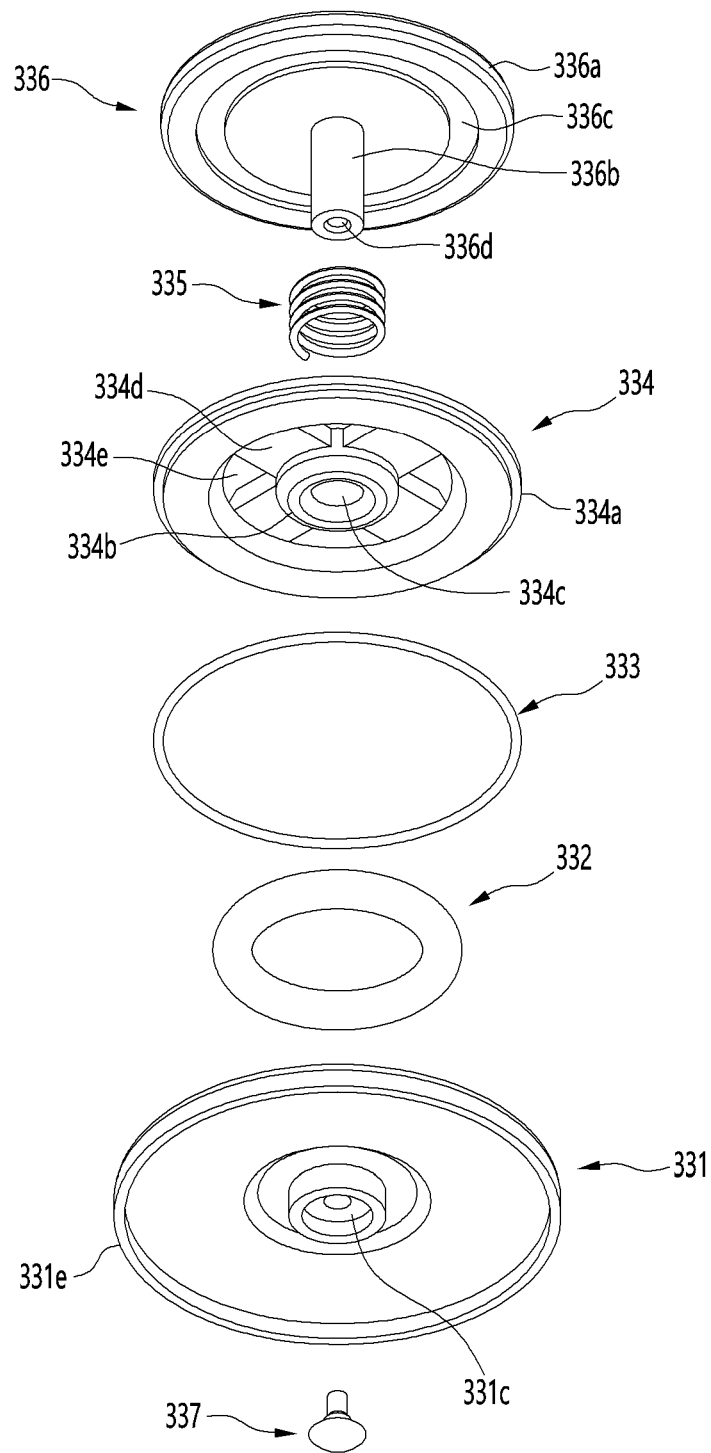
FIG. 25 is an exploded perspective view illustrating a state in which the shutter is disassembled when viewed from a lower side.

FIG. 20 is a cutaway perspective view taken along line XX-XX' of FIG. 12. Also, FIG. 21 is an enlarged view illustrating a portion A of FIG. 20. Also, FIG. 22 is a cutaway perspective view taken along line XXII-XXII' of FIG. 12. Also, FIG. 23 is a perspective view of the shutter that is one component of the cultivation shelf. Also, FIG. 24 is an exploded perspective view illustrating a state in which the shutter is disassembled when viewed from the above. FIG. 25 is an exploded perspective view illustrating a state in which the shutter is disassembled when viewed from the below.

As illustrated in the drawings, water supplied to the water supply portion 316 may flow through the base passage 317 and then be supplied into the shutter accommodation portion 315 via the water supply guide portion 317a, the branch portion 317b, and the connection portion 317c.

Here, the bottom surfaces of the branch portion 317b, the connection portion 317c, and the shutter accommodation portion 315 may be the same height, and the supplied water may be filled at the same time into the branch portion 317b, the connection portion 317c, and the shutter accommodation portion 315. Also, the plurality of connection portions 317c and the shutter accommodation portions 315 connected to the branch portion 317b may also be filled with water at the same time. Also, to realize the vertical movement of the shutter 33, the shutter accommodation portion 315 may be recessed by a distance at which the lower end of the shutter 33 is movable downward.

Also, the shutter 33 may be provided inside the seat 320 that is recessed in the shelf tray 32. Also, the shutter 33 may be disposed at a position corresponding to the shutter accommodation portion 315 disposed on the shelf base 31.

Thus, the constituents of the shutter 33, which are disposed at the lower side with respect to the seat bottom surface 322, may be disposed inside the shutter accommodation portion 315, and the constituents of the shutter 33, which are disposed at the upper side with respect to the seat bottom surface 322, may protrude to operate due to the contact with the seed package 90 seated on the seat 320.

The shutter 33 may be maintained in a state mounted on the seat 320 and may operate according to the mounting of the seed package 90 so that water supplied to the shelf base 31 is selectively supplied to the seat 320 and the seed package 90. Since the shutter 33 determines water supply into the seat, the shutter 33 may be referred to as a water supply device or an opening/closing device.

That is, according to the operation of the shutter 33, the communication hole 334e defined in the bottom surface 322 of the seat may be opened and closed. That is, when the communication hole 334e is closed, the water supply to the seat 320 may be blocked, and when the communication hole 334e is opened, the water supply to the seat 320 and the seed package 90 may be enabled. Here, the operation of the shutter 33 may be configured to be opened while being pressed by the seed package 90 when the seed package 90 is mounted. Thus, the cultivation shelf 30 may be configured to provide the selective water supply by the operation of the mechanically configured shutter 33 without an electrical device requiring a separate power supply.

In the detailed structure of the shutter 33, the shutter 33 may include a shutter member 331 that moves vertically inside the shutter accommodation portion 315, a communication member 334 in which an opening opened and closed by the shutter member 331 is defined, and a pressing member 336 protruding from the seat bottom surface 322 and elevated by the contact with the seed package 90.

In detail, the shutter member 331 may have a size that is capable of being accommodated inside the shutter accommodation portion 315 to cover a plurality of communication holes 334e defined in the communication member 334 from below.

The shutter member 331 may be provided in a disk shape when viewed from above, and a screw hole 331c may be defined in a center of the shutter member 331. A screw 337 may be coupled to the screw hole 331c, and the screw 337 may pass through the shutter member 331 and be coupled to the boss portion 336b of the pressing member 336. Thus, the shutter member 331 and the pressing member 336 may be integrally coupled to each other and may move vertically together.

The shutter member 331 may have a flat bottom surface. Thus, when the shutter accommodation portion 315 is filled with water, the bottom surface of the shutter member 331 may be in contact with a water surface, and thus, the buoyancy may be effectively applied upward. Particularly, the shutter member 331 may be made of a material having buoyancy by which the shutter member 331 is capable of being floated in water, and when the shutter accommodation portion 315 is filled with water, the shutter member 331 may move upward according to the water level. For example, the shutter member 331 may be made of a foam material such as Styrofoam.

Further, a shutter member protrusion 331a protruding upward may be disposed on an upper side of the shutter member 331. The shutter member protrusion 331a may protrude upward from a position that is separated a predetermined distance from the center of the shutter member 331.

Also, a sealing member mounting portion 331d on which the sealing member 332 is mounted may be recessed in an outer surface of a shutter member protrusion portion 331a. The sealing member 332 may be provided in a shape such as an O-ring and may be made of a material having elasticity. Also, the sealing member 332 may be provided to be in contact with the bottom surface of the communication member 334 when the shutter member 331 moves upward.

Here, all of the communication holes 334e defined in the communication member 334 may be defined in an inner region of the sealing member 332. That is, the sealing member 332 may be provided in an O-ring shape, and a diameter of the sealing member 332 may be greater than a distance between the communication holes 334e. Thus, when the shutter member 331 moves upward so that the sealing member 332 is in contact with the communication member 334, water supplied to the shelf base 31 may not be supplied to the seat 320.

Also, a shutter member recess portion 331b on which the communication member guide portion 334b of the communication member 334 protruding downward is seated may be disposed on an inner surface of the shutter member protrusion portion 331a. Thus, when the shutter member 331 moves upward, a top surface of the shutter member 331 and a bottom surface of the communication member 334 may be maintained to be in close contact with each other.

That is, when the shutter accommodation portion 315 is filled with water, the shutter member 331 may move upward so that the sealing member 332 is in close contact with the communication member 334, and the communication member guide portion 334b and the shutter member recess portion 331b are in close contact with each other to maintain the closed state of the shutter member 331. In this state, the communication hole 334e may be covered by the shutter member 331 to prevent the water supplied to the shelf base 31 from flowing toward the seat 320.

The communication member 334 may be disposed at the center of the seat 320. The communication member 334 may be mounted on a communication member mounting hole 323 defined to pass through the seat 320. Here, a circumference of the communication member mounting hole 323 may be provided to be stepped and may be configured to support the circumference of the communication member 334. Also, a sealing member 332 may be further provided between the circumference of the communication member mounting hole 323 and the circumference of the communication member 334. Thus, in the state in which the communication member 334 is mounted, leaking of water between the circumference of the communication member mounting hole 323 and the circumference of the communication member 334 may be prevented.

The communication member 334 may be injection-molded using a plastic material. Thus, a relatively complex and three-dimensional structure may be provided. The communication member 334 may include a communication member guide portion 334b, a communication member circumferential portion 334a spaced apart from the communication member guide portion 334b and connected to the communication member mounting hole 323, and a plurality of openings defined between the circumferential portion 334a and the communication member guide portion 334b.

The communication member guide portion 334b may be defined at a central portion of the communication member 334. Also, a bottom surface of the communication member guide portion 334b may protrude downward and may be provided in a corresponding shape to be seated in the shutter member recess portion 331b.

Also, a top surface of the communication member guide portion 334b may include a spring groove 334f recessed downward. The spring groove 334f may be a portion into which a lower end of the spring 335 penetrated by a boss portion 336b is accommodated and may support the spring 335 from below. Also, an upper end of the spring 335 may be supported on a bottom surface of the pressing member 336.

Therefore, the spring 335 may maintain the closed state of the shutter 33 even when water is not accommodated inside the shutter accommodation portion 315, and when the pressing member 336 moves downward, the spring 335 may be compressed. That is, when the seed package 90 is removed from the seat 320 in the state in which the seed package 90 is seated, the pressing member 336 may move upward due to restoring force of the spring 335, and the shutter 33 may be maintained in the closed state.

If it is not necessary to maintain the closed state of the shutter 33 in a state in which the seed package 90 is not mounted, the spring may be omitted.

Also, a through-hole 334c through which the boss portion 336b of the pressing member 336 passes may be defined in the communication member guide portion 334b. The communication member guide portion 334b in which the through-hole 334c is defined may be bent in a shape such as a boss. Thus, the pressing member 336 may move vertically while passing through the through-hole 334c, and the shutter member 331 may also move vertically together with the pressing member 336.

The communication member circumferential portion 334a may be connected to the communication member mounting hole 323, and the sealing member 332 may be disposed along an outer end of the communication member circumferential portion 334a. An inner diameter of the communication member circumferential portion 334a may be larger than an outer diameter of the communication member guide portion 334b, and the communication member circumferential portion 334a and the communication member guide portion 334b may be spaced apart from each other. Also, the communication member 334 may further include a communication member connection portion 334d that connects the communication member circumferential portion 334a to the communication member guide portion 334b, which are spaced apart from each other.

A plurality of communication member connection portions 334d may be arranged at regular intervals along the communication member guide portion 334b and the communication member circumferential portion 334a. Thus, a space between the communication member connection portions 334d may be defined as the communication hole 334e.

The communication member connection portion 334d may connect the whole portion between the communication member guide portion 334b and the communication member circumference portion 334a. In this case, the communication holes 334e may be defined at regular intervals along the communication member connection portion 334d.

Therefore, when the shutter 33 is opened, the water of the shelf base 31 may be transferred inside the seat 320 through the communication hole 334e defined between the communication member guide portion 334b and the communication member circumferential portion 334a.

The communication member guide portion 334b may protrude further upward than the communication member circumferential portion 334a, and thus, the communication member connection portion 334d may be formed to be inclined or rounded. The communication hole 334e disposed on the communication member connection portion 334d may also be opened upward to the outside, and the water discharged when the shutter 33 is opened may be directed laterally to more smoothly flow to the seed package 90.

Thus, even in the state in which the pressing member 336 is pressed by the seed package 90 to move downward, the communication hole 334e may not be blocked or covered, and thus, the water introduced or discharged through the communication hole 334e may smoothly flow radially with respect to the center of the communication member 334.

Also, when the shutter 33 is closed, the shutter member protrusion 331a may be accommodated in a space below the communication member connection portion 334d.

The pressing member 336 may include a contact portion 336a that protrudes from the inside of the seat 320 and is in contact with the seed package 90 and a boss portion 336b extending downward from a center of the contact portion 336a.

The contact portion 336a may be provided in a disk shape and may have a size corresponding to a top surface of the water inlet 912 of the seed package 90. Thus, when the seed package 90 is mounted, the contact portion 336a may be pressed by the top surface of the water inlet 912 from the inside of the water inlet 912.

A size of the contact portion 336a may correspond to that of the communication member 334, and thus the communication member 334 may be configured to be covered by the contact portion 336a when viewed from above.

Also, a contact portion groove 336c may be defined in a bottom surface of the contact portion 336a. The contact portion groove 336c may be defined along a circumference of a bottom surface of the contact portion 336a and may be recessed at a position facing the communication hole 334e of the communication member 334. Thus, when water is supplied through the communication hole 334e, a space may be secured between the communication hole 334e and the bottom surface of the contact portion 336a to facilitate the flow of the supplied water.

Also, the boss portion 336b may extend downward from the center of the contact portion 336a and may extend downward to pass through the through-hole 334c. Also, a screw hole 336d may be defined on a bottom surface of the boss portion 336b so that the screw 337 passing through the shutter member 331 is coupled to the bottom surface of the boss portion 336b. Thus, the shutter member 331 and the pressing member 336 may be integrally coupled to each other by the screw 337.

As described above, the pressing member 336 and the shutter member 331 may open and close the communication hole 334e while moving in the vertical direction based on the communication member 334 in a fixed state and also may selectively supply water to the seed package 90.

Also, although this embodiment discloses the structure in which the communication member 334 is mounted on the communication member mounting hole 323 opened in the seat 320, the separate communication member 334 may not be mounted, and when the seat bottom surface 322 is molded, a structure corresponding to the communication member 334 may be molded together.

Hereinafter, the operation of the shutter 33 for selectively supplying water and a water supply/drain structure will be described in more detail with reference to the drawings.

Figure 26:
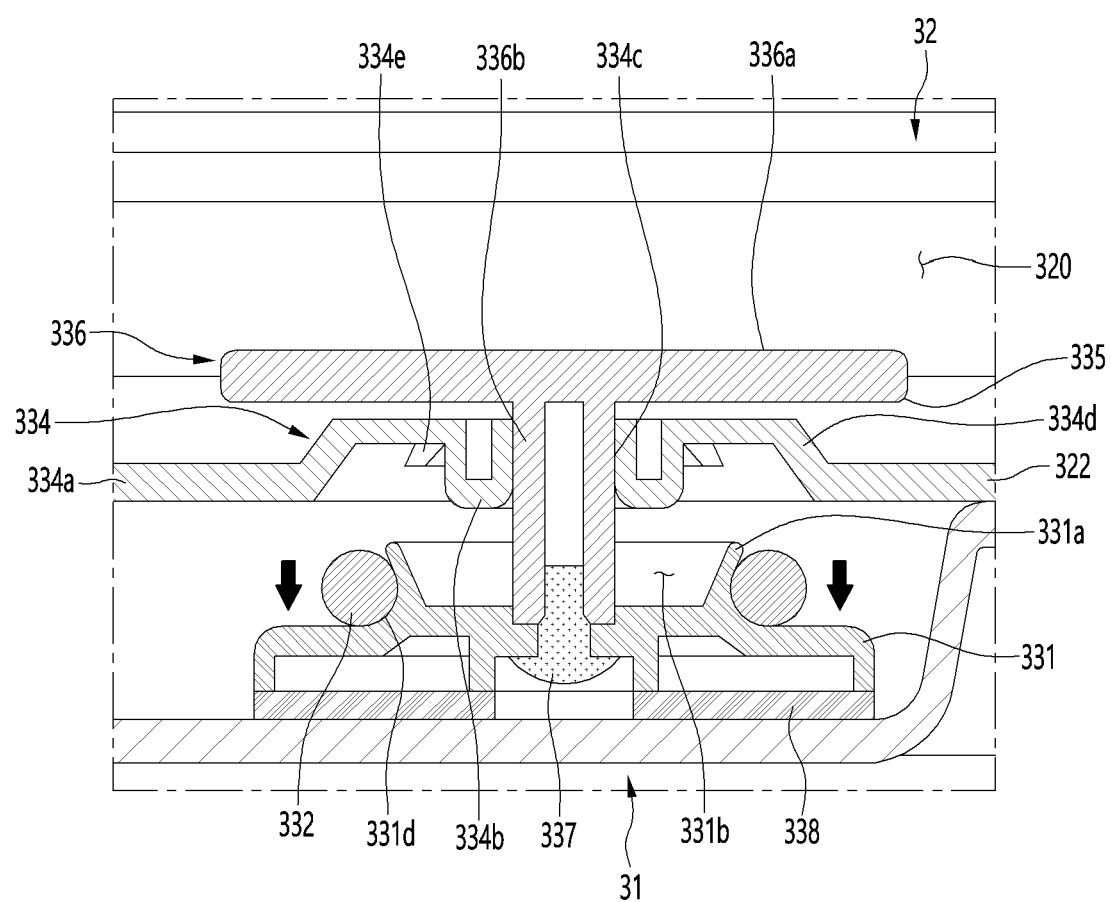
FIG. 26 is a view illustrating a state of the shutter when water is not supplied to the cultivation shelf.

FIG. 26 is a view illustrating a state of the shutter when water is not supplied to the cultivation shelf.

As illustrated in the drawings, when water is not supplied to the cultivation shelf 30, or when the water in the cultivation shelf 30 is fully drained, there is no water in the shutter accommodation portion 315.

When there is no water inside the shutter accommodation portion 315, the buoyancy for moving the shutter 33 upward is not applied. Also, the shutter 33 may move downward by its own weight, and the bottom surface of the shutter member 331 may be supported on the bottom surface of the shutter accommodation portion 315.

Also, in this state, the shutter 33 may be in an opened state in which the shutter moves downward. Also, since the shutter 33 moves downward, the contact portion 336a of the pressing member 336 may shield a portion in which the communication hole 334e is defined, and when viewed from the outside, an area of the contact portion 336a, which corresponds to the communication member 334 may be covered.

FIG. 26 illustrates a structure in which the communication member 334 is integrated with the seat 320 of the shelf tray 32. Thus, although the communication member 334 is not directly illustrated, the communication member guide portion 334b, the communication member circumference portion 334a, and the communication member connection portion 334d, which correspond to the communication member 334, may be shielded by the contact portion 336a. Here, although the shutter 33 is in an opened state, since there is no water in the shutter accommodation portion 315, water may not be supplied to the inside of the seat 320.

In this state, the water in the water tank 70 may be supplied to the cultivation shelf through the water supply pipe 84 by driving the pump 83.

Figure 27:
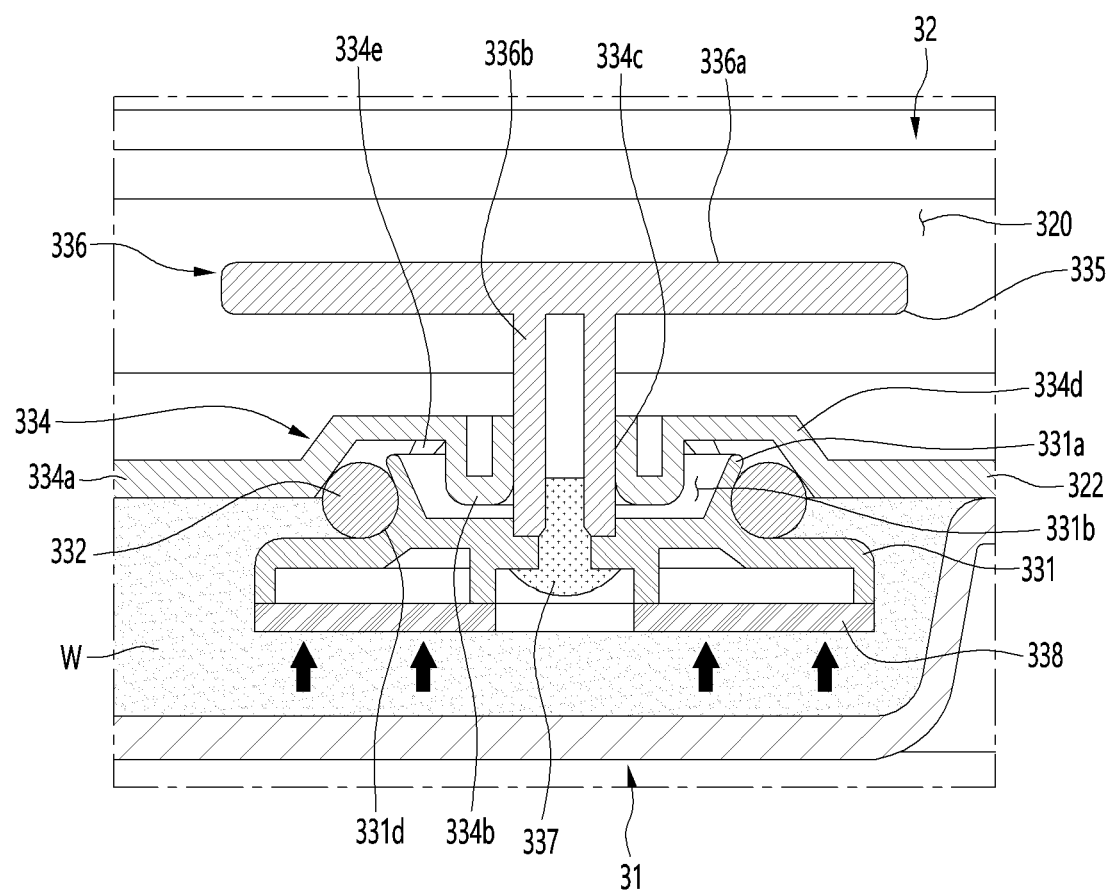
FIG. 27 is a view illustrating a state of the shutter when water is supplied to the cultivation shelf.

FIG. 27 is a view illustrating a state of the shutter when water is supplied to the cultivation shelf.

As illustrated in the drawing, when water is supplied to the water supply portion 316 of the cultivation shelf 30, the water may be supplied along the base passage 317 of the shelf base 31. In this case, water may be supplied to all the shutter accommodation portions 315 provided in the cultivation shelf 30. That is, regardless of whether the seed package 90 is mounted, water may be supplied to all the shutter accommodation portions 315 of the cultivation shelf 30.

Water W supplied to the shutter accommodation portion 315 may be supplied to a set amount according to the operation time of the pump 83, and the amount of water W capable of reaching the full water level H2 may be supplied. Alternatively, the water supply may be stopped by the floater 34 during this process.

All of the plurality of shutter accommodation portions 315 may be filled by driving the pump 83, and the shutter 33 may move upward by the water W filled in the shutter accommodation portions 315. In detail, the shutter member 331 may generate buoyancy due to the water W filled in the shutter accommodation portion 315, and thus, the shutter 33 may move upward.

In this case, the shutter member 331 may have the buoyancy by which the shutter member 331 is capable of being floated in the water W and thus may move upward as the shutter accommodation portion 315 is filled with the water W. The shutter member 331 may not be entirely made of a material having the buoyancy, and as illustrated in FIGS. 25 to 28, a floating portion 338 made of a material having buoyancy may be coupled to the bottom surface of the shutter member 331. That is, the shutter member 331 may be made of a plastic material, and the floating portion 338 may be made of a material having buoyancy to be floated in water, thereby increasing in durability of the shutter member 331 and providing the buoyancy for the operation of the shutter member 331.

When the shutter accommodation portion 315 is fully filled with water, the shutter member 331 may be raised to a maximum height, and as illustrated in FIG. 27, the sealing member 332 may be in contact with the communication hole 334e, and thus, the shutter 33 may be in the closed state. When the shutter 33 is closed, a circumferences of the communication holes 334e may be airtight by the sealing member 332, and thus, the water inside the shutter accommodation portion 315 may not be supplied.

Also, when the shutter 33 is closed, the pressing member 336 may protrude to the maximum height to protrude from the bottom surface 322 of the seat. In the state in which the seed package 90 is not mounted on the cultivation shelf 30, the shutter 33 may be maintained in the closed state, and water may not be supplied to the inside of the mounting portion 320.

The seed package 90 may be mounted on the cultivation shelf 30 for cultivation of the plants. Also, water may be supplied into the seat 320 and the seed package 90 when water is supplied to the seat 320, on which the seed package 90 is seated, among the plurality of seats 320.

Figure 28:
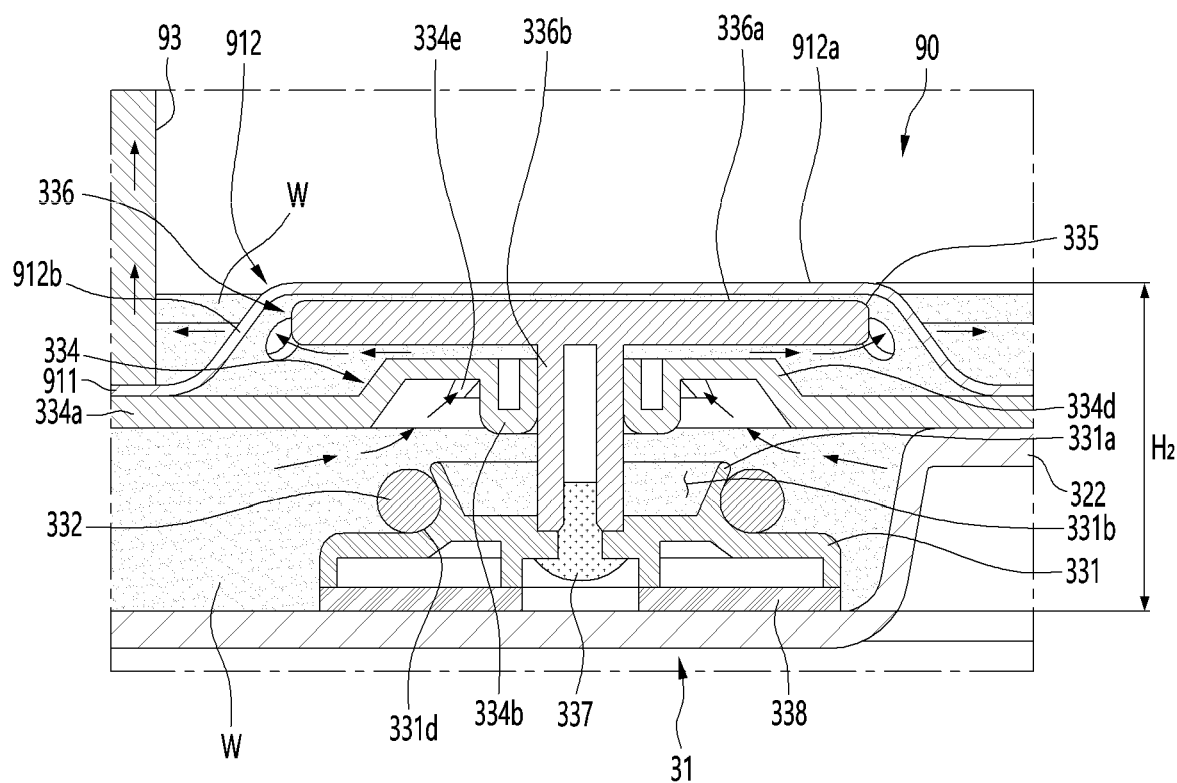
FIG. 28 is a view illustrating a state of the shutter and a water supply state in a state in which the seed package is seated on the cultivation shelf.
Figure 29:
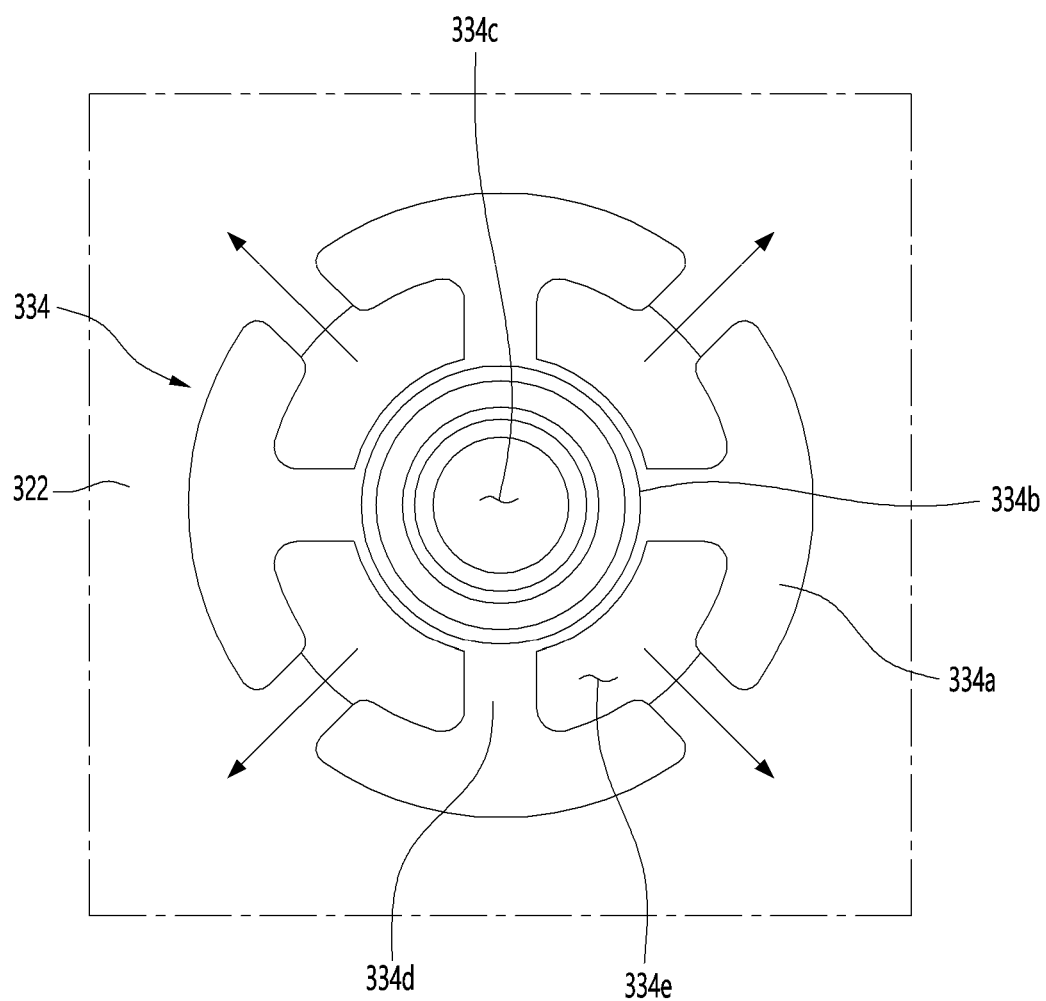
FIG. 29 is a plan view illustrating a state of a shelf water supply portion of the cultivation shelf when water is supplied.
Figure 30:
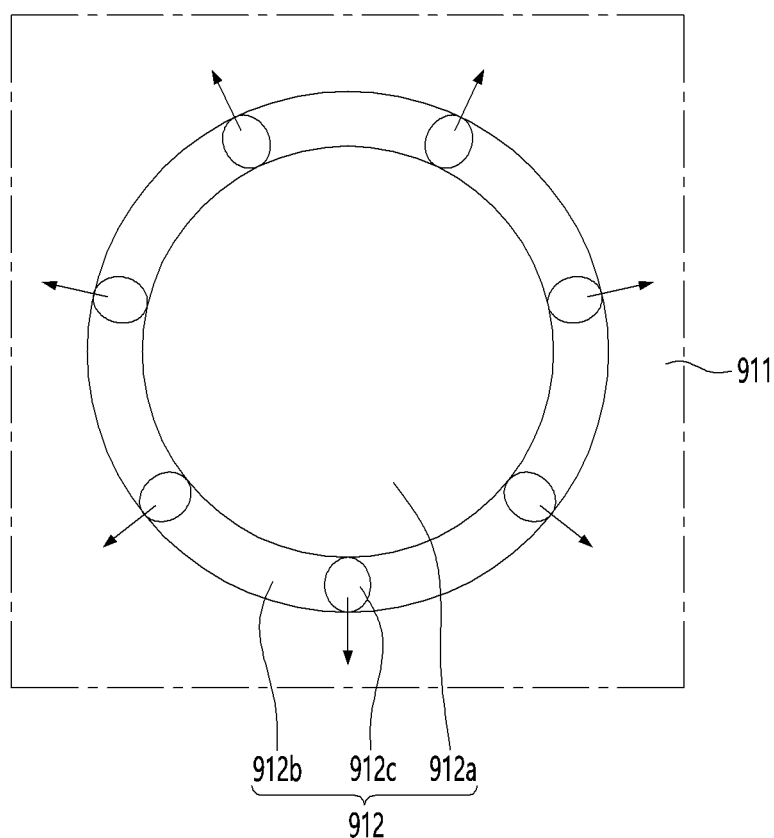
FIG. 30 is a plan view illustrating a state of a shelf water supply portion of the seed package when water is supplied.

FIG. 28 is a view illustrating a state of the shutter and a water supply state in a state in which the seed package is seated on the cultivation shelf. Also, FIG. 29 is a plan view illustrating a state of a shelf water supply portion of the cultivation shelf when water is supplied. Also, FIG. is a plan view illustrating a state of a shelf water supply portion of the seed package when water is supplied.

As illustrated in the drawings, the seed package 90 may be seated on the cultivation shelf 30. When the seed package 90 is seated on the seat 320, the pressing member 336 of the shutter 33 may be disposed inside the water inlet 912 of the seed package 90, and the pressing member 336 may be pressed by a top surface of the water inlet 912.

The pressing member 336 may be pressed by a weight of the seed package 90 to move downward. As the pressing member 336 moves, the shutter member 331 connected to the pressing member 336 may also move downward, and the shutter 33 may be opened. That is, the shutter member 331 may move to a bottom surface of the shutter accommodation portion 315, and the sealing member 332 may be spaced apart from the communication member 334 so that the water supplied to the cultivation shelf 30 is introduced into the seat 320 through the communication hole 334e.

In detail, the water supplied to the cultivation shelf 30 may be guided to the shutter accommodation portion 315 along the base passage 317. Here, the supplied water may be introduced to the inside of the seat 320 on which the seed package 90 is mounted, and the shutter 33 is opened.

Here, the communication hole 334e may be provided in a shape of which side and top surfaces are opened, and thus, even when the pressing member 336 move downward, the water may be effectively discharged. Water passing through the communication hole 334e defined in the seat bottom surface 322 may be radially discharged from the center of the shutter 33. Also, the container bottom surface 911 of the seed package 90 may be in contact with the seat bottom surface 322. Thus, water discharged through the communication hole 334e may be supplied into the seed package 90 through the container opening 912c defined along the circumference of the water inlet 912.

The container opening 912c may be disposed at a side that is spaced apart from the communication hole 334e and may be defined along the circumference of the communication hole 334e. Thus, the water discharged radially through the communication hole 334e may be supplied into the container 91 through the container opening 912c.

The water supplied to the cultivation shelf 30 may be supplied to the full water level H2 when a set amount of water is supplied. The full water level H2 may be set at least higher than the container opening 912c. Thus, when the water supply to the cultivation shelf 30 is completed, the water may be filled up to a top surface of the water inlet 912 inside the seed package 90.

The water introduced into the seed package 90 may be supplied to the seed accommodation member 93 disposed to be in contact with the container bottom surface 911 of the seed package 90, and the seed accommodation member 93 may absorb the supplied water to supply the water to seeds or plants inside the seed accommodation member 93. Here, the water supplied to the seeds or plants may contain nutrients input from the water tank 70, and thus, even in the state without providing a separate medium or soil inside the seed package 90, the nutrients required for the growth of the seed or plant may be supplied.

In the state in which the water is supplied to the cultivation shelf 30, the opening/closing member 36 may be maintained in the closed state for a set time. Also, after the time for which a sufficient amount of water is absorbed into the seeds or plants elapses, the driving device 86 may operate to open the opening/closing member 36, and the water of the cultivation shelf 30 may be discharged through the drain hole 319.

Figure 31:
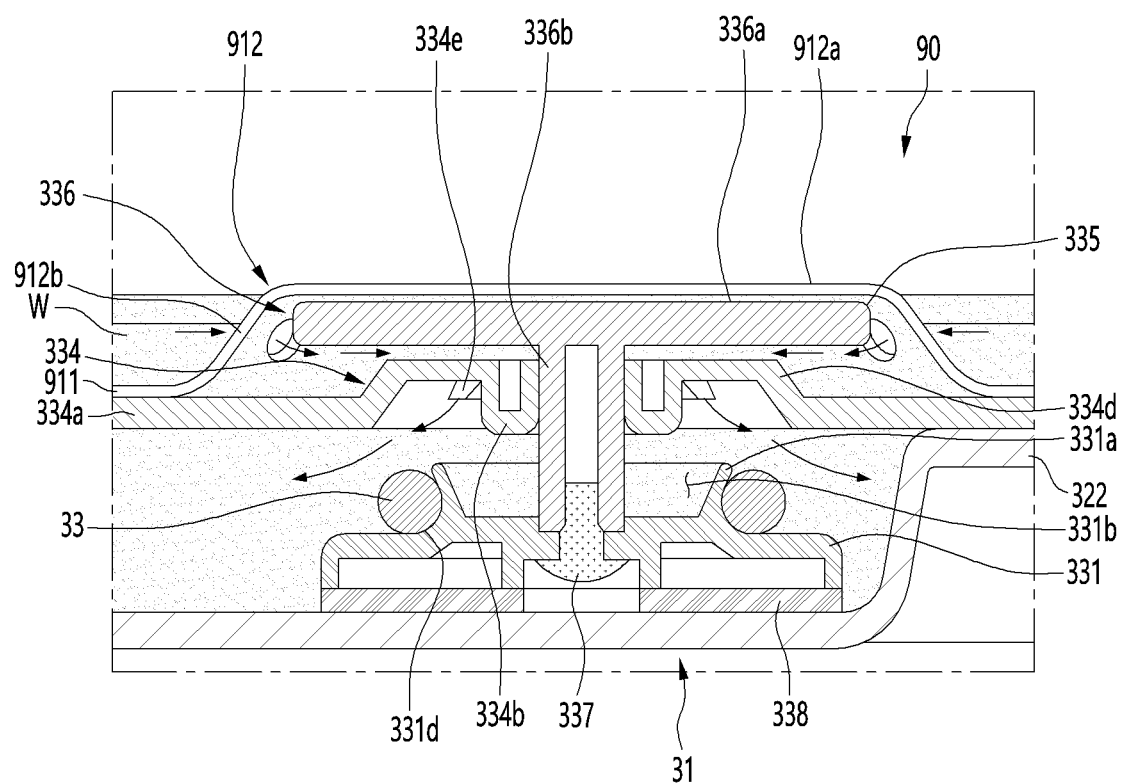
FIG. 31 is a view illustrating a state of the shutter and a water drain state in a state in which the seed package is seated on the cultivation shelf.

FIG. 31 is a view illustrating a state of the shutter and a water drain state in a state in which the seed package is seated on the cultivation shelf.

As illustrated in the drawing, when a set time elapses after the water supply in the state in which the seed package 90 is mounted on the seat 320, the water inside the cultivation shelf may be drained. The opening/closing member 36 may open the drain hole 319 by the driving of the driving device 86, and the water inside the cultivation shelf 30 may be discharged through the drain hole 319.

In detail, the water inside the cultivation shelf 30 may be drained by the opening of the drain hole 319. Here, the water inside the shutter accommodation portion 315 may flow toward the drain hole 319 along the base passage 317.

Here, since the seed package 90 is mounted, the shutter 33 may be maintained in the opened state as ever. Thus, the water inside the seed package 90 may be drained through the container opening 912c of the water inlet 912 to flow into the shutter accommodation portion 315 through the communication hole 334e of the seat 320.

As a result, the water inside the cultivation shelf 30 as well as the water inside the seed package 90 may be discharged through the base passage 317 to the drain hole 319. Also, the water discharged through the drain hole 319 may be collected to the water tank 70 through the drain tray 85 and the drain pipe 89.

Also, when the drainage inside the cultivation shelf 30 is completed, the opening/closing member 36 may be returned to its initial position by the operation of the driving device 86 to close the drain hole 319.

When the water of the cultivation shelf 30 is fully drained, no water exists inside the cultivation shelf 30, and the water inside the seed package 90 as well as the cultivation shelf 30 may be fully drained.

Alternatively, most of the water may be drained even if water does not exist completely inside the cultivation shelf 30 and the seed package 90, and the remaining water may also be removed by the operation of the blower 50.

As described above, the inside of the seed package 90 as well as the cultivation shelf 30 may be maintained without water except for a certain time period after the water supply. Thus, the mold or green algae may be prevented from being generated on the cultivation shelf 30, and thus, the clean state may be maintained.

Particularly, the water supplied to the seat 320, on which the seed package 90 is mounted, as well as the seat 320, on which the seed package 90 is not mounted, may not be exposed. That is, when the seed package 90 is mounted, the inside of the seat 320 may be filled by the seed package 90, and water passing through the shutter 33 may be supplied to the seed package 90m, and thus, the water supplied to the outside may not be exposed.

In addition, when the seed package 90 is not mounted, the shutter 33 may be maintained in the closed state so that the water in the shelf base 31 is not exposed to the seat 320. Therefore, since the cultivation shelf 30 is not expose the supplied water to the outside in any case regardless of whether the seed package 90 is mounted, the contamination due to the water exposed to the outside may be fundamentally prevented to allow the inside of the cultivation space 100 to be maintained in the clean state.

The apparatus for cultivating plants according to an embodiment may be implemented in various other embodiments in addition to the foregoing embodiment. According to another embodiment, there is a difference in arrangement structure of a seat of a cultivation shelf, and thus, there is a difference in structure of a base seat and a base passage of a shelf base. Also, other structures except for the structure of the shelf tray and the shelf base constituting the cultivation shelf are the same as the above-described embodiment, and thus, the same reference numerals are used to avoid duplication of descriptions for the same configuration, and detailed descriptions and illustrations thereof will be omitted.

Figure 32:
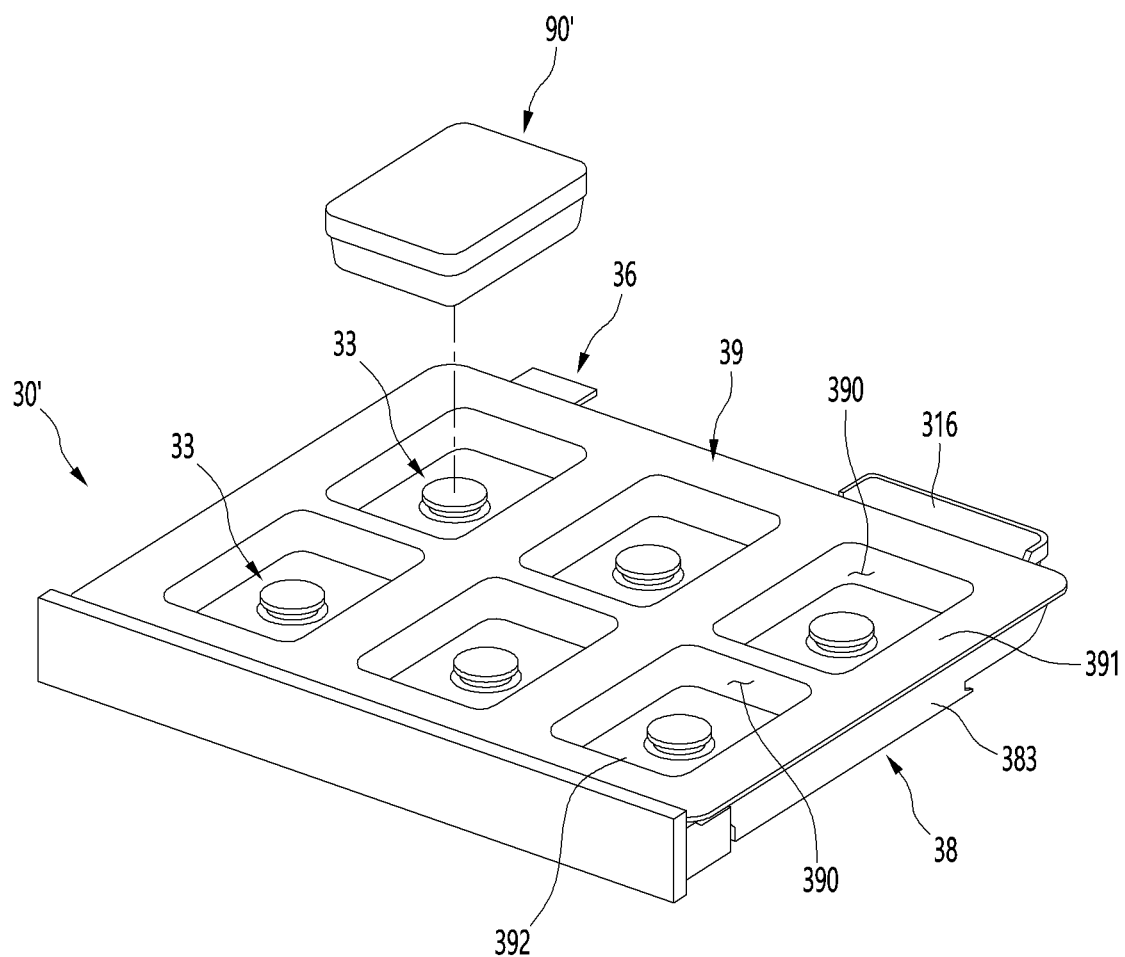
FIG. 32 is a perspective view of a cultivation shelf according to another embodiment.
Figure 33:
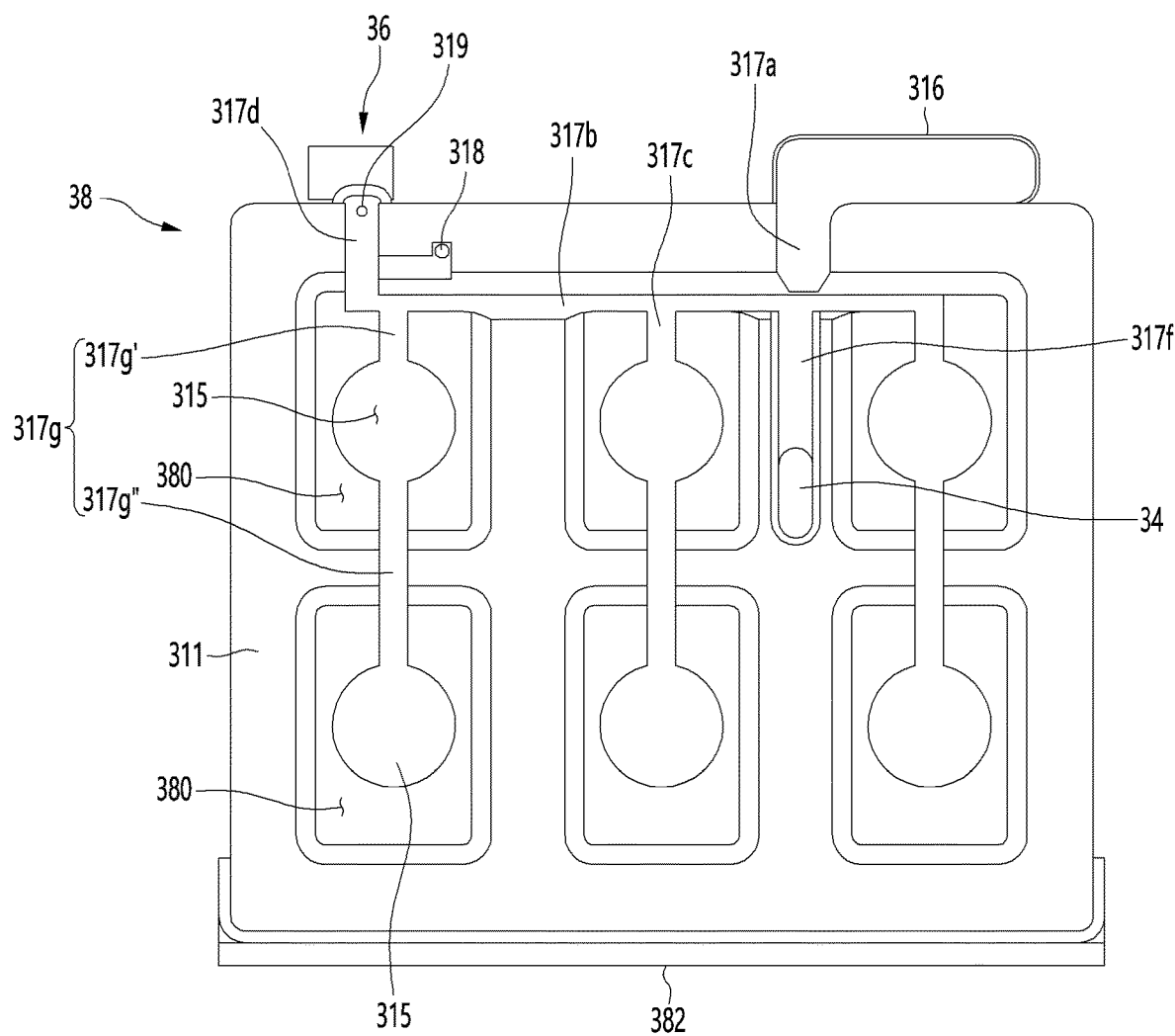
FIG. 33 is a plan view of a shelf base that is one component of the cultivation shelf.

FIG. 32 is a perspective view of a cultivation shelf according to another embodiment. Also, FIG. 33 is a plan view of a shelf base that is one component of the cultivation shelf.

As illustrated in the drawings, an apparatus 1 for cultivating plants according to another embodiment may include a cultivation shelf 30'. The cultivation shelf 30' may be configured so that the plurality of the seed packages 90 are seated, and the water supplied from the water tank 70 may be supplied to the seed packages 90'.

Here, the seed package 90' has a relatively small size compared to the above-described embodiment and may have a structure including only one type of plant. That is, the seed package 90' may have about half the size of the seed package 90 according to the above-described embodiment.

The cultivation shelf 30' may include a shelf tray 39 on which the seed package 90' is mounted, and a shelf base 38 accommodating water supplied to the seed package 90'. Also, the shelf tray 39 may be seated on the shelf base 38 to define an outer appearance of the top surface of the cultivation shelf 30'.

The shelf tray 39 may be made of a metal material to have an excellent and clean outer appearance. For example, the shelf tray 39 may be made of a stainless material to be resistant to contamination and to facilitate cleaning and management.

The shelf tray 39 may be mounted in a state of overlapping a top surface of the shelf base 38 and may be provided in a shape corresponding to the top surface shape of the shelf base 38. Also, when the shelf tray 39 is mounted, a front surface and left and right surfaces of the shelf base 38 may be exposed, and the water supply portion 316 and the opening/closing member 36, which are disposed on a rear surface of the shelf base 38, may also protrude to a rear side of the shelf tray 39.

The shelf tray 39 may be provided in a rectangular shape when viewed from above. Also, the shelf tray 39 may include a tray top surface 391 that defines an outer appearance of the top surface as a whole and a seat 390 recessed from a top surface. A plurality of seats 390 may be provided in a horizontal and vertical direction, and as illustrated in FIG. 32, six seats may be provided in a left and right direction, three seats may be provided in a horizontal direction, and two seats may be provided in a vertical direction.

The seat 390 may be recessed in a shape corresponding to the seed package 90' so that the seed package 90' is seated. Here, a seat bottom surface 392 defining an inner bottom surface of the seat 390 may have a size and shape corresponding to those of a bottom surface of the seed package 90'. Thus, when the seed package 90' is seated on the seat 390, the bottom surface of the seed package 90' may be in surface contact with the seat bottom surface 392.

Also, the shutter 33 may be provided at a center of the bottom surface 392 of the seat. One shutter 33 may be provided for each of the plurality of seats 390. Also, the shutter 33 may be mounted to pass through the bottom surface 392 of the seat. The shutter 33 may move vertically to allow the water accommodated in the shelf base 38 to be selectively introduced.

The shutter 33 may operate according to the mounting of the seed package 90'. That is, water may not be introduced into the seat 390, on which the seed package 90' is not mounted, among the plurality of seats 390, and water may be introduced into the seat 390, on which the seed package 90' is mounted, so that the water may be supplied to the seed package 90'.

That is, the shutter 33 may selectively supply water to the seat 390, on which the seed package 90' is mounted, according to whether the seed package 90' is mounted, among the plurality of seats 390.

The shutter 33 may be disposed at a position facing the water inlet 912 of the seed package 90', and when the seed package 90' is seated on the seat 390, a portion of the shutter 33 may be accommodated inside the water inlet 912, and a top surface of the water inlet 912 may press a top surface of the shutter 33 so that the shutter 33 operates. A structure and operation of the shutter 33 may be the same as in the above-described embodiment.

The shelf base 38 may be provided below the shelf tray 32. The shelf base 38 may be configured to allow water supplied from the water tank 70 to flow and be stored and may have a top surface shape corresponding to a bottom surface shape of the shelf tray 39 so that the shelf tray 39 is seated.

The shelf base 38 may be made of a plastic material and may be provided in a square shape corresponding to the shelf tray 39 when viewed from above. Also, the shelf base 38 may include a base top surface 381 on which the shelf tray 39 is mounted and a base seat 380. Also, a handle 382 for the withdrawal of the cultivation shelf 30 may be provided on a front surface of the shelf base 38, and a base side surface 383 coupled to the shelf rail for the withdrawal of the cultivation shelf 30 may be provided at each of both left and right sides of the shelf base 38.

Also, a shutter accommodation portion 315 in which the shutter 33 is accommodated and a base passage 317 connecting the shutter accommodation portion 315 to the water supply portion 316 and the drain hole 319 may be provided inside the shelf base 38. Also, a water supply portion 316 through which water is supplied to the shelf base 38 may be provided at one side of a rear end of the shelf base 38. Also, an opening/closing member 36 that opens and closes the drain hole 319 may be provided at the other side of the rear end of the shelf base 38, and the floater 34 that detects a water level of the shelf base 38 may be provided at one side of the shelf base 38.

The base mounting portion 380 may be provided in a shape corresponding to the mounting portion 390. That is, six base seats 380 may also be provided inside the shelf base 38.

Also, a shutter accommodation portion 315 may be provided at an inner center of the base seat 380. The shutter accommodation portion 315 may be disposed at a position corresponding to the shutter 33 in a state of being mounted on the shelf tray 39, and the shutter accommodation portion 315 may be provided for each of the plurality of base seats 380.

Also, the shutter accommodation portion 315 may have a size capable of accommodating the shutter 33 therein. The shutter accommodation portion 315 may be provided in a circular shape to accommodate a lower portion of the shutter 33 and may be recessed to a set height to secure vertical movement of the shutter 33 without interfering with the shutter 33 when the shutter 33 moves vertically and secures. The shutter accommodation portion 315 may be recessed to a height at which the shutter accommodation portion is spaced somewhat apart from the lower end of the shutter 33 when the shutter 33 moves to the lowermost position. For example, the set height may be approximately 14 mm.

The shelf base 38 may be provided with a base passage 317, through which water flows, on the shelf base 38. The base passage 317 may be provided to connect all of the water supply portion 316, the shutter accommodation portion 315, the water level detection portion 317f, the drain hole 319, and the drain portion 318 to each other. In addition, the base passage 317 may guide the water supplied to the shelf base 38 so as to be effectively supplied to the seed package and drained after the water supply is completed.

The base passage 317 may include a water supply guide portion 317a, a water supply guide portion 317a, a branch portion 317b, a connection portion 317g, and a drain guide portion 317d.

In detail, the water supply guide portion 317a may be configured to connect the water supply portion 316 to the branch portion 317b and may extend from one end of the water supply portion 316 to the branch portion 317b. In addition, the branch portion 317b may be disposed along the rear ends of the seats 320 disposed on the shelf base 38. The branch portion 317b may pass through all of three base seats 380 disposed on a rear portion of the shelf base 38, and one end of the branch portion 317b may be connected to the drain guide portion 317b connected to the drain hole 319.

The drain guide portion 317d may be connected from one end of the branch portion 317b to the drain hole 319. Also, the drain hole 319 may be defined in an end of the drain guide portion 317d, and the drain hole 319 may be defined at the lowest position of the bottom surface of the drain guide portion 317d. Thus, water passing through the branch portion 317b may be naturally discharged to the drain hole 319 through the drain guide portion 317d.

A plurality of connection portions 317g may be disposed on the branch portion 317b. The plurality of connection portions 317g may be provided for each of the base seats 380 and may be connected to the entire shutter accommodation portion 315 disposed on the shelf base 38.

In detail, the connection portion 317g may include a front connection portion 317g" and a rear connection portion 317g'. The rear portion connection portion 317g' may connect the branch portion 317b to the shutter accommodation portion 315 inside the base seat 380 disposed at the rear portion of the shelf base 38. Also, the front portion connection portion 317g" may connect a shutter accommodation portion 315 inside the base seat 380 disposed at a front portion of the shelf base 38 to the shutter accommodation portion 315 inside the base seat 380 disposed at the front portion of the shelf base 38.

Thus, water supplied through the water supply portion 316 may flow sequentially to the water supply guide portion 317a and the branch portion 317b. Also, the water flowing along the branch portion 317b may be first supplied to the shutter accommodation portion 315 inside the base seats 380 disposed at the rear portion through a plurality of the rear portion connection portions 317g' and then may be supplied to the shutter accommodation portion 315 inside the base seats 380 disposed at the front portion connected through the front portion connection portion 317g". That is, the water may be supplied to all the shutter accommodation portions 315 through the branch portion 317b, the front connection portion 317g', and the rear connection portion 317g".

While water is supplied to the water supply portion 316 and until a set time elapses before the start of the drainage, the opening/closing member 36 may be closed, and thus, the drain hole 319 may be in the closed state. Thus, the water supply into the shutter accommodation portion 315 may be maintained.

The base passage 317 may further include a water level detection portion 317f. The water level detection portion 317f may be configured to prevent water supply above a full water level into the shelf base 38 from occurring and may be configured so that the floater 34 is disposed in the water level detection portion 317f.

Also, the base passage 317 may further include a drain guide portion 317e. The drain guide portion 317e may be disposed at one side of the shelf base 38 and be configured to prevent the water level of the shelf base 38 from exceeding the limit water level.

The apparatus for cultivating the plants according to the embodiment may expect the following effects.

The apparatus for cultivating the plants according to the embodiment may be sealed by the door, and the cultivation space may be controlled in temperature by the temperature adjustment device to create the environment that is easy to cultivate the plants. However, the environment of the cultivation space may be provided as the environment under which the mold and the green algae are easily generated. Thus, the water may be selectively supplied to only the area on which the seed package is disposed, and after the set time elapses after the water is supplied, the cultivation shelf may be emptied to minimize the inside of the cultivation space from being contaminated, thereby improving the sanitation in the cultivation space.

Particularly, the cultivation shelf may include the shelf tray, on which the seed package is mounted, and the shelf base disposed under the shelf tray to accommodate the water. In addition, the shelf tray may have the structure that shields the shelf base from above to prevent the water supplied to the cultivation shelf from being directly exposed to the outside.

Therefore, the inside of the cultivation space may be prevented from being contaminated by the supplied water to prevent the green algae from be generated by supplying the light to the water of the cultivation shelf, thereby maintaining the sanitation states of the cultivation shelf and the cultivation space.

In addition, the plurality of seats on which the seed package is seated may be disposed on the cultivation shelf, and the shutter that is opened when the seed package is seated may be provided on each of the seats. The shutter may enable the selective water supply to only the seat, on which the seed package is seated, among all the seats of the cultivation shelf, and thus, the water may not be supplied to the seat, on which the seed package is not mounted, to prevent the supplied water from being exposed to the outside, thereby preventing the occurrence of the contamination.

That is, when the seed package is mounted, the seat may be shielded by the seed package, and the water passing through the shutter may be supplied to the seed package to prevent the water supplied to the outside from being exposed. In addition, when the seed package is not mounted, the shutter may be maintained in the closed state so that the water in the shelf base is not exposed to the seat. Therefore, since the cultivation shelf does not expose the supplied water to the outside in any case regardless of whether the seed package is mounted, the water contamination may be fundamentally prevented to allow the inside of the cultivation space to be maintained in the clean state.

In addition, the cultivation shelf may be configured to provide the quantitative water supply by the pump, thereby preventing the water from overflowing due to the excessive supply of the water. Also, the water level in the cultivation shelf may be detected by the water level detection device, and thus, when the water level in the cultivation shelf increases above the set level due to the malfunction of the pump or the problem during the drainage, the increase in water level may be detected to stop the water supply, thereby preventing the water from overflowing. In addition, even if the water is supplied in the situation in which the water level detection is impossible due to the malfunction of the water level detection device, the drain portion may be disposed in the cultivation shelf to drain the water that is above the limit water level when the water is supplied above the limit water level, thereby preventing the cultivation space from being contaminated.

In addition, the cultivation shelf may be provided with the base passage through which the water to be supplied is directed to the plurality of base seats to realize the uniform water supply to the cultivation shelf. In addition, the water in the cultivation shelf and the seed package may be completely drained through the drain hole connected to the base passage. Therefore, when the set time elapses enough to allow the plants to absorb the water after the water is supplied, the water in the cultivation shelf is completely drained so that there is no water inside the cultivation shelf to prevent the mold or the green algae from being generated, thereby preventing the odor in the cultivation space from occurring and improving the sanitation.

In addition, the cultivation shelf may have the structure that is accessible and also may have a structure that does not interfere with the water supply pipe and the drain pipe even when the cultivation shelf is inserted and withdrawn. Therefore, the water may be automatically supplied and drained by the user, and simultaneously, the seed package may be easily detached, and the plants may be easily managed through the insertion and withdrawal of the cultivation shelf, thereby improving the convenience in use.

In addition, the electrical device for detecting the water level and the position of the shelf may not be disposed on the cultivation shelf, and the water level and the position of the shelf may be respectively detected through the water level detection device and the shelf detection device at the outside of the cultivation shelf. As a result, since the electric wire and the power supply structure are not disposed on the cultivation shelf having the accessible structure, the cultivation shelf may be simplified in structure.

In addition, the shutter may be opened by the weight of the seed package without providing the electrical device or supplying the power and be closed by the buoyancy of the shutter due to the supplied water to secure the operational reliability, and the cultivation shelf may be more simplified in configuration.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for cultivating plants, the apparatus comprising:
    a cabinet that defines a cultivation space;
    a temperature control device disposed in the cabinet and configured to adjust a temperature of the cultivation space;
    a door configured to open and close at least a portion of the cultivation space;
    a shelf disposed in the cabinet and configured to support a plurality of seed packages of the plants;
    a lighting device disposed in the cabinet and configured to radiate light to the shelf; and
    a water supply module disposed at the cabinet and configured to supply water to the shelf,
    wherein the shelf comprises:
        a plurality of seats that are recessed from an upper surface of the shelf, each of the plurality of seats being configured to seat one of the plurality of seed packages, and
        a plurality of shutters disposed at the plurality of seats, respectively, each of the plurality of shutters being configured to be opened and closed to thereby selectively supply the water to a corresponding seat among the plurality of seats, and
    wherein each of the plurality of shutters is configured to:
        maintain a closed state based on no seed package being seated on the corresponding seat, and
        based on a seed package among the plurality of seed packages being seated on the corresponding seat, be opened by contact with the seed package.

2. The apparatus according to claim 1, wherein each of the plurality of shutters is configured to maintain an opened state by contacting the seed package that is seated on the corresponding seat.

3. The apparatus according to claim 1, wherein each of the plurality of seats has a recessed shape corresponding to one of the plurality of seed packages.

4. The apparatus according to claim 1, wherein each of the plurality of shutters is disposed at a bottom surface of one of the plurality of seats, and
    wherein each of the plurality of shutters is configured to be opened based on the seed package being seated on the corresponding seat and pressing a corresponding shutter among the plurality of shutters.

5. The apparatus according to claim 1, wherein the shelf further comprises:
    a tray including the plurality of seats; and
    a shelf base disposed below the tray and configured to accommodate the water supplied from the water supply module, and
    wherein the plurality of shutters are configured supply the water in the shelf base to an inside of the plurality of seats, respectively.

6. The apparatus according to claim 5, wherein the tray is made of a stainless material, and the tray and the plurality of seats are one body.

7. The apparatus according to claim 5, wherein the shelf base is made of a plastic material.

8. The apparatus according to claim 5, wherein the shelf base defines a recess configured to store the water, and
    wherein the plurality of seats are disposed inside the recess.

9. The apparatus according to claim 8, wherein a lower end of each of the plurality of seats is located below an upper end of the recess, and
    wherein each of the plurality of shutters is disposed at a bottom surface of one of the plurality of seats.

10. The apparatus according to claim 5, wherein the plurality of seats are a plurality of tray seats that are recessed from the tray, respectively,
    wherein the shelf base defines a plurality of base seats that are recessed in a shape corresponding to the plurality of tray seats, each of the plurality of base seats being configured to accommodate one of the plurality of tray seats, and wherein each of the plurality of base seats is further recessed relative to a bottom surface of one of the plurality of tray seats and configured to accommodate the water supplied from the water supply module.

11. The apparatus according to claim 10, wherein the shelf base further defines:
a water supply portion disposed at a rear end of the shelf base and configured to receive the water supplied from the water supply module; and
a base passage that connects the water supply portion to the plurality of base seats and is configured to guide the water from the water supply portion to each of the plurality of base seats, the base passage being recessed from the shelf base.

12. The apparatus according to claim 11, wherein the shelf is configured to be inserted into and withdrawn from an inside of the cabinet, and
wherein the water supply module includes a water supply pipe disposed above the water supply portion in a state in which the shelf is inserted into the inside of the cabinet.

13. The apparatus according to claim 5, wherein each of the plurality of shutters comprises:
a pressing member configured to protrude to an inside of the corresponding seat, the pressing member being configured to move downward from the inside of the corresponding seat based on the seed package being disposed in the corresponding seat;
a communication member that is configured to communicate the water between the shelf base and the inside of the corresponding seat; and
a shutter member is disposed below the corresponding seat and defines a communication hole, the shutter member being coupled to the pressing member and configured to move vertically together with the pressing member to thereby open and close the communication hole.

14. The apparatus according to claim 13, wherein each of the plurality of shutters further comprises a spring that supports the pressing member and is configured to apply force to the shutter member to thereby close the communication hole based on no seed package being disposed in the corresponding seat.

15. The apparatus according to claim 13, wherein the shutter member is disposed below the communication hole, and
wherein the shutter member is configured to move upward based on a water level in the shelf base to thereby maintain the communication hole in the closed state.

16. The apparatus according to claim 13, wherein the shutter member is configured to move downward by a weight of the shutter member to thereby maintain the communication hole in an opened state, and
wherein the pressing member is configured to move downward by a weight of the pressing member to thereby maintain the communication hole in the opened state.

17. The apparatus according to claim 16, wherein the shutter member is made of a material that allows the shutter member to float in the water of the shelf base and apply buoyancy force to the shutter member to thereby close the communication hole based on no seed package being disposed in the corresponding seat.

18. The apparatus according to claim 1, wherein the water supply module comprises:
a water tank disposed in the cabinet and configured to store water to be supplied to the shelf;
a water supply pipe configured to supply the water to the shelf;
a pump disposed between the water supply pipe and the water tank and configured to supply the water in the water tank to the shelf through the water supply pipe; and
a drain pipe disposed in the cabinet and configured to guide the water drained from the shelf to the water tank, and
wherein the pump is configured to circulate the water through the water tank and the shelf.

19. The apparatus according to claim 18, wherein the pump is configured to be driven to supply the water above a water level that is higher than a bottom surface of each of the plurality of seats.

20. The apparatus according to claim 1, wherein each of the plurality of seed packages comprises:
a container that is configured to communicate with the corresponding seat and defines an accommodation space configured to receive the water from the corresponding seat;
a container cover that covers an opened top surface of the container; and
a seed accommodation member disposed in the accommodation space and configured to accommodate seeds of the plants, the seed accommodation member being made of an absorbent material configured to supply the water in the accommodation space to the seeds, and
wherein the container comprises:
a water inflow portion recessed from a bottom surface of the container and configured to accommodate one of the plurality of shutters, and
a plurality of container openings defined around the water inflow portion and configured to introduce the water from the corresponding seat into the container.

* * * * *